US012014747B2

(12) United States Patent
Multrus et al.

(10) Patent No.: US 12,014,747 B2
(45) Date of Patent: Jun. 18, 2024

(54) AUDIO ENCODER FOR ENCODING AN AUDIO SIGNAL, METHOD FOR ENCODING AN AUDIO SIGNAL AND COMPUTER PROGRAM UNDER CONSIDERATION OF A DETECTED PEAK SPECTRAL REGION IN AN UPPER FREQUENCY BAND

(71) Applicant: Fraunhofer-Gesellschaft zur Förderung der angewandten Forschung e.V., Munich (DE)

(72) Inventors: Markus Multrus, Nuremberg (DE); Christian Neukam, Kalchreuth (DE); Markus Schnell, Nuremberg (DE); Benjamin Schubert, Nuremberg (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 18/308,293

(22) Filed: Apr. 27, 2023

(65) Prior Publication Data

US 2023/0290365 A1 Sep. 14, 2023

Related U.S. Application Data

(63) Continuation of application No. 17/023,941, filed on Sep. 17, 2020, now Pat. No. 11,682,409, which is a (Continued)

(30) Foreign Application Priority Data

Apr. 12, 2016 (EP) .................................... 16164951

(51) Int. Cl.

*G10L 19/26* (2013.01)
*G10L 19/02* (2013.01)
(Continued)

(52) U.S. Cl.

CPC ........ *G10L 19/265* (2013.01); *G10L 19/0204* (2013.01); *G10L 19/03* (2013.01);
(Continued)

(58) Field of Classification Search

CPC ... G10L 19/02; G10L 19/0204; G10L 19/028; G10L 19/03; G10L 19/032; G10L 19/04;
(Continued)

(56) References Cited

U.S. PATENT DOCUMENTS 4,672,670 A * 6/1987 Wang .................... H04B 1/667 704/218
5,778,339 A 7/1998 Sonohara et al.
(Continued)

FOREIGN PATENT DOCUMENTS

CN 1408109 A 4/2003
CN 101185120 A 5/2008
(Continued)

OTHER PUBLICATIONS

Chinese language office action dated Nov. 25, 2022, issued in application No. CN 201780035964.1.
(Continued)

*Primary Examiner* — Eric Yen
(74) *Attorney, Agent, or Firm* — McClure, Qualey & Rodack, LLP

(57) ABSTRACT

An audio encoder for encoding an audio signal having a lower frequency band and an upper frequency band includes: a detector for detecting a peak spectral region in the upper frequency band of the audio signal; a shaper for shaping the lower frequency band using shaping information for the lower band and for shaping the upper frequency band using at least a portion of the shaping information for the lower band, wherein the shaper is configured to additionally attenuate spectral values in the detected peak spectral region
(Continued)

in the upper frequency band; and a quantizer and coder stage for quantizing a shaped lower frequency band and a shaped upper frequency band and for entropy coding quantized spectral values from the shaped lower frequency band and the shaped upper frequency band.

20 Claims, 16 Drawing Sheets

Related U.S. Application Data continuation of application No. 16/143,716, filed on Sep. 27, 2018, now Pat. No. 10,825,461, which is a continuation of application No. PCT/EP2017/058238, filed on Apr. 6, 2017.

(51) Int. Cl.
*G10L 19/028* (2013.01)
*G10L 19/03* (2013.01)
*G10L 19/032* (2013.01)
*G10L 19/04* (2013.01)
*G10L 19/12* (2013.01)
*G10L 19/16* (2013.01)
*G10L 21/007* (2013.01)
*G10L 21/02* (2013.01)
*G10L 21/0208* (2013.01)
*G10L 21/0324* (2013.01)
*G10L 21/038* (2013.01)
*G10L 25/15* (2013.01)
*G10L 25/18* (2013.01)

(52) U.S. Cl.
CPC ............ *G10L 19/032* (2013.01); *G10L 19/12* (2013.01); *G10L 19/16* (2013.01); *G10L 19/26* (2013.01); *G10L 21/007* (2013.01); *G10L 21/02* (2013.01); *G10L 21/0208* (2013.01); *G10L 21/0324* (2013.01); *G10L 25/15* (2013.01); *G10L 25/18* (2013.01); *G10L 19/02* (2013.01); *G10L 19/028* (2013.01); *G10L 19/04* (2013.01); *G10L 21/038* (2013.01)

(58) Field of Classification Search
CPC ......... G10L 19/12; G10L 19/16; G10L 19/26; G10L 19/265; G10L 21/007; G10L 21/02; G10L 21/0208; G10L 21/0324; G10L 21/038; G10L 25/15; G10L 25/18
See application file for complete search history.

(56) References Cited

U.S. PATENT DOCUMENTS 6,349,197 B1 * 2/2002 Oestreich ............ H04W 88/181 370/468
6,415,253 B1 * 7/2002 Johnson .............. G10L 21/0208 704/226
6,587,816 B1 * 7/2003 Chazan ................... G10L 25/90 704/207
6,975,254 B1 * 12/2005 Sperschneider ...... G10L 19/032 704/E19.02
7,505,823 B1 * 3/2009 Bartlett ................... H04J 13/10 446/175
7,555,434 B2 6/2009 Nomura et al.
2002/0007280 A1 * 1/2002 McCree .............. G10L 19/0208 704/E21.011
2002/0128839 A1 * 9/2002 Lindgren .............. G10L 19/083 704/258
2004/0158456 A1 * 8/2004 Prakash ................ G10L 19/035 704/E19.016
2004/0167775 A1 * 8/2004 Sorin ...................... G10L 25/90 704/208
2005/0004793 A1 * 1/2005 Ojala ...................... G10L 19/24 704/219
2005/0096899 A1 * 5/2005 Padhi ...................... G10L 15/10 704/216
2005/0165603 A1 7/2005 Bessett et al.
2005/0219068 A1 * 10/2005 Jones ....................... H04N 7/08 348/E7.024
2006/0122828 A1 * 6/2006 Lee ......................... G10L 19/04 704/219
2006/0271356 A1 * 11/2006 Vos ....................... G10L 19/038 704/E19.017
2008/0027709 A1 * 1/2008 Baumgarte ......... G10L 19/0208 704/E19.019
2008/0027711 A1 1/2008 Rajendran et al.
2008/0033730 A1 * 2/2008 Jot ..................... H03H 17/0266 704/E21.001
2008/0046233 A1 * 2/2008 Chen ..................... G10L 19/005 704/211
2008/0120118 A1 5/2008 Choo et al.
2008/0140393 A1 6/2008 Kim et al.
2008/0159559 A1 * 7/2008 Akagi ................. G10L 21/0208 381/92
2008/0260048 A1 10/2008 Domen et al.
2009/0281795 A1 11/2009 Ehara et al.
2010/0017198 A1 * 1/2010 Yamanashi ........... G10L 21/038 704/205
2010/0208917 A1 * 8/2010 Hashimoto ............ H03G 9/025 381/107
2010/0250262 A1 * 9/2010 Miseki .................... G10L 19/18 704/E21.001
2011/0194635 A1 * 8/2011 Oshikiri ................ G10L 21/038 375/260
2011/0280337 A1 11/2011 Lee et al.
2011/0307248 A1 12/2011 Yamanashi et al.
2012/0010879 A1 1/2012 Tsujino et al.
2012/0201399 A1 * 8/2012 Mitsufuji ............ G10L 21/0388 381/98
2013/0124214 A1 * 5/2013 Yamamoto .............. G10L 19/26 704/500
2014/0229170 A1 * 8/2014 Atti ..................... G10L 21/0264 704/225
2014/0229171 A1 * 8/2014 Atti ......................... G10L 19/24 704/225
2014/0337016 A1 11/2014 Herbig et al.
2015/0088527 A1 * 3/2015 Naslund .................. G10L 19/02 704/500
2017/0053658 A1 * 2/2017 Atti ......................... G10L 19/24
2017/0256267 A1 9/2017 Disch et al.

FOREIGN PATENT DOCUMENTS

CN 107077858 A 8/2017
EP 2980794 A1 2/2016
JP 2001-143384 A 5/2001
JP 2012-37582 A 2/2012
JP 2013-171130 A 9/2013
JP 2014197790 A 10/2014
JP 2015516593 A 6/2015
KR 20060090995 A 8/2006
KR 1020130047630 A 5/2013
RU 2327230 C2 6/2008
WO 00/45379 A2 8/2000
WO 2004010415 A1 1/2004
WO 2009029037 A1 3/2009
WO 2010/040522 A2 4/2010
WO 2012017621 A1 2/2012
WO 2013147668 A1 10/2013
WO 2016/001067 A1 1/2016

OTHER PUBLICATIONS

English language translation of office action dated Nov. 25, 2022, issued in application No. CN 201780035964.1 (pp. 1-6 of attachment).

(56) References Cited

OTHER PUBLICATIONS

Yang, J.; "Research on Speech Codec System Based on Perception;" China Doctoral Dissertation; Apr. 2010; pp. 1-120.
Japanese language Notice of Allowance dated Sep. 29, 2021, issued in application No. JP 2020-118122.
English language translation of Notice of Allowance dated Sep. 29, 2021, issued in application No. JP 2020-118122.
International Search Report dated May 7, 2017, issued in application No. PCT/EP2017/058238.
Written Opinion issued in International Search Report dated May 7, 2017, issued in application No. PCT/EP2017/058238.
3GPP TS 24.445 V13.1.0 (Mar. 2016), 3rd generation partnership project; Technical Specification Group Services and System Aspects; Codec for Enhanced Voice Services (EVS); Detailed algorithmic description (release 13).
Russian Office Action, The Federal Institute for Industrial Property of The Federal Service for Intellectual Property, Patents and Trade Marks, dated Aug. 14, 2019, Application No. 2018139489, pp. 1-9.
Japanese Office Action dated Jan. 8, 2020, issued in application No. JP 2018-553874.
English language translation of Japanese Office Action dated Jan. 8, 2020, issued in application No. JP 2018-553874.
Indian Office Action with English Translation dated Jul. 18, 2020, issued in application No. 201837037688.

* cited by examiner

- shaping info for SB1 used for shaping SB1
- shaping info for SB2 used for shaping SB2
- shaping info for SB3 used for shaping SB3
- shaping info for SB4 used for shaping SB4
- shaping info for SB4 used for shaping higher band

AUDIO ENCODER FOR ENCODING AN AUDIO SIGNAL, METHOD FOR ENCODING AN AUDIO SIGNAL AND COMPUTER PROGRAM UNDER CONSIDERATION OF A DETECTED PEAK SPECTRAL REGION IN AN UPPER FREQUENCY BAND

CROSS-REFERENCE TO RELATED APPLICATIONS

This application is a continuation of U.S. patent application Ser. No. 17/023,941, filed Sep. 17, 2020, which is a continuation of U.S. patent application Ser. No. 16/143,716, filed Sep. 25, 2018, which is a continuation of copending International Application No. PCT/EP2017/058238, filed Apr. 6, 2017, which is incorporated herein by reference in its entirety, which additionally claimed priority from European Application No. EP 16 164 951.2, filed Apr. 12, 2016, which is incorporated herein by reference in its entirety.

The present invention relates to audio encoding and, advantageously, to a method, apparatus or computer program for controlling the quantization of spectral coefficients for the MDCT based TCX in the EVS codec.

BACKGROUND OF THE INVENTION

A reference document for the EVS codec is 3GPP TS 24.445 V13.1.0 (2016-03), 3 $^{rd}$ generation partnership project; Technical Specification Group Services and System Aspects; Codec for Enhanced Voice Services (EVS); Detailed algorithmic description (release 13).

However, the present invention is additionally useful in other EVS versions as, for example, defined by other releases than release 13 and, additionally, the present invention is additionally useful in all other audio encoders different from EVS that, however, rely on a detector, a shaper and a quantizer and coder stage as defined, for example, in the claims.

Additionally, it is to be noted that all embodiments defined not only by the independent but also defined by the dependent claims can be used separately from each other or together as outlined by the interdependencies of the claims or as discussed later on under advantageous examples.

The EVS Codec [1], as specified in 3GPP, is a modern hybrid-codec for narrowband NB), wide-band (WB), super-wide-band (SWB) or full-band (FB) speech and audio content, which can switch between several coding approaches, based on signal classification:

FIG. 1 illustrates a common processing and different coding schemes in EVS. Particularly, a common processing portion of the encoder in FIG. 1 comprises a signal resampling block 101, and a signal analysis block 102. The audio input signal is input at an audio signal input 103 into the common processing portion and, particularly, into the signal resampling block 101. The signal resampling block 101 additionally has a command line input for receiving command line parameters. The output of the common processing stage is input in different elements as can be seen in FIG. 1. Particularly, FIG. 1 comprises a linear prediction-based coding block (LP-based coding) 110, a frequency domain coding block 120 and an inactive signal coding/CNG block 130. Blocks 110, 120, 130 are connected to a bitstream multiplexer 140. Additionally, a switch 150 is provided for switching, depending on a classifier decision, the output of the common processing stage to either the LP-based coding block 110, the frequency domain coding block 120 or the inactive signal coding/CNG (comfort noise generation) block 130. Furthermore, the bitstream multiplexer 140 receives a classifier information, i.e., whether a certain current portion of the input signal input at block 103 and processed by the common processing portion is encoded using any of the blocks 110, 120, 130.

- The LP-based (linear prediction based) coding, such as CELP coding, is primadly used for speech or speech-dominant content and generic audio content with high temporal fluctuation.
- The Frequency Domain Coding is used for all other generic audio content, such as music or background noise.

To provide maximum quality for low and medium bitrates, frequent switching between LP-based Coding and Frequency Domain Coding is performed, based on Signal Analysis in a Common Processing Module. To save on complexity, the codec was optimized to re-use elements of the signal analysis stage also in subsequent modules. For example: The Signal Analysis module features an LP analysis stage.

The resulting LP-filter coefficients (LPC) and residual signal are firstly used for several signal analysis steps, such as the Voice Activity Detector (VAD) or speech/music classifier. Secondly, the LPC is also an elementary part of the LP-based Coding scheme and the Frequency Domain Coding scheme. To save on complexity, the LP analysis is performed at the internal sampling rate of the CELP coder ($SR_{cELF}$).

The CELP coder operates at either 12.8 or 16 kHz internal sampling-rate ($SR_{cELF}$), and can thus represent signals up to 6.4 or 8 kHz audio bandwidth directly. For audio content exceeding this bandwidth at WB, SWB or FB, the audio content above CELP's frequency representation is coded by a bandwidth-extension mechanism.

The MDCT-based TCX is a submode of the Frequency Domain Coding. Like for the LP-based coding approach, noise-shaping in TCX is performed based on an LP-filter. This LPC shaping is performed in the MDCT domain by applying gain factors computed from weighted quantized LP filter coefficients to the MDCT spectrum (decoder-side). On encoder-side, the inverse gain factors are applied before the rate loop. This is subsequently referred to as application of LPC shaping gains. The TCX operates on the input sampling rate ($SR_{inp}$). This is exploited to code the full spectrum directly in the MDCT domain, without additional bandwidth extension. The input sampling rate $SR_{inp}$, on which the MDCT transform is performed, can be higher than the CELP sampling rate $SR_{CELP}$, for which LP coefficients are computed. Thus LPC shaping gains can only be computed for the part of the MDCT spectrum corresponding to the CELP frequency range ($f_{cELP}$) For the remaining part of the spectrum (if any) the shaping gain of the highest frequency band is used.

FIG. 2 illustrates on a high level the application of LPC shaping gains and for the MDCT based TCX. Particularly, FIG. 2 illustrates a principle of noise-shaping and coding in the TCX or frequency domain coding block 120 of FIG. 1 on the encoder-side.

Particularly, FIG. 2 illustrates a schematic block diagram of an encoder. The input signal 103 is input into the resampling block 201 in order to perform a resampling of the signal to the CELP sampling rate $SR_{CELP}$, i.e., the sampling rate used by LP-based coding block 110 of FIG. 1. Furthermore, an LPC calculator 203 is provided that calculates LPC parameters and in block 205, an LPC-based weighting is performed in order to have the signal further processed by the LP-based coding block 110 in FIG. 1, i.e., the LPC residual signal that is encoded using the ACELP processo r.

Additionally, the input signal 103 is input, without any resampling, to a time-spectral converter 207 that is exemplarily illustrated as an MDCT transform. Furthermore, in block 209, the LPC parameters calculated by block 203 are applied after some calculations. Particularly, block 209 receives the LPC parameters calculated from block 203 via line 213 or alternatively or additionally from block 205 and then derives the MDCT or, generally, spectral domain weighting factors in order to apply the corresponding inverse LPC shaping gains. Then, in block 211, a general quantizer/encoder operation is performed that can, for example, be a rate loop that adjusts the global gain and, additionally, performs a quantization/coding of spectral coefficients, advantageously using arithmetic coding as illustrated in the well-known EVS encoder specification to finally obtain the bit-stream.

In contrast to the CELP coding approach, which combines a core-coder at $SR_{CELP}$ and a bandwidth-extension mechanism running at a higher sampling rate, the MDCT-based coding approaches directly operate on the input sampling rate SR in p and code the content of the full spectrum in the MDCT domain.

The MDCT-based TCX codes up to 16 kHz audio content at low bitrates, such as 9.6 or 13.2 kbits SWB. Since at such low bitrates only a small subset of the spectral coefficients can be coded directly by means of the arithmetic coder, the resulting gaps (regions of zero values) in the spectrum are concealed by two mechanisms:

- Noise Filling, which inserts random noise in the decoded spectrum. The energy of the noise is controlled by a gain factor, which transmitted in the bit-stream.
- Intelligent Gap Filling (IGF), which inserts signal portions from lower frequencies parts of the spectrum. The characteristics of these inserted frequencyportions are controlled by parameters, which are transmitted in the bit-stream.

The Noise Filling is used for lower frequency portions up to the highest frequency, which can be controlled by the transmitted LPC ($f_{cELP}$) Above this frequency, the IGF tool is used, which provides other mechanisms to control the level of the inserted frequency portions.

There are two mechanisms for the decision on which spectral coefficients survive the encoding procedure, or which will be replaced by noise filling or IGF:

1) Rate loop

After the application of inverse LPC shaping gains, a rate loop is applied. For this, a global gain is estimated. Subsequently, the spectral coefficients are quantized, and the quantized spectral coefficients are coded with the arithmetic coder. Based on the real or an estimated bit-demand of the arithmetic coder and the quantization error, the global gain is increased or decreased. This impacts the precision of the quantizer. The lower the precision, the more spectral coefficients are quantized to zero. Applying the inverse LPC shaping gains using a weighted LPC before the rate loop assures that the perceptually relevant lines survive by a significantly higher probability than perceptually irrelevant content.

2) IGF Tonal mask

Above $f_{cELp}$, where the no LPC is available, a different mechanism to identify the perceptually relevant spectral components is used: Line-wise energy is compared to the average energy in the IGF region. Predominant spectral lines, which correspond to perceptually relevant signal portions, are kept, all other lines are set to zero. The MDCT spectrum, which was preprocessed with the IGF Tonal mask is subsequently fed into the Rate loop.

The weighted LPC follows the spectral envelope of the signal. By applying the inverse LPC shaping gains using the weighted LPC a perceptual whitening of the spectrum is performed. This significantly reduces the dynamics of the MDCT spectrum before the coding-loop, and thus also controls the bit-distribution among the MDCT spectral coefficients in the coding-loop.

As explained above, the weighted LPC is not available for frequencies above fCELP. For these MDCT coefficients, the shaping gain of the highest frequency band below fCELP is applied. This works well in cases where the shaping gain of the highest frequency band below $f_{cELP}$, roughly corresponds to the energy of the coefficients above $f_{CELP}$, which is often the case due to the spectral tilt, and which can be observed in most audio signals. Hence, this procedure is advantageous, since the shaping information for the upper band need not be calculated or transmitted.

However, in case there are strong spectral components above $f_{CELP}$ and the shaping gain of the highest frequency band below $f_{CELP}$, is very low, this results in a mismatch. This mismatch heavily impacts the work or the rate loop, which focuses on the spectral coefficients having the highest amplitude. This will at low bitrates zero out the remaining signal components, especially in the low-band, and produces perceptually bad quality.

FIGS. 3-6 illustrate the problem. FIG. 3 shows the absolute MDCT spectrum before the application of the inverse LPC shaping gains, FIG. 4 the corresponding LPC shaping gains. There are strong peaks above $f_{CELP}$, visible, which are in the same order of magnitude as the highest peaks below $f_{CELP}$. The spectral components above $f_{CELP}$ are a result of the preprocessing using the IGF tonal mask. FIG. shows the absolute MDCT spectrum after applying the inverse LPC gains, still before quantization. Now the peaks above $f_{CELP}$, significantly exceed the peaks below $f_{CELP}$, with the effect that the rate-loop will primarily focus on these peaks. FIG. 6 shows the result of the rate loop at low bitrates: All spectral components except the peaks above $f_{CELP}$ were quantized to 0. This results in a perceptually very poor result after the complete decoding process, since the psychoacoustically very relevant signal portions at low frequencies are missing completely.

FIG. 3 illustrates an MDCT spectrum of a critical frame before the application of inverse LPC shaping gains.

FIG. 4 illustrates LPC shaping gains as applied. On the encoder-side, the spectrum is multiplied with the inverse gain. The last gain value is used for all MDCT coefficients above $f_{CELP}$ FIG. 4 indicates $f_{CELP}$ at the right border.

FIG. 5 illustrates an MDCT spectrum of a critical frame after application of inverse LPC shaping gains. The high peaks above $f_{CELP}$, are clearly visible.

FIG. 6 illustrates an MDCT spectrum of a critical frame after quantization. The displayed spectrum includes the application of the global gain, but without the LPC shaping gains. It can be seen that all spectral coefficients except the peak above $f_{CELP}$ are quantized to 0.

SUMMARY

According to an embodiment, an audio encoder for encoding an audio signal having a lower frequency band and an upper frequency band may have: a detector for detecting a peak spectral region in the upper frequency band of the audio signal; a shaper for shaping the lower frequency band using shaping information for the lower band and for shaping the upper frequency band using at least a portion of the shaping information for the lower frequency band, wherein the shaper is configured to additionally attenuate spectral values in the detected peak spectral region in the upper frequency band; and a quantizer and coder stage for quantizing a shaped lower frequency band and a shaped upper frequency band and for entropy coding quantized spectral values from the shaped lower frequency band and the shaped upper frequency band.

According to another embodiment, a method for encoding an audio signal having a lower frequency band and an upper frequency band may have the steps of: detecting a peak spectral region in the upper frequency band of the audio signal; shaping the lower frequency band of the audio signal using shaping information for the lower frequency band and shaping the upper frequency band of the audio signal using at least a portion of the shaping information for the lower frequency band, wherein the shaping of the upper frequency band includes an additional attenuation of a spectral value in the detected peak spectral region in the upper frequency band.

According to another embodiment, a non-transitory digital storage medium may have a computer program stored thereon to perform the inventive method, when said computer program is run by a computer or processor.

The present invention is based on the finding that such problems of conventional technology can be addressed by preprocessing the audio signal to be encoded depending on a specific characteristic of the quantizer and coder stage included in the audio encoder. To this end, a peak spectral region in an upper frequency band of the audio signal is detected. Then, a shaper for shaping the lower frequency band using shaping information for the lower band and for shaping the upper frequency band using at least a portion of the shaping information for the lower band is used. Particularly, the shaper is additionally configured to attenuate spectral values in a detected peak spectral region, i.e., in a peak spectral region detected by the detector in the upper frequency band of the audio signal. Then, the shaped lower frequency band and the attenuated upper frequency band are quantized and entropy-encoded.

Due to the fact that the upper frequency band has been attenuated selectively, i.e., within the detected peak spectral region, this detected peak spectral region cannot fully dominate the behavior of the quantizer and coder stage anymore.

Instead, due to the fact that an attenuation has been formed in the upper frequency band of the audio signal, the overall perceptual quality of the result of the encoding operation is improved. Particularly at low bitrates, where a quite low bitrate is a main target of the quantizer and coder stage, high spectral peaks in the upper frequency band would consume all the bits used by the quantizer and coder stage, since the coder would be guided by the high upper frequency portions and would, therefore, use most of the available bits in these portions. This automatically results in a situation where any bits for perceptually more important lower frequency ranges are not available anymore. Thus, such a procedure would result in a signal only having encoded high frequency portions while the lower frequency portions are not coded at all or are only encoded very coarsely. However, it has been found that such a procedure is less perceptually pleasant compared to a situation, where such a prob-!emetic situation with predominant high spectral regions is detected and the peaks in the higher frequency range are attenuated before performing the encoder procedure comprising a quantizer and a entropy encoder stage.

Advantageously, the peak spectral region is detected in the upper frequency band of an MDCT spectral. However, other time-spectral converters can be used as well such as a filterbank, a QMF filter bank, a DFT, an FFT or any other time-frequency conversion.

Furthermore, the present invention is useful in that, for the upper frequency band, it is not required to calculate shaping information. Instead, a shaping information originally calculated for the lower frequency band is used for shaping the upper frequency band. Thus, the present invention provides a computationally very efficient encoder since a low band shaping information can also be used for shaping the high band, since problems that might result from such a situation, i.e., high spectral values in the upper frequency band are addressed by the additional attenuation additionally applied by the shaper in addition to the straightforward shaping typically based on the spectral envelope of the low band signal that can, for example, be characterized by a LPC parameters for the low band signal. But the spectral envelope can also be represented by any other corresponding measure that is usable for performing a shaping in the spectral domain.

The quantizer and coder stage performs a quantizing and coding operation on the shaped signal, i.e., on the shaped low band signal and on the shaped high band signal, but the shaped high band signal additionally has received the additional attenuation.

Although the attenuation of the high band in the detected peak spectral region is a preprocessing operation that cannot be recovered by the decoder anymore, the result of the decoder is nevertheless more pleasant compared to a situation, where the additional attenuation is not applied, since the attenuation results in the fact that bits are remaining for the perceptually more important lower frequency band. Thus, in problematic situations where a high spectral region with peaks would dominate the whole coding result, the present invention provides for an additional attenuation of such peaks so that, in the end, the encoder "sees" a signal having attenuated high frequency portions and, therefore, the encoded signal still has useful and perceptually pleasant low frequency information. The "sacrifice" with respect to the high spectral band is not or almost not noticeable by listeners, since listeners, generally, do not have a clear picture of the high frequency content of a signal but have, to a much higher probability, an expectation regarding the low frequency content. In other words, a signal that has very low level low frequency content but a significant high level frequency content is a signal that is typically perceived to be unnatural.

Advantageous embodiments of the invention comprise a linear prediction analyzer for deriving linear prediction coefficients for a time frame and these linear prediction coefficients represent the shaping information or the shaping information is derived from those linear prediction coefficients.

In a further embodiment, several shaping factors are calculated for several sub-bands of the lower frequency band, and for the weighting in the higher frequency band, the shaping factor calculated for the highest subband of the low frequency band is used.

In a further embodiment, the detector determines a peak spectral region in the upper frequency band when at least one of a group of conditions is true, where the group of conditions comprises at least a low frequency band amplitude condition, a peak distance condition and a peak amplitude condition. Even more advantageously, a peak spectral region is only detected when two conditions are true at the same time and even more advantageously, a peak spectral region is only detected when all three conditions are true.

In a further embodiment, the detector determines several values used for examining the conditions either before or after the shaping operation with or without the additional attenuation.

In an embodiment, the shaper additionally attenuates the spectral values using an attenuation factor, where this attenuation factor is derived from a maximum spectral amplitude in the lower frequency band multiplied by a predetermined number being greater than or equal to 1 and divided by the maximum spectral amplitude in the upper frequency band.

Furthermore, the specific way, as to how the additional attenuation is applied, can be done in several different ways. One way is that the shaper firstly performs the weighting information using at least a portion of the shaping information for the lower frequency band in order to shape the spectral values in the detected peak spectral region. Then, a subsequent weighting operation is performed using the attenuation information.

An alternative procedure is to firstly apply a weighting operation using the attenuation information and to then perform a subsequent weighting using a weighting information corresponding to the at least the portion of the shaping information for the lower frequency band. A further alternative is to apply a single weighting information using a combined weighting information that is derived from the attenuation on the one hand and the portion of the shaping information for the lower frequency band on the other hand.

In a situation where the weighting is performed using a multiplication, the attenuation information is an attenuation factor and the shaping information is a shaping factor and the actual combined weighting information is a weighting factor, i.e., a single weighting factor for the single weighting information, where this single weighting factor is derived by multiplying the attenuation information and the shaping information for the lower band. Thus, it becomes clear that the shaper can be implemented in many different ways, but, nevertheless, the result is a shaping of the high frequency band using shaping information of the lower band and an additional attenuation.

In an embodiment, the quantizer and coder stage comprises a rate loop processor for estimating a quantizer characteristic so that the predetermined bitrate of an entropy encoded audio signal is obtained. In an embodiment, this quantizer characteristic is a global gain, i.e., a gain value applied to the whole frequency range, i.e., applied to all the spectral values that are to be quantized and encoded. When it appears that the bitrate that may be used is lower than a bitrate obtained using a certain global gain, then the global gain is increased and it is determined whether the actual bitrate is now in line with the requirement, i.e., is now smaller than or equal to the bitrate that may be used. This procedure is performed, when the global gain is used in the encoder before the quantization in such a way the spectral values are divided by the global gain. When, however, the global gain is used differently, i.e., by multiplying the spectral values by the global gain before performing the quantization, then the global gain is decreased when an actual bitrate is too high, or the global gain can be increased when the actual bitrate is lower than admissible.

However, other encoder stage characteristics can be used as well in a certain rate loop condition. One way would, for example, be a frequency-selective gain. A further procedure would be to adjust the band width of the audio signal depending on the bitrate that may be used. Generally, different quantizer characteristics can be influenced so that, in the end, a bit rate is obtained that is in line with the (typically low) bitrate that may be used.

Advantageously, this procedure is particularly well suited for being combined with intelligent gap filling processing (IGF processing). In this procedure, a tonal mask processor is applied for determining, in the upper frequency band, a first group of spectral values to be quantized and entropy encoded and a second group of spectral values to be parametrically encoded by the gap-filling procedure. The tonal mask processor sets the second group of spectral values to 0 values so that these values do not consume many bits in the quantizer/encoder stage. On the other hand, it appears that typically values belonging to the first group of spectral values that are to be quantized and entropy coded are the values in the peak spectral region that, under certain circumstances, can be detected and additionally attenuated in case of a problematic situation for the quantizer/encoder stage. Therefore, the combination of a tonal mask processor within an intelligent gap-filling framework with the additional attenuation of detected peak spectral regions results in a very efficient encoder procedure which is, additionally, backward-compatible and, nevertheless, results in a good perceptual quality even at very low bitrates.

Embodiments are advantageous over potential solutions to deal with this problem that include methods to extend the frequency range of the LPC or other means to better fit the gains applied to frequencies above $f_{CELP}$ to the actual MDCT spectral coefficients. This procedure, however, destroys backward compatibility, when a codec is already deployed in the market, and the previously described methods would break interoperability to existing implementations.

BRIEF DESCRIPTION OF THE DRAWINGS

Embodiments of the present invention will be detailed subsequently referring to the appended drawings, in which.

DETAILED DESCRIPTION OF THE INVENTION

Figure 8:
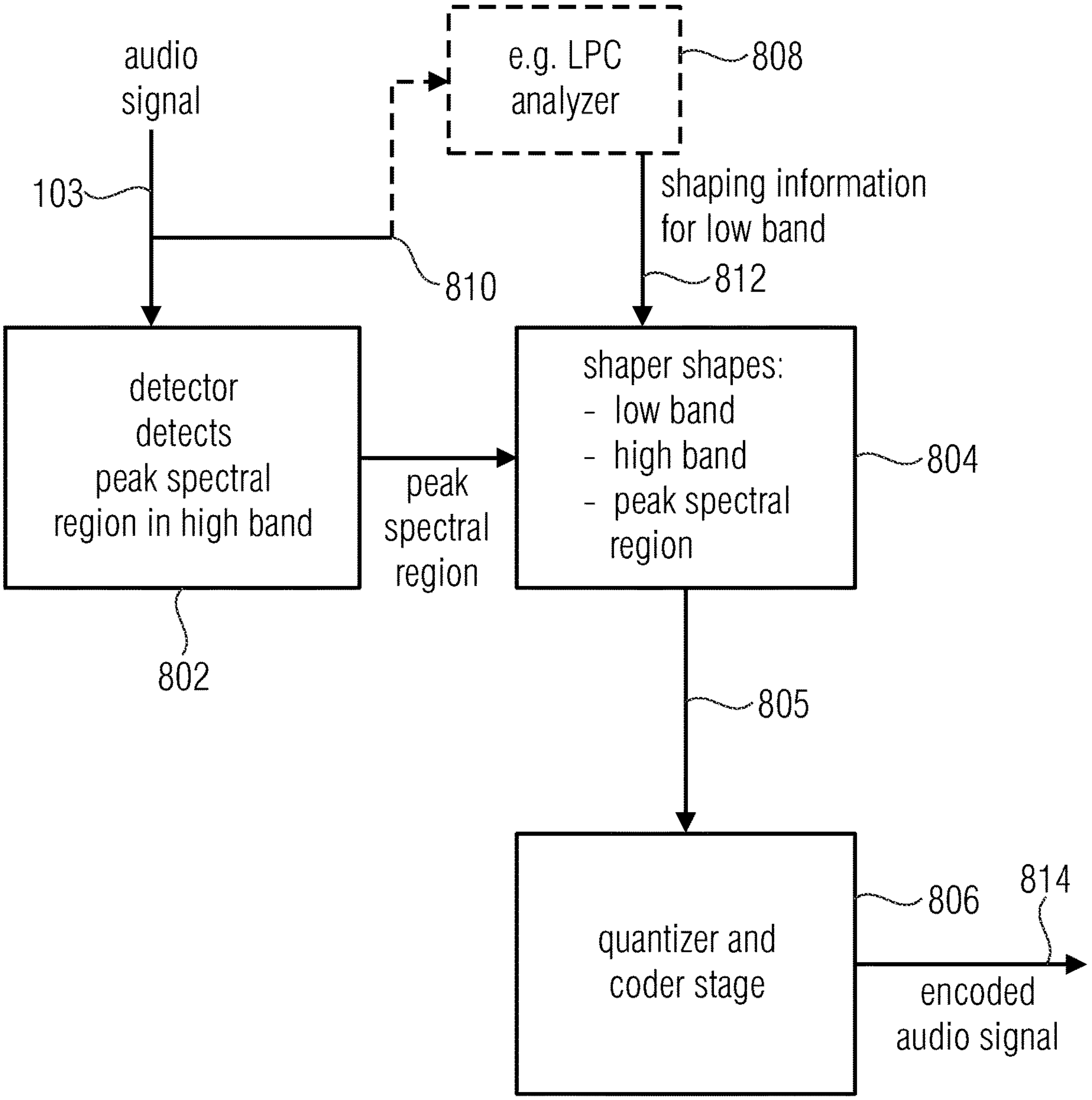
FIG. 8 illustrates an advantageous embodiment of an audio encoder for encoding an audio signal.

FIG. 8 illustrates an advantageous embodiment of an audio encoder for encoding an audio signal 403 having a lower frequency band and an upper frequency band. The audio encoder comprises a detector 802 for detecting a peak spectral region in the upper frequency band of the audio signal 103. Furthermore, the audio encoder comprises a shaper 804 for shaping the lower frequency band using shaping information for the lower band and for shaping the upper frequency band using at least a portion of the shaping information for the lower frequency band. Additionally, the shaper is configured to additionally attenuate spectral values in the detected peak spectral region in the upper frequency band.

Thus, the shaper 804 performs a kind of "single shaping" in the low-band using the shaping information for the low-band. Furthermore, the shaper additionally performs a kind of a "single" shaping in the high-band using the shaping information for the low-band and typically, the highest frequency low-band. This "single" shaping is performed in some embodiments in the high-band where no peak spectral region has been detected by the detector 802. Furthermore, for the peak spectral region within the high-band, a kind of a "double" shaping is performed, i.e., the shaping information from the low-band is applied to the peak spectral region and, additionally, the additional attenuation is applied to the peak spectral region.

The result of the shaper 804 is a shaped signal 805. The shaped signal is a shaped lower frequency band and a shaped upper frequency band, where the shaped upper frequency band comprises the peak spectral region. This shaped signal 805 is forwarded to a quantizer and coder stage 806 for quantizing the shaped lower frequency band and the shaped upper frequency band including the peak spectral region and for entropy coding the quantized spectral values from the shaped lower frequency band and the shaped upper frequency band comprising the peak spectral region again to obtain the encoded audio signal 814.

Advantageously, the audio encoder comprises a linear prediction coding analyzer 808 for deriving linear prediction coefficients for a time frame of the audio signal by analyzing a block of audio samples in the time frame. Advantageously, these audio samples are band-limited to the lower frequency band.

Additionally, the shaper 804 is configured to shape the lower frequency band using the linear prediction coefficients as the shaping information as illustrated at 812 in FIG. 8. Additionally, the shaper 804 is configured to use at least the portion of the linear prediction coefficients derived from the block of audio samples band-limited to the lower frequency band for shaping the upper frequency band in the time frame of the audio signal.

Figure 9:
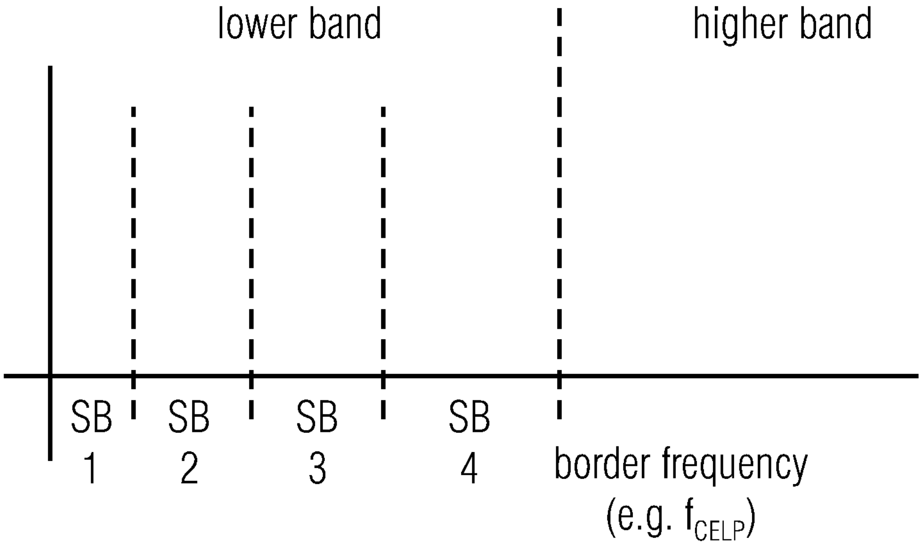
FIG. 9 illustrates the situation for the calculation of different shaping information for different frequency bands and the usage of the lower band shaping information for the higher band.

As illustrated in FIG. 9, the lower frequency band is advantageously subdivided into a plurality of subbands such as, exemplarily four subbands SB1, SB2, SB3 and SB4. Additionally, as schematically illustrated, the subband width increases from lower to higher subbands, i.e., the subband SB4 is broader in frequency than the sub-band SB1. In other embodiments, however, bands having an equal bandwidth can be used as well.

The subbands SB1 to SB4 extend up to the border frequency which is, for example, $f_{CELP}$. Thus, all the subbands below the border frequency $f_{CELP}$ constitute the lower band and the frequency content above the border frequency constitutes the higher band.

Particularly, the LPC analyzer 808 of FIG. 8 typically calculates shaping information for each subband individually. Thus, the LPC analyzer 808 advantageously calculates four different kinds of subband information for the four subbands SB1 to SB4 so that each subband has its associated shaping information.

Furthermore, the shaping is applied by the shaper 804 for each subband SB1 to SB4 using the shaping information calculated for exactly this subband and, importantly, a shaping for the higher band is also done, but the shaping information for the higher band is not being calculated due to the fact that the linear prediction analyzer calculating the shaping information receives a band limited signal band limited to the lower frequency band. Nevertheless, in order to also perform a shaping for the higher frequency band, the shaping information for subband SB4 is used for shaping the higher band. Thus, the shaper 804 is configured to weigh the spectral coefficients of the upper frequency band using a shaping factor calculated for a highest subband of the lower frequency band. The highest subband corresponding to SB4 in FIG. 9 has a highest center frequency among all center frequencies of subbands of the lower frequency band.

Figure 11:
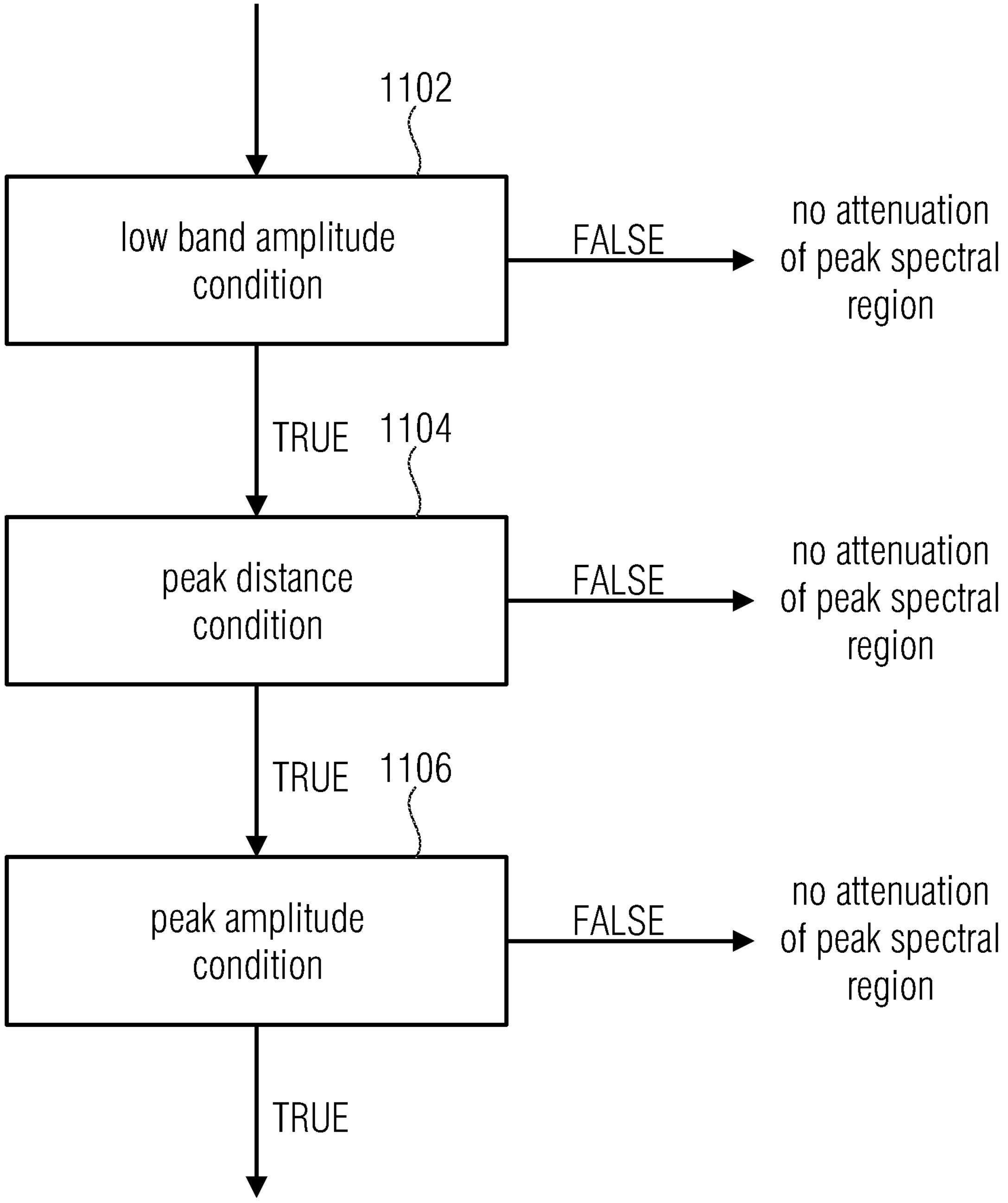
FIG. 11 illustrates a flow chart for illustrating the functionality of the detector for detecting the peak spectral region.

FIG. 11 illustrates an advantageous flowchart for explaining the functionality of the detector 802. Particularly, the detector 802 is configured to determine a peak spectral region in the upper frequency band, when at least one of a group of conditions is true, where the group of conditions comprises a low-band amplitude condition 1102, a peak distance condition 1104 and a peak amplitude condition 1106.

Advantageously, the different conditions are applied in exactly the order illustrated in FIG. 11. In other words, the low-band amplitude condition 1102 is calculated before the peak distance condition 1104, and the peak distance condition is calculated before the peak amplitude condition 1106. In a situation, where all three conditions needs to be true in order to detect the peak spectral region, a computationally efficient detector is obtained by applying the sequential processing in FIG. 11, where, as soon as a certain condition is not true, i.e., is false, the detection process for a certain time frame is stopped and it is determined that an attenuation of a peak spectral region in this time frame is not required. Thus, when it is already determined for a certain time frame that the low-band amplitude condition 1102 is not fulfilled, i.e., is false, then the control proceeds to the decision that an attenuation of a peak spectral region in this time frame is not necessary and the procedure goes on without any additional attenuation. When, however, the controller determines for condition 1102 that same is true, the second condition 1104 is determined. This peak distance condition is once again determined before the peak amplitude 1106 so that the control determines that no attenuation of the peak spectral region is performed, when condition 1104 results in a false result. Only when the peak distance condition 1104 has a true result, the third peak amplitude condition 1106 is determined.

In other embodiments, more or less conditions can be determined, and a sequential or parallel determination can be performed, although the sequential determination as exemplarily illustrated in FIG. 11 is advantageous in order to save computational resources that are particularly valuable in mobile applications that are battery powered.

Figure 12:
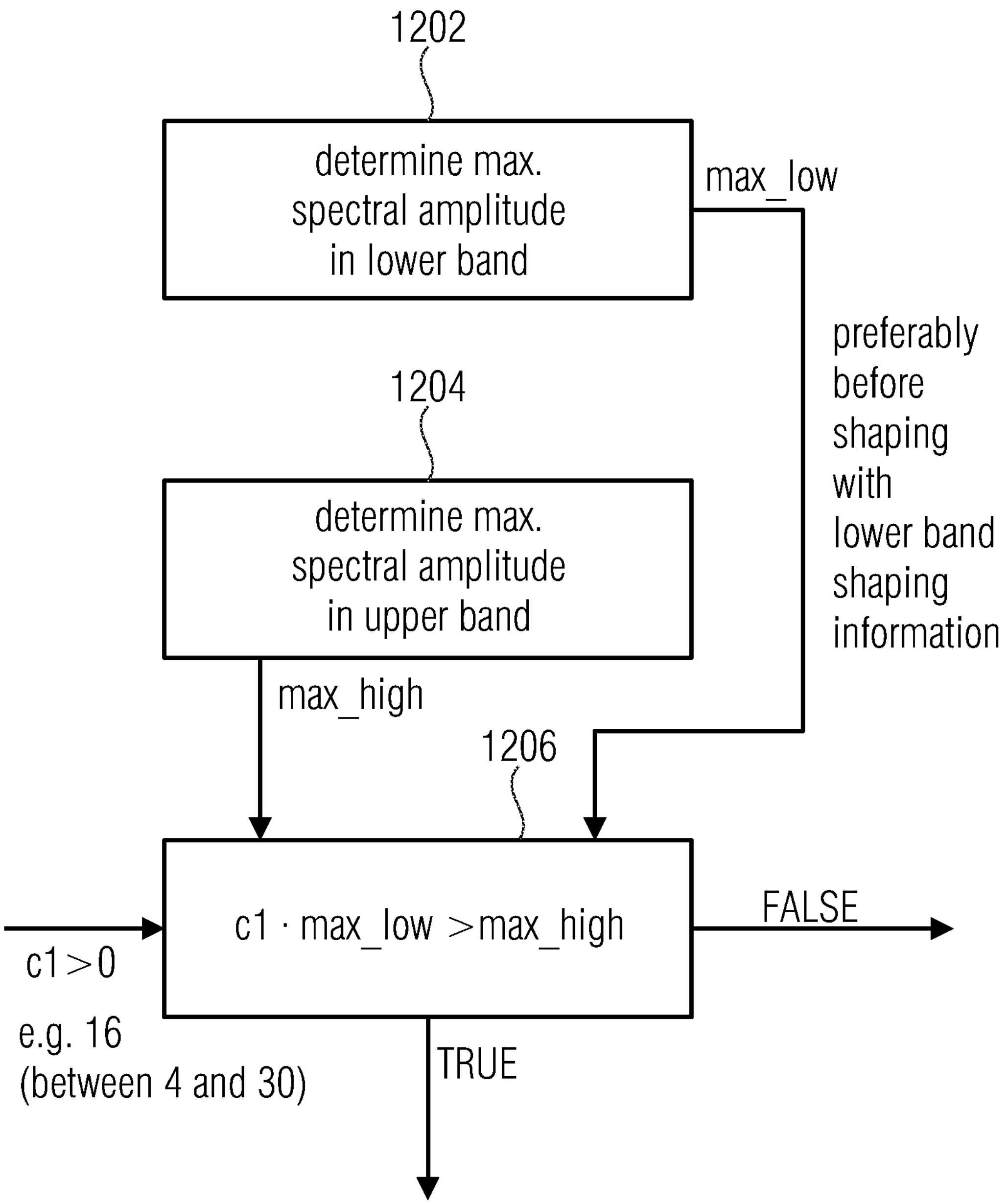
FIG. 12 illustrates an advantageous implementation of the implementation of the low band amplitude condition.
Figure 13:
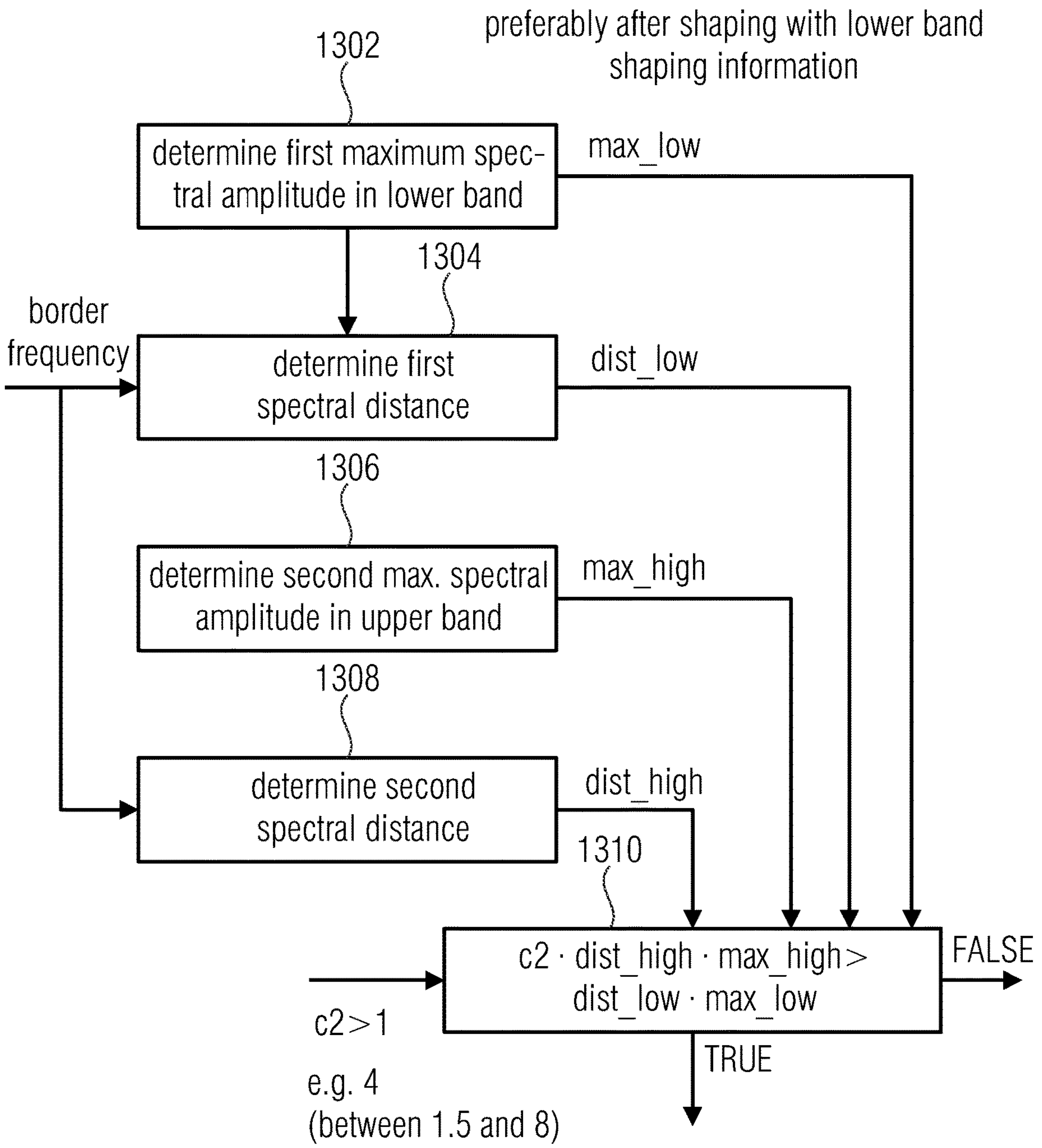
FIG. 13 illustrates an advantageous embodiment of the implementation of the peak distance condition.
Figure 14:
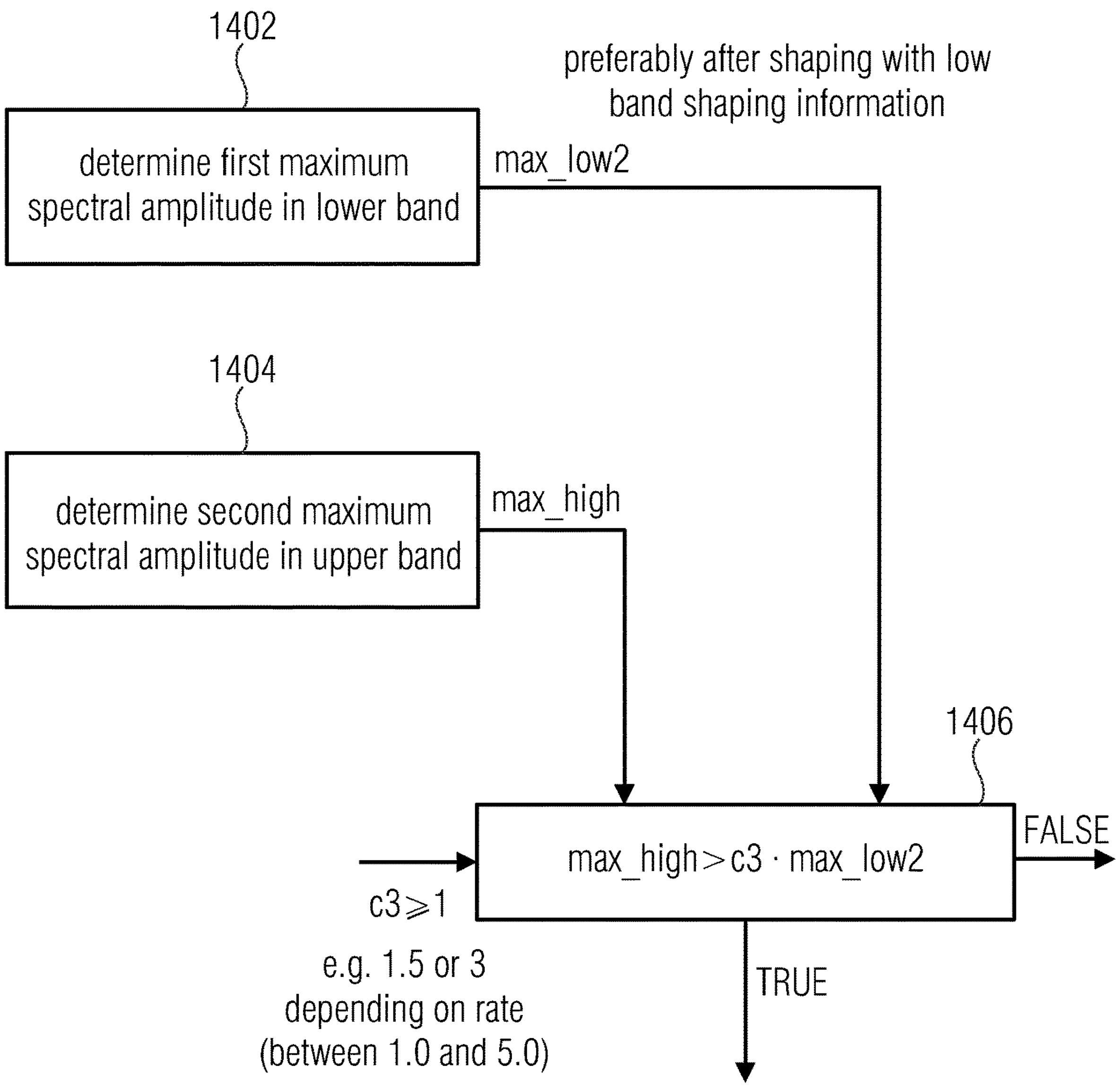
FIG. 14 illustrates an advantageous implementation of the implementation of the peak amplitude condition.

FIGS. 12, 13, 14 provide advantageous embodiments for the conditions 1102, 1104 and 1106.

In the low-band amplitude condition, a maximum spectral amplitude in the lower band is determined as illustrated at block 1202. This value is max low. Furthermore, in block 1204, a maximum spectral amplitude in the upper band is determined that is indicated as max high.

In block 1206, the determined values from blocks 1232 and 1234 are processed advantageously together with a predetermined number $c_1$ in order to obtain the false or true result of condition 1102. Advantageously, the conditions in blocks 1202 and 1204 are performed before shaping with the lower band shaping information, i.e., before the procedure performed by the spectral shaper 804 or, with respect to FIG. 10, 804*a*.

With respect to the predetermined number $c_1$ of FIG. 12 used in block 1206, a value of 16 is advantageous, but values between 4 and 30 have been proven useful as well.

FIG. 13 illustrates an advantageous embodiment of the peak distance condition. In block 1302, a first maximum spectral amplitude in the lower band is determined that is indicated as max_low.

Furthermore, a first spectral distance is determined as illustrated at block 1304. This first spectral distance is indicated as dist_low. Particularly, the first spectral distance is a distance of the first maximum spectral amplitude as determined by block 1302 from a border frequency between a center frequency of the lower frequency band and a center frequency of the upper frequency band. Advantageously, the border frequency is f_celp, but this frequency can have any other value as outlined before.

Furthermore, block 1306 determines a second maximum spectral amplitude in the upper band that is called max_high. Furthermore, a second spectral distance 1308 is determined and indicated as dist_high. The second spectral distance of the second maximum spectral amplitude from the border frequency is once again advantageously determined with spectral f_celp as the border frequency.

Furthermore, in block 1310, it is determined whether the peak distance condition is true, when the first maximum spectral amplitude weighted by the first spectral distance and weighted by a predetermined number being greater than 1 is greater than the second maximum spectral amplitude weighted by the second spectral distance.

Advantageously, a predetermined number $c_2$ is equal to 4 in the most advantageous embodiment. Values between 1.5 and 8 have been proven as useful.

Figure 10:
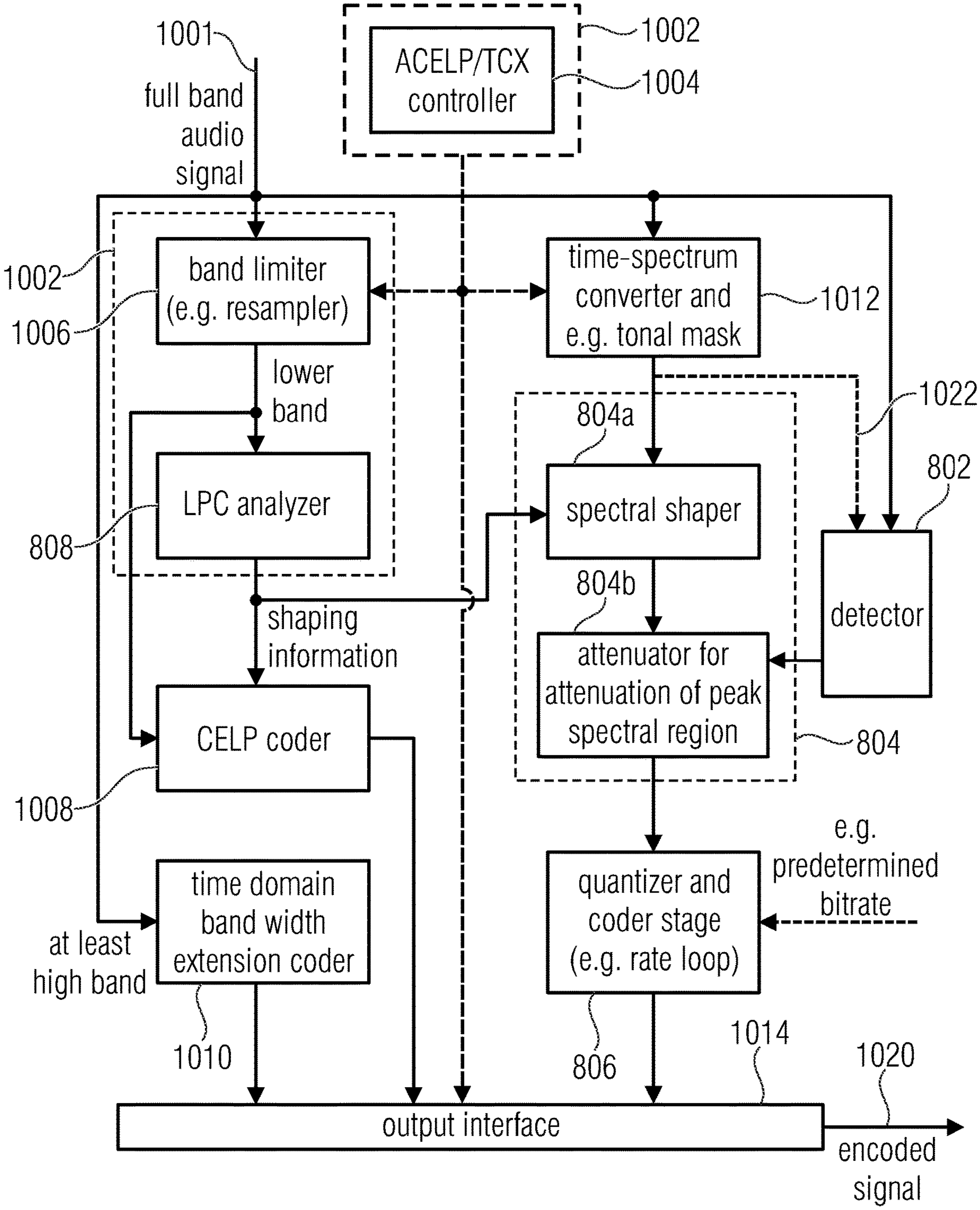
FIG. 10 illustrates an advantageous embodiment of an audio encoder.

Advantageously, the determination in block 1302 and 1306 is performed after shaping with the lower band shaping information, i.e., subsequent to block 804*a*, but, of course, before block 804*b* in FIG. 10.

FIG. 14 illustrates an advantageous implementation of the peak amplitude condition. Particularly, block 1402 determines a first maximum spectral amplitude in the lower band and block 1404 determines a second maximum spectral amplitude in the upper band where the result of block 1402 is indicated as max_low2 and the result of block 1404 is indicated as max_high.

Then, as illustrated in block 1406, the peak amplitude condition is true, when the second maximum spectral amplitude is greater than the first maximum spectral amplitude weighted by a predetermined number $c_3$ being greater than or equal to 1. $c_3$ is advantageously set to a value of 1.5 or to a value of 3 depending on different rates where, generally, values between 1.0 and 5.0 have been proven as useful.

Figure 17:
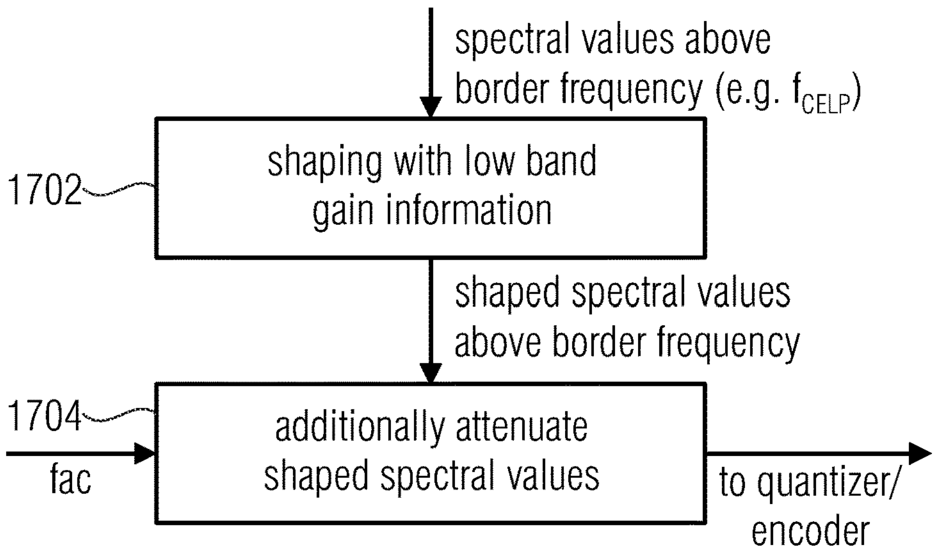
FIG. 17 illustrates an advantageous implementation for applying the low band shaping information to the upper frequency band and the additional attenuation of the shaped spectral values in two subsequent steps.

Furthermore, as indicated in FIG. 14, the determination in blocks 1402 and 1404 takes place after shaping with the low-band shaping information, i.e., subsequent to the processing illustrated in block 804*a* and before the processing illustrated by block 804*b* or, with respect to FIG. 17, subsequent to block 1702 and before block 1704.

In other embodiments, the peak amplitude condition 1106 and, particularly, the procedure in FIG. 14, block 1402 is not determined from the smallest value in the lower frequency band, i.e., the lowest frequency value of the spectrum, but the determination of the first maximum spectral amplitude in the lower band is determined based on a portion of the lower band where the portion extends from a predetermined start frequency until a maximum frequency of the lower frequency band, where the predetermined start frequency is greater than a minimum frequency of the lower frequency band. In an embodiment, the predetermined start frequency is at least 10% of the lower frequency band above the minimum frequency of the lower frequency band or, in other embodiments, the predetermined start frequency is at a frequency being equal to half a maximum frequency of the lower frequency band within a tolerance range of plus or minus 10% of half the maximum frequency.

Furthermore, it is advantageous that the third predetermined number $c_3$ depends on a bitrate to be provided by the quantizer/coder stage, so that the predetermined number is higher for a higher bitrate. In other words, when the bitrate that has to be provided by the quantizer and coder stage 806 is high, then $c_3$ is high, while, when the bitrate is to be determined as low, then the predetermined number $c_3$ is low. When the advantageous equation in block 1406 is considered, it becomes clear that the higher predetermined number $c_3$ is, the peak spectral region is determined more rarely. When, however, $c_3$ is small, then a peak spectral region where there are spectral values to be finally attenuated is determined more often.

Blocks 1202, 1204, 1402, 1404 or 1302 and 1306 determine a spectral amplitude. The determination of the spectral amplitude can be performed differently. One way of the determination of the spectral envelope is the determination of an absolute value of a spectral value of the real spectrum. Alternatively, the spectral amplitude can be a magnitude of a complex spectral value. In other embodiments, the spectral amplitude can be any power of the spectral value of the real spectrum or any power of a magnitude of a complex spectrum, where the power is greater than 1. Advantageously, the power is an integer number, but powers of 1.5 or 2.5 additionally have proven to be useful. Advantageously, nevertheless, powers of 2 or 3 are advantageous.

Generally, the shaper 804 is configured to attenuate at least one spectral value in the detected peak spectral region based on a maximum spectral amplitude in the upper frequency band and/or based on a maximum spectral amplitude in the lower frequency band. In other embodiments, the shaper is configured to determine the maximum spectral amplitude in a portion of the lower frequency band, the portion extending from a predetermined start frequency of the lower frequency band until a maximum frequency of the lower frequency band. The predetermined start frequency is greater than a minimum frequency of the lower frequency band and is advantageously at least 10% of the lower frequency band above the minimum frequency of the lower frequency band or the predetermined start frequency is advantageously at the frequency being equal to half of a maximum frequency of the lower frequency band within a tolerance of plus or minus 10% of half of the maximum frequency.

The shaper furthermore is configured to determine the attenuation factor determining the additional attenuation, where the attenuation factor is derived from the maximum spectral amplitude in the lower frequency band multiplied by a predetermined number being greater than or equal to one and divided by the maximum spectral amplitude in the upper frequency band. To this end, reference is made to block 1602 illustrating the determination of a maximum spectral amplitude in the lower band (advantageously after shaping, i.e., after block 804*a* in FIG. 10 or after block 1702 in FIG. 17).

Figure 16:
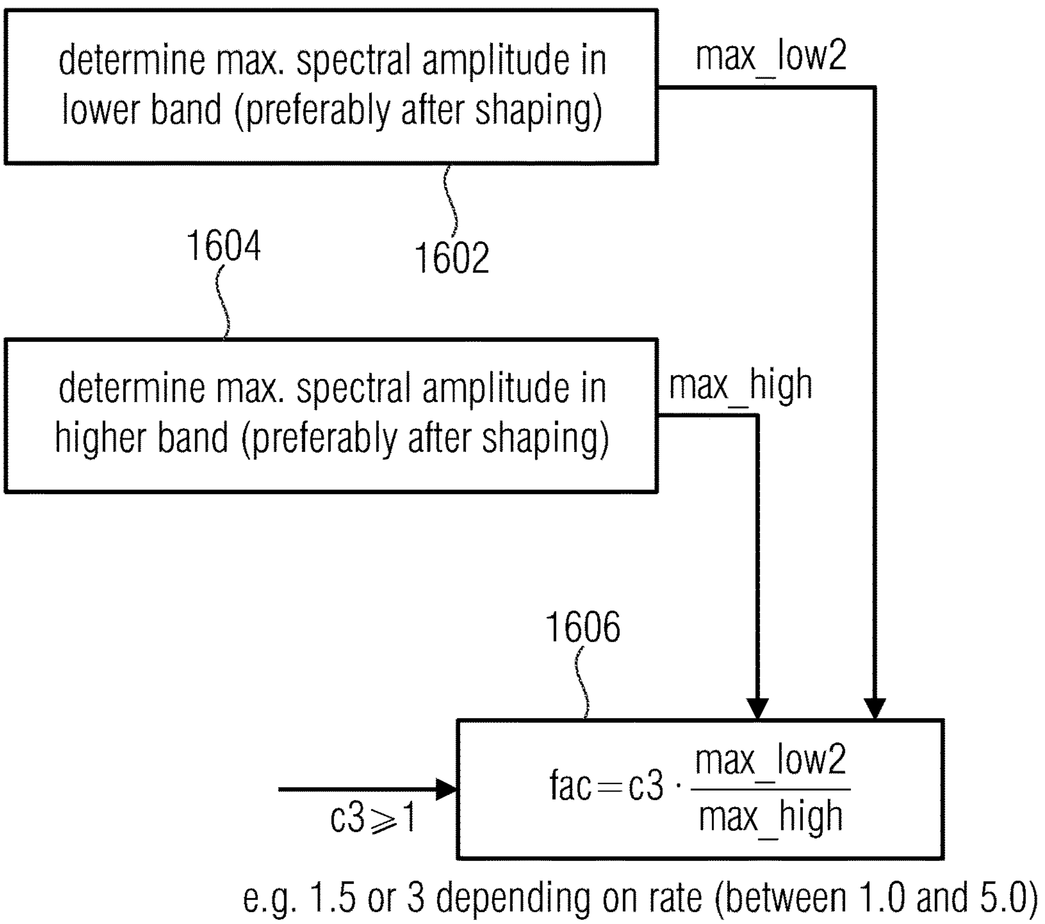
FIG. 16 illustrates a determination procedure for determining the attenuation factor in an advantageous embodiment.

Furthermore, the shaper is configured to determine the maximum spectral amplitude in the higher band, again advantageously after shaping as, for example, is done by block 804*a* in FIG. 10 or block 1702 in FIG. 17. Then, in block 1606, the attenuation factor fac is calculated as illustrated, where the predetermined number $c_3$ is set to be greater than or equal to 1. In embodiments, $c_3$ in FIG. 16 is the same predetermined number $c_3$ as in FIG. 14. However, in other embodiments, $c_3$ in FIG. 16 can be set different from $c_3$ in FIG. 14. Additionally, $c_3$ in FIG. 16 that directly influences the attenuation factor is also dependent on the bitrate so that a higher predetermined number $c_3$ is set for a higher bitrate to be done by the quantizer/coder stage 806 as illustrated in FIG. 8.

FIG. 17 illustrates an advantageous implementation similar to what is shown at FIG. at blocks 804*a* and 804*b*, i.e., that a shaping with the low-band gain information applied to the spectral values above the border frequency such as $f_{celp}$ is performed in order to obtain shaped spectral values above the border frequency and additionally in a following step 1704, the attenuation factor fac as calculated by block 1606 in FIG. 16 is applied in block 1704 of FIG. 17. Thus, FIG. 17 and FIG. 10 illustrate a situation where the shaper is configured to shape the spectral values in the detected spectral region based on a first weighting operation using a portion of the shaping information for the lower frequency band and a second subsequent weighting operation using an attenuation information, i.e., the exemplary attenuation factor fac.

In other embodiments, however, the order of steps in FIG. 17 is reversed so that the first weighting operation takes place using the attenuation information and the second subsequent weighting information takes place using at least a portion of the shaping information for the lower frequency band. Or, alternatively, the shaping is performed using a single weighting operation using a combined weighting information depending and being derived from the attenuation information on the one hand and at least a portion of the shaping information for the lower frequency band on the other hand.

As illustrated in FIG. 17, the additional attenuation information is applied to all the spectral values in the detected peak spectral region. Alternatively, the attenuation factor is only applied to, for example, the highest spectral value or the group of highest spectral values, where the members of the group can range from 2 to 10, for example. Furthermore, embodiments also apply the attenuation factor to all spectral values in the upper frequency band for which the peak spectral region has been detected by the detector for a time frame of the audio signal. Thus, in this embodiment, the same attenuation factor is applied to the whole upper frequency band when only a single spectral value has been determined as a peak spectral region.

When, for a certain frame, no peak spectral region has been detected, then the lower frequency band and the upper frequency band are shaped by the shaper without any additional attenuation. Thus, a switching over from time frame to time frame is performed, where, depending on the implementation, some kind of smoothing of the attenuation information is advantageous.

Figure 15A:
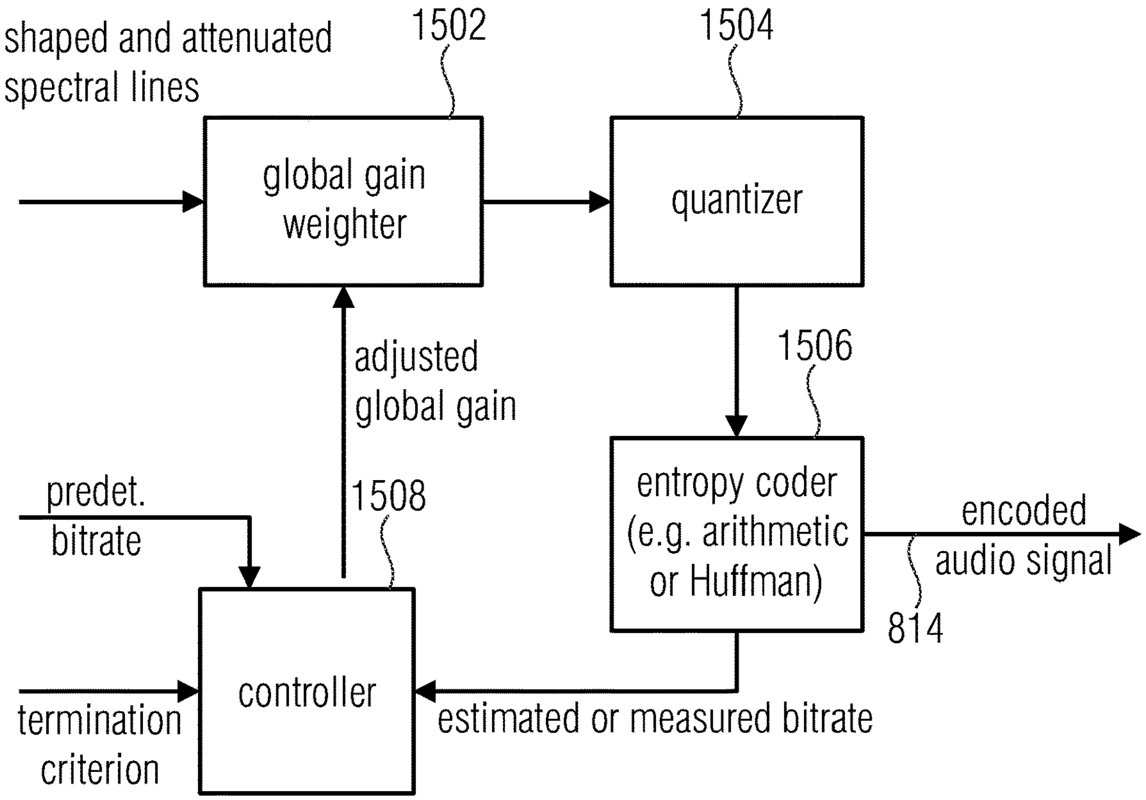
FIG. 15*a* illustrates an advantageous implementation of the quantizer and coder stage.
Figure 15B:
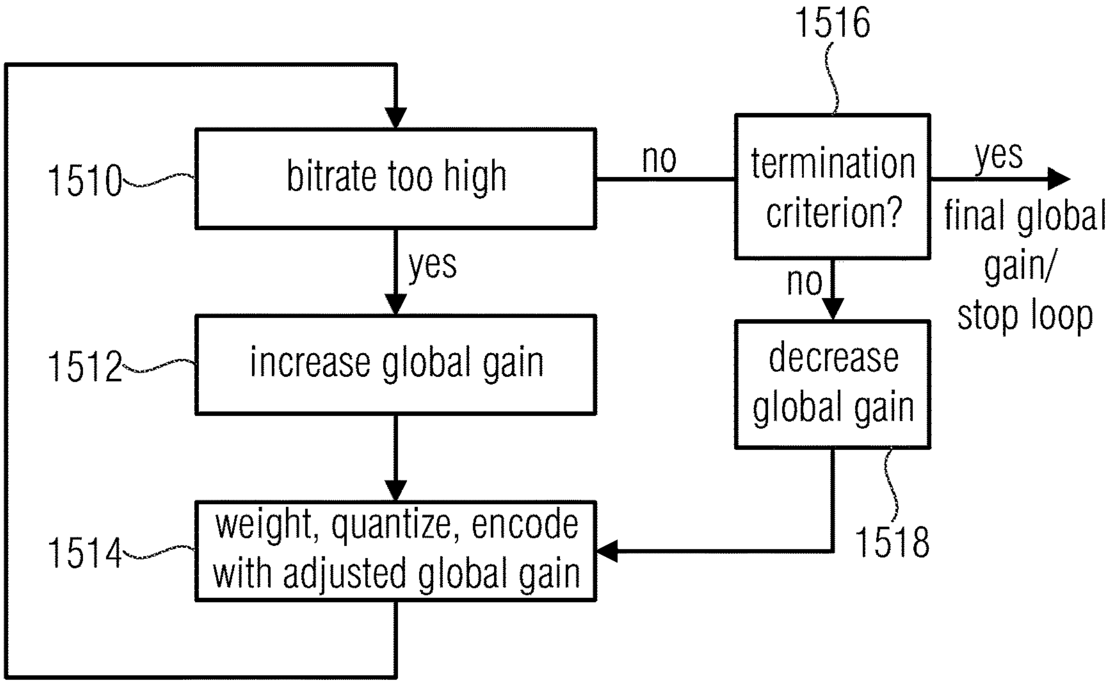
FIG. 15*b* illustrates a flow chart for illustrating the operation of the quantizer and coder stage as a rate loop processor.

Advantageously, the quantizer and encoder stage comprise a rate loop processor as illustrated in FIG. 15*a* and FIG. 15*b*. In an embodiment, the quantizer and coder stage 806 comprises a global gain weighter 1502, a quantizer 1504 and an entropy coder such as an arithmetic or Huffman coder 1506. Furthermore, the entropy coder 1506 provides, for a certain set of quantized values for a time frame, an estimated or measured bitrate to a controller 1508.

The controller 1508 is configured to receive a loop termination criterion on the one hand and/or a predetermined bitrate information on the other hand. As soon as the controller 1508 determines that a predetermined bitrate is not obtained and/or a termination criterion is not fulfilled, then the controller provides an adjusted global gain to the global gain weighter 1502. Then, the global gain weighter applies the adjusted global gain to the shaped and attenuated spectral lines of a time frame. The global gain weighted output of block 1502 is provided to the quantizer 1504 and the quantized result is provided to the entropy encoder 1506 that once again determines an estimated or measured bitrate for the data weighted with the adjusted global gain. In case the termination criterion is fulfilled and/or the predetermined bitrate is fulfilled, then the encoded audio signal is output at output line 814. When, however, the predetermined bitrate is not obtained or a termination criterion is not fulfilled, then the loop starts again. This is illustrated in more detail in FIG. 15*b*.

When the controller 1508 determines that the bitrate is too high as illustrated in block 1510, then a global gain is increased as illustrated in block 1512. Thus, all shaped and attenuated spectral lines become smaller since they are divided by the increased global gain and the quantizer then quantizes the smaller spectral values so that the entropy coder results in a smaller number of bits that may be used for this time frame. Thus, the procedures of weighting, quantizing, and encoding is performed with the adjusted global gain as illustrated in block 1514 in FIG. 15*b*, and, then, once again it is determined whether the bitrate is too high. If the bitrate is still too high, then once again blocks 1512 and 1514 are performed. When, however, it is determined that the bitrate is not too high, the control proceeds to step 1516 that outlines, whether a termination criterion is fulfilled. When the termination criterion is fulfilled, the rate loop is stopped and the final global gain is additionally introduced into the encoded signal via an output interface such as the output interface 1014 of FIG. 10.

When, however, it is determined that the termination criterion is not fulfilled, then the global gain is decreased as illustrated in block 1518 so that, in the end, the maximum bitrate allowed is used. This makes sure that time frames that are easy to encode are encoded with a higher precision, i.e., with less loss. Therefore, for such instances, the global gain is decreased as illustrated in block 1518 and step 1514 is performed with the decreased global gain and step 1510 is performed in order to look whether the resulting bitrate is too high or not.

Naturally, the specific implementation regarding the global gain increase or decrease increment can be set as need be. Additionally, the controller 1508 can be implemented to either have blocks 1510, 1512 and 1514 or to have blocks 1510, 1516, 1518 and 1514. Thus, depending on the implementation, and also depending on the starting value for the global gain, the procedure can be such that, from a very high global gain it is started until the lowest global gain that still fulfills the bit-rate requirements is found. On the other hand, the procedure can be done in such a way in that it is started from a quite low global gain and the global gain is increased until an allowable bitrate is obtained. Additionally, as illustrated in FIG. 15*b*, even a mix between both procedures can be applied as well.

FIG. 10 illustrates the embedding of the inventive audio encoder consisting of blocks 802, 804*a*, 804*b* and 806 within a switched time domain/frequency domain encoder setting.

Particularly, the audio encoder comprises a common processor. The common processor consists of an ACELP/TCX controller 1004 and the band limiter such as a resampler 1006 and an LPC analyzer 808. This is illustrated by the hatched boxes indicated by 1002.

Furthermore, the band limiter feeds the LPC analyzer that has already been discussed with respect to FIG. 8. Then, the LPC shaping information generated by the LPC analyzer 808 is forwarded to a CELP coder 1008 and the output of the CELP coder 1008 is input into an output interface 1014 that generates the finally encoded signal 1020. Furthermore, the time domain coding branch consisting of coder 1008 additionally comprises a time domain bandwidth extension coder 1010 that provides information and, typically, parametric information such as spectral envelope information for at least the high band of the full band audio signal input at input 1001. Advantageously, the high band processed by the time domain band width extension coder 1010 is a band starting at the border frequency that is also used by the band limiter 1006. Thus, the band limiter performs a low pass filtering in order to obtain the lower band and the high band filtered out by the low pass band limiter 1006 is processed by the time domain band width extension coder 1010.

On the other hand, the spectral domain or TCX coding branch comprises a time-spectrum converter 1012 and exemplarily, a tonal mask as discussed before in order to obtain a gap-filling encoder processing.

Then, the result of the time-spectrum converter 1012 and the additional optional tonal mask processing is input into a spectral shaper 804*a* and the result of the spectral shaper 804*a* is input into an attenuator 804*b*. The attenuator 804*b* is controlled by the detector 802 that performs a detection either using the time domain data or using the output of the time-spectrum convertor block 1012 as illustrated at 1022. Blocks 804*a* and 804*b* together implement the shaper 804 of FIG. 8 as has been discussed previously. The result of block 804 is input into the quantizer and coder stage 806 that is, in a certain embodiment, controlled by a predetermined bitrate. Additionally, when the predetermined numbers applied by the detector also depend on the predetermined bitrate, then the predetermined bitrate is also input into the detector 802 (not shown in FIG. 10).

Thus, the encoded signal 1020 receives data from the quantizer and coder stage, control information from the controller 1004, information from the CELP coder 1008 and information from the time domain bandwidth extension coder 1010.

Subsequently, advantageous embodiments of the present invention are discussed in even more detail.

An option, which saves interoperability and backward compatibility to existing implementations is to do an encoder-side pre-processing. The algorithm, as explained subsequently, analyzes the MDCT spectrum. In case significant signal components below $f_{CELP}$ are present and high peaks above $f_{CELP}$ are found, which potentially destroy the coding of the complete spectrum in the rate loop, these peaks above $f_{CELP}$ are attenuated. Although the attenuation can not be reverted on decoder-side, the resulting decoded signal is perceptually significantly more pleasant than before, where huge parts of the spectrum were zeroed out completely.

The attenuation reduces the focus of the rate loop on the peaks above $f_{CELP}$ and allows that significant low-frequency MDCT coefficients survive the rate loop.

The following algorithm describes the encoder-side pre-processing:

1) Detection of low-band content (e.g. 1102):

The detection of low-band content analyzes, whether significant low-band signal portions are present. For this, the maximum amplitude of the MDCT spectrum below and above $f_{CELP}$ are searched on the MDCT spectrum before the application of inverse LPC shape gains. The search procedure returns the following values:

a) max_low_pre: The maximum MDCT coefficient below $f_{CELP}$, evaluated on the spectrum of absolute values before the application of inverse LPC shaping gains b) max_high_pre: The maximum MDCT coefficient above $f_{CELP}$, evaluated on the spectrum of absolute values before the application of inverse LPC shaping gains For the decision, the following condition is evaluated:

Condition 1: $c_1$*max_low_pre>max_high_pre

If Condition 1 is true, a significant amount of low-band content is assumed, and the pre-processing is continued; If Condition 1 is false, the pre-processing is aborted. This makes sure that no damage is applied to high-band only signals, e.g. a sine-sweep when above $f_{CELP}$ Pseudo-code:

```
max_low_pre=0;
for(i=0; i<L_TCX^(cELP); i++)
{
tmp=fabs(X_M(i));
if(tmp>max_low_pre)
{
  max_low_pre=tmp;
}
}
max_high_pre=0;
for(i=0; i<L_TCX^(BW)-L_TCX^(cELP); i++)
{
tmp=fabs(X_M(L_TCX^(cELP)+i));
if(tmp>max_high_pre)
{
  max_high_pre=tmp;
}
}
```

```
if(c1*max_low_pre>max_high_pre)
{
/* continue with pre-processing */
. . .
}
```

where $X_M$ is the MDCT spectrum before application of the inverse LPC gain shaping, $L_{TCX}^{(cELP)}$ is the number of MDCT coefficients up to $f_{CELP}$ $L_{TCX}^{(BW)}$ is the number of MDCT coefficients for the full MDCT spectrum In an example implementation $c_1$ is set to 16, and fabs returns the absolute value.

2) Evaluation of peak-distance metric (e.g. 1104):

A peak-distance metric analyzes the impact of spectral peaks above $f_{CELP}$, on the arithmetic coder. Thus, the maximum amplitude of the MDCT spectrum below and above $f_{CELP}$, are searched on the MDCT spectrum after the application of inverse LPC shaping gains, i.e. in the domain where also the arithmetic coder is applied. In addition to the maximum amplitude, also the distance from $f_{CELP}$ is evaluated. The search procedure returns the following values:

a) max_low: The maximum MDCT coefficient below $f_{CELP}$, evaluated on the spectrum of absolute values after the application of inverse LPC shaping gains b) dist_low: The distance of max_low from $f_{CELP}$ c) max_high: The maximum MDCT coefficient above $f_{CELP}$, evaluated on the spectrum of absolute values after the application of inverse LPC shaping gains d) dist_high: The distance of max_high from $f_{CELP}$ For the decision, the following condition is evaluated:

Condition 2: $c_2$*dist_high*max_high>dist_low*max_low

If Condition 2 is true, a significant stress for the arithmetic coder is assumed, due to either a very high spectral peak or a high frequency of this peak. The high peak will dominate the coding-process in the Rate loop, the high frequency will penalize the arithmetic coder, since the arithmetic coder runs from low to high frequencies, i.e. higher frequencies are inefficient to code. If Condition 2 is true, the pre-processing is continued. If Condition 2 is false, the pre-processing is aborted.

```
max_low=0;
dist_low=0;
for(i=0; i<L_TCX^(cELP); i++)
{
tmp=fabs(X̃_M(L_TCX^(cELP)-1-i));
if(tmp>max_low)
{
  max_low=tmp;
  dist_low=i;
}
}
max_high=0;
dist_high=0;
for(i=0; i<L_TCX^(BW)-L_TCX^(CELP), i++)
{
tmp=fabs(X̃_M(L_TCX^(cELP)+i));
if(tmp>max_high)
{
  max_high=tmp;
  dist_high=i;
}
}
if(c2*dist_high*max_high>dist_low*max_low)
{
/* continue with pre-processing */
. . .
}
```

where $\tilde{X}_M$ is the MDCT spectrum after application of the inverse LPC gain shaping, $L_{TCX}^{(cELP)}$ is the number of MDCT coefficients up to $f_{CELP}$ $L_{TCX}^{(BW)}$ is the number of MDCT coefficients for the full MDCT spectrum In an example implementation $c_2$ is set to 4.

3) Comparison of peak-amplitude (e.g. 1106):

Finally, the peak-amplitudes in psycho-acoustically similar spectral regions are compared. Thus, the maximum amplitude of the MDCT spectrum below and above $f_{CELP}$ are searched on the MDCT spectrum after the application of inverse LPC shaping gains. The maximum amplitude of the MDCT spectrum below $f_{CELP}$, is not searched for the full spectrum, but only starting at $f_{low}$>0 Hz. This is to discard the lowest frequencies, which are psycho-acoustically most important and usually have the highest amplitude after the application of inverse LPC shaping gains, and to only compare components with a similar psycho-acoustical importance. The search procedure returns the following values:

a) max_low2: The maximum MDCT coefficient below $f_{CELP}$, evaluated on the spectrum of absolute values after the application of inverse LPC shaping gains starting from $f_{low}$ b) max high: The maximum MDCT coefficient above $f_{CELP}$, evaluated on the spectrum of absolute values after the application of inverse LPC shaping gains For the decision, the following condition is evaluated:

Condition 3: max_high>$c_3$*max_low2

If condition 3 is true, spectral coefficients above $f_{CELP}$, are assumed, which have significantly higher amplitudes than just below $f_{CELP}$, and which are assumed costly to encode. The constant $c_3$ defines a maximum gain, which is a tuning parameter. If Condition 2 is true, the pre-processing is continued. If Condition 2 is false, the pre-processing is aborted.

Pseudo-code:

```
max_low2=0;
for(i=L_low, i<L_TCX^(CELP); i++)
}
tmp=fabs(X̃_M(i));
if(tmp>max_low2)
{
  max_low2=tmp;
}
}
max_high=0;
for(i=0; i<L_TCX^(BW)-L_TCX^(cELP); i++)
{
tmp=fabs(gm(L-rcx (cELP)+i));
if(tmp>max_high)
{
  max_high=tmp;
}
}
if(max_high>c3*max_low2)
{
/* continue with pre-processing */
. . .
}
```

where $L_{low}$ is a offset corresponding to flow $\tilde{X}_M$ is the MDCT spectrum after application of the inverse LPC gain shaping, $L_{TCX}^{(CELP)}$ is the number of MDCT coefficients up to $f_{CELP}$ $L_{TCX}^{(BW)}$ is the number of MDCT coefficients for the full MDCT spectrum In an example implementation $f_{low}$ is set to $L_{TCX}^{(cELP)}/2$. In an example implementation $c_3$ is set to 1.5 for low bitrates and set to 3.0 for high bitrates.

4) Attenuation of high peaks above $f_{CELP}$ (e.g. FIGS. 16 and 17):

If condition 1-3 are found to be true, an attenuation of the peaks above $f_{CELP}$ is applied. The attenuation allows a maximum gain $c_3$ compared to a psycho-acoustically similar spectral region. The attenuation factor is calculated as follows:

attenuation_factor=$c_3$*max_low2/max_high

Figure 1:
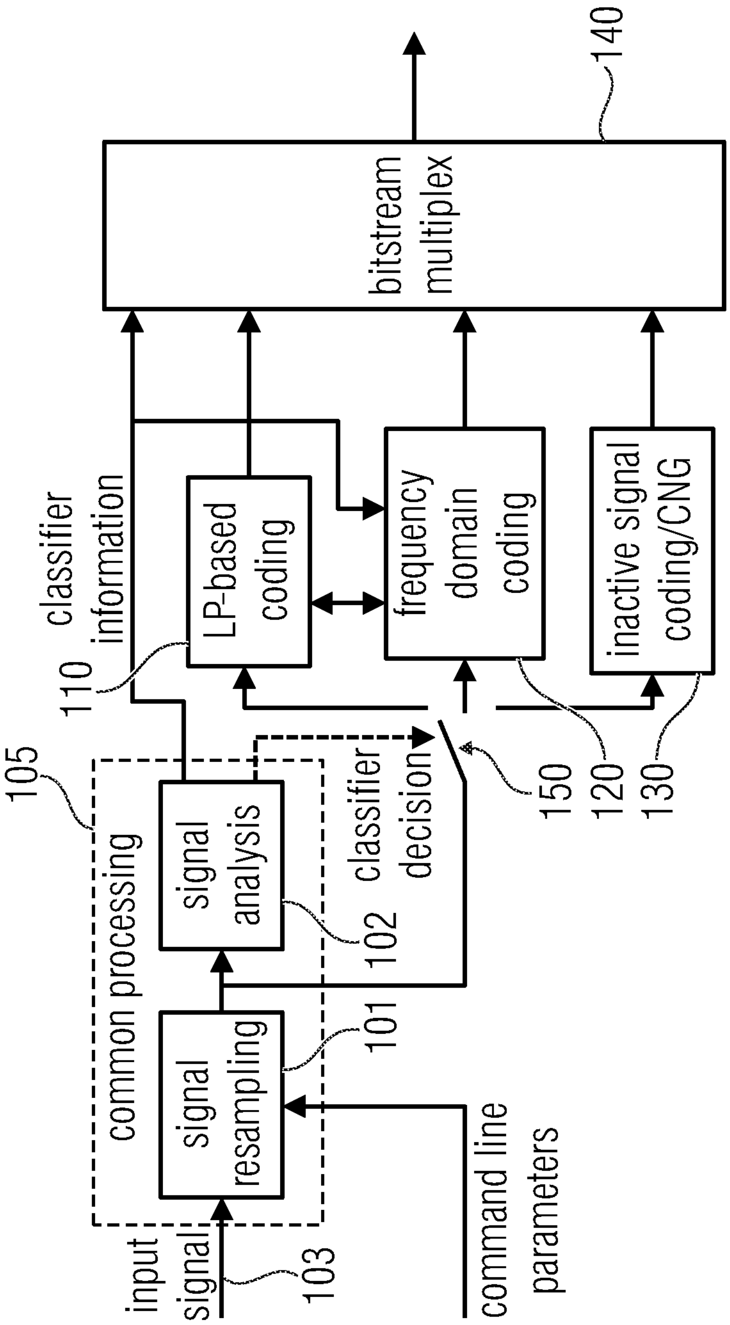
FIG. 1 illustrates a common processing and different coding schemes in EVS.
Figure 2:
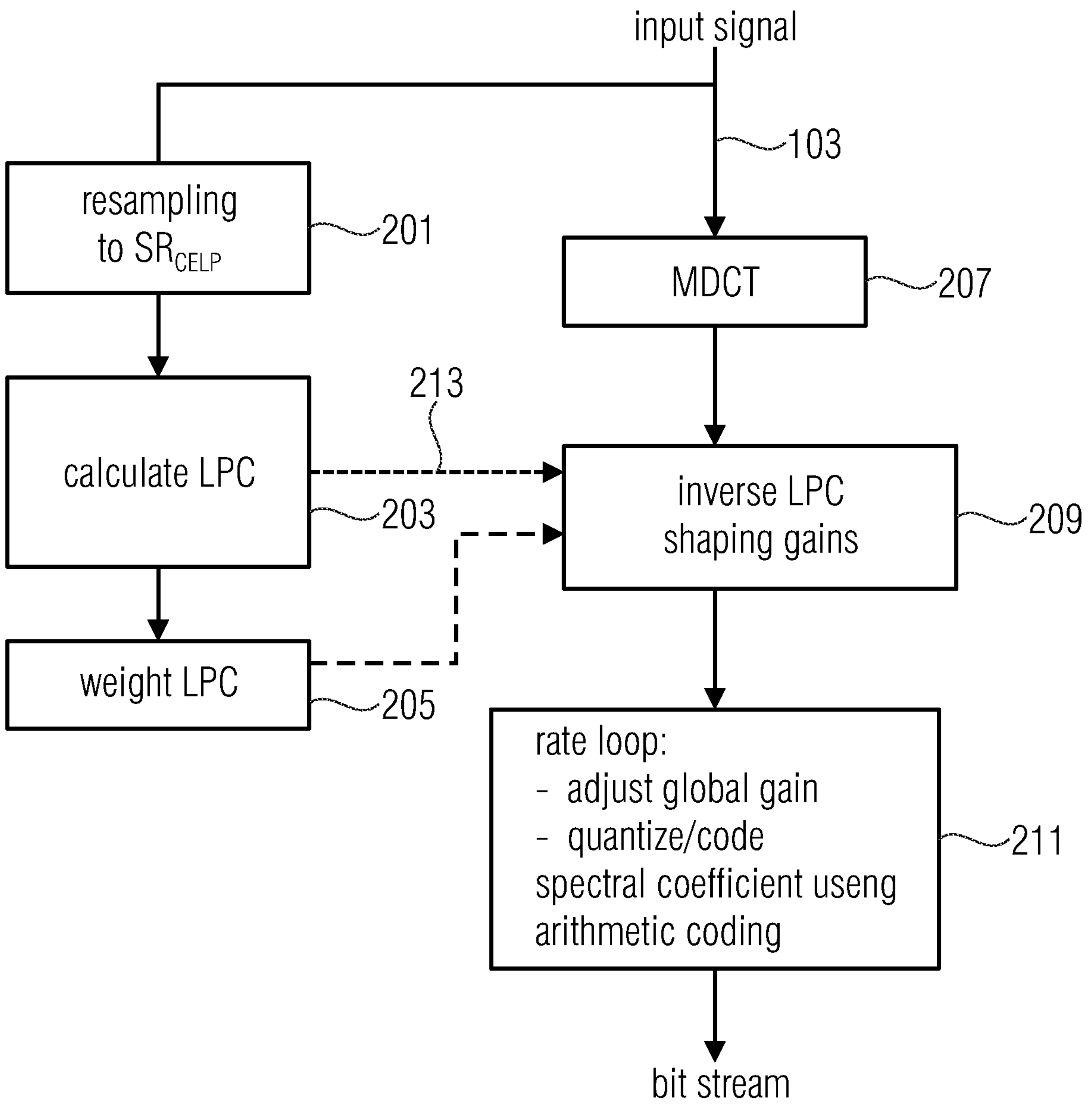
FIG. 2 illustrates a principle of noise-shaping and coding in the TCX on the encoder-side.
Figure 3:
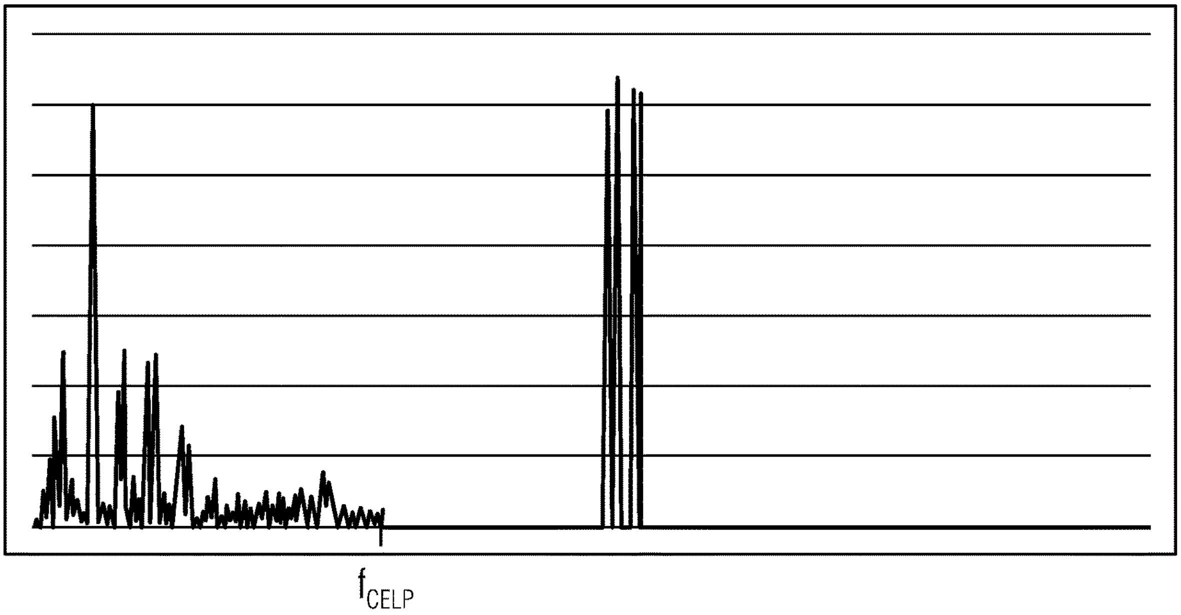
FIG. 3 illustrates an MDCT spectrum of a critical frame before the application of inverse LPC shaping gains.
Figure 4:
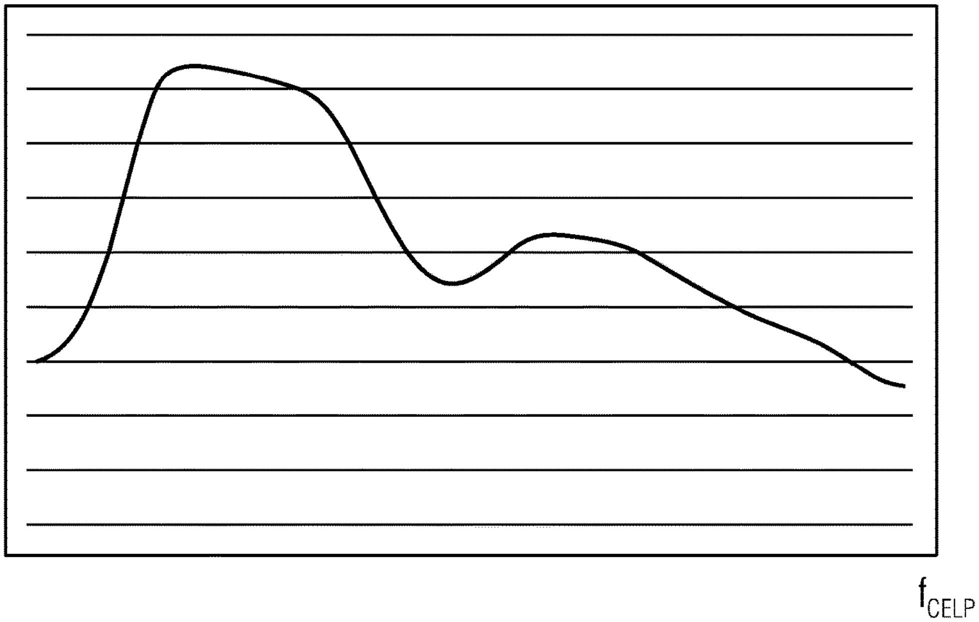
FIG. 4 illustrates the situation of FIG. 3, but with the LPC shaping gains applied.
Figure 5:
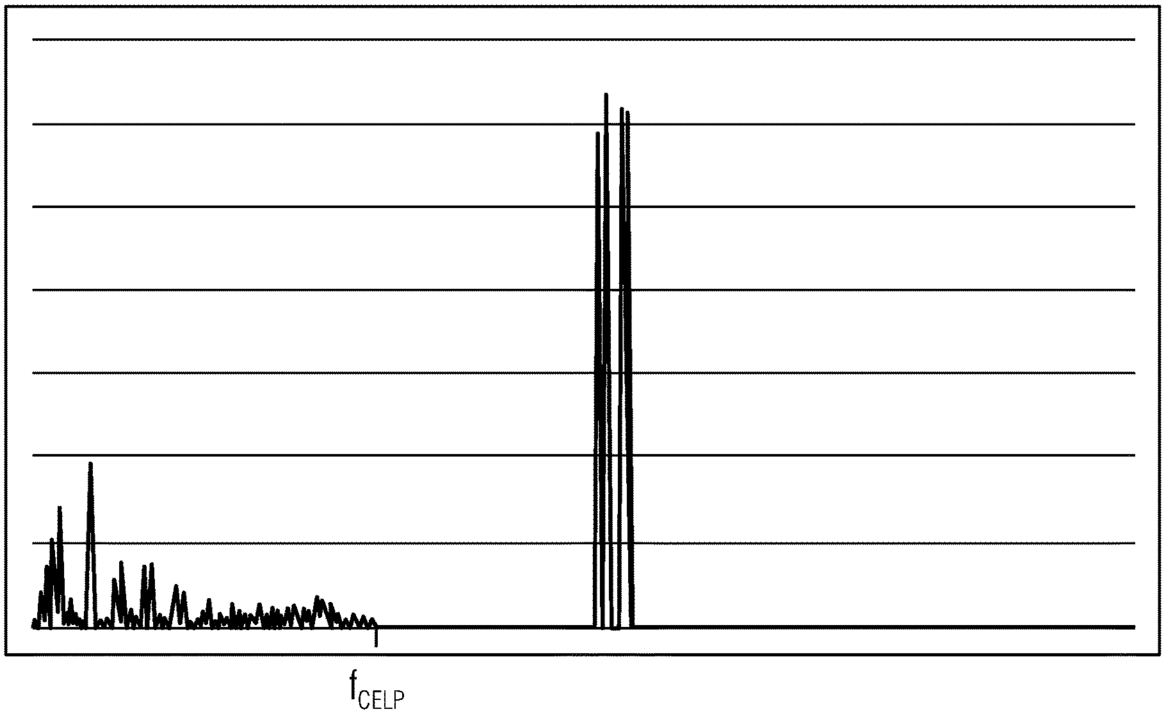
FIG. 5 illustrates an MDCT spectrum of a critical frame after the application of inverse LPC shaping gains, where the high peaks above $f_{CELP}$ are clearly visible.
Figure 6:
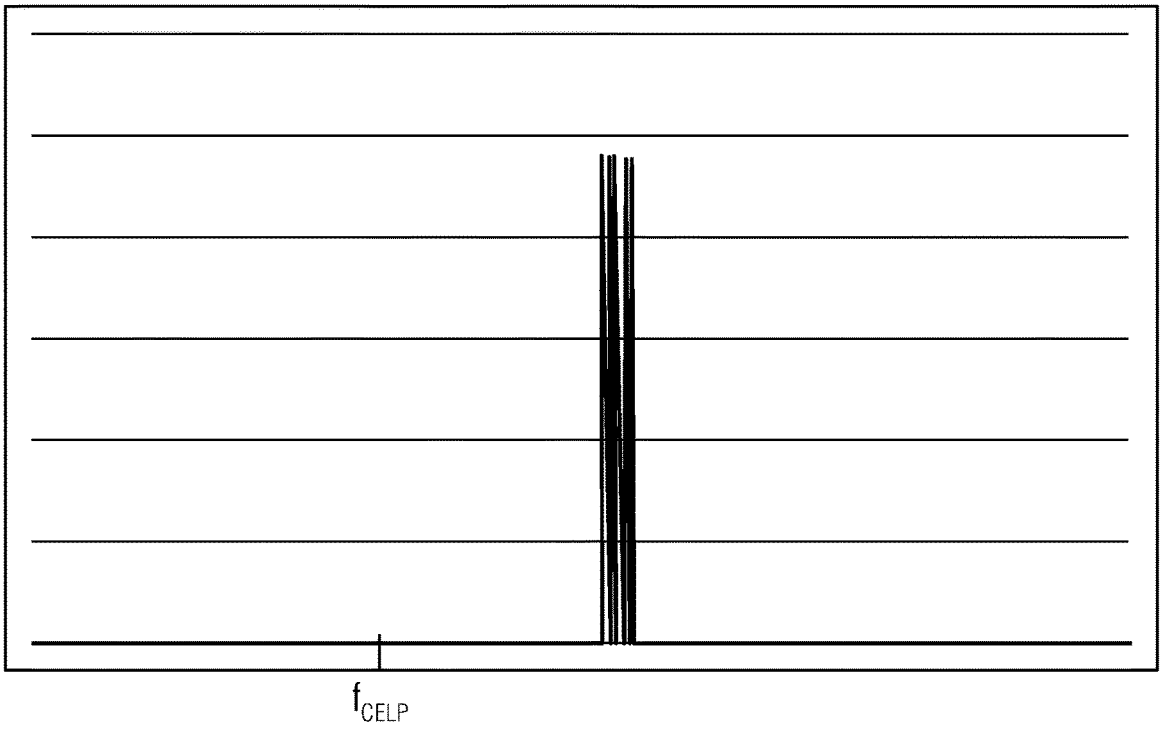
FIG. 6 illustrates an MDCT spectrum of a critical frame after quantization only having high pass information and not having any low pass information.
Figure 7:
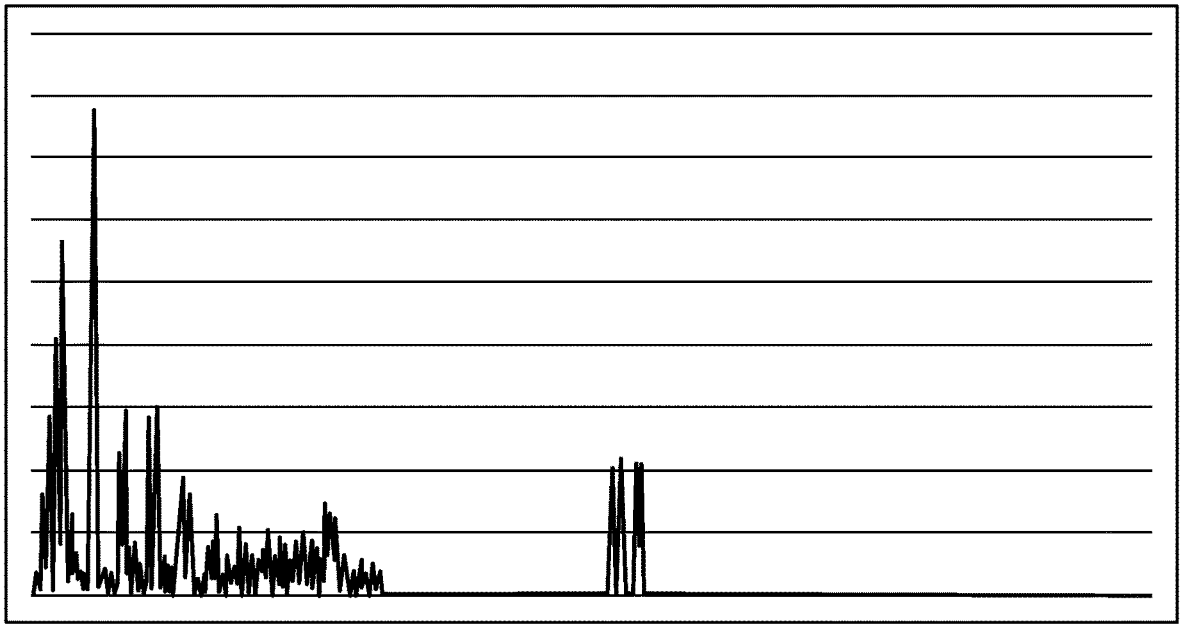
FIG. 7 illustrates an MDCT spectrum of a critical frame after the application of inverse LPC shaping gains and the inventive encoder-side pre-processing.

The attenuation factor is subsequently applied to all MDCT coefficients above $f_{CELP}$ Pseudo-code:

```
if((c1*max_low_pre>max_high_pre) &&
(c2*dist_high*max_high>dist_low*max low) &&
(max_high>c3*max_low2)
)
{
fac=c3*max_low2/max_high,
for(i=L_TCX^(cELP); i<L_TCX^(BW), 1++)
{
   X̃_M(i)=X̃_M(i)*fac;
}
}
5)
```

where $\tilde{X}_M$ is the MDCT spectrum after application of the inverse LPC gain shaping, $L_{TCX}^{(cELP)}$ is the number of MDCT coefficients up to $f_{CELP}$ $L_{TCX}^{(BW)}$ is the number of MDCT coefficients for the full MDCT spectrum The encoder-side pre-processing significantly reduces the stress for the coding-loop while still maintaining relevant spectral coefficients above $f_{CELP}$ FIG. 7 illustrates an MDCT spectrum of a critical frame after the application of inverse LPC shaping gains and above described encoder-side pre-processing. Dependent on the numerical values chosen for $c_1$, $c_2$ and $c_3$ the resulting spectrum, which is subsequently fed into the rate loop, might look as above. They are significantly reduced, but still likely to survive the rate loop, without consuming all available bits.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

The inventive encoded audio signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a non-transitory storage medium or a digital storage medium, for example a floppy disk, a DVD, a Blu-Ray, a CD, a ROM, a PROM, an EPROM, an EEPROM ora FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

In the foregoing description, it can be seen that various features are grouped together in embodiments for the purpose of streamlining the disclosure. This method of disclosure is not to be interpreted as reflecting an intention that the claimed embodiments may use more features than are expressly recited in each claim. Rather, as the following claims reflect, inventive subject matter may lie in less than all features of a single disclosed embodiment. Thus the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim or a combination of each feature with other dependent or independent claims. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

Furthermore, in some embodiments a single step may include or may be broken into multiple sub steps. Such sub steps may be included and part of the disclosure of this single step unless explicitly excluded.

REFERENCES

[1] 3GPP TS 26.445 —Codec for Enhanced Voice Services (EVS); Detailed algorithmic description

Annex

Subsequently, portions of the above standard release 13 (3GPP TS 26.445 —Codec for Enhanced Voice Services (EVS); Detailed algorithmic description) are indicated. Section 5.3. .3.2.3 describes an advantageous embodiment of the shaper, section 5.3.3.2.7 describes an advantageous embodiment of the quantizer from the quantizer and coder stage, and section 5.3.3.2.8 describes an arithmetic coder in an advantageous embodiment of the coder in the quantizer and coder stage, wherein the advantageous rate loop for the constant bit rate and the global gain is described in section 5.3.2.8.1.2. The IGF features of the advantageous embodiment are described in section 5.3.3.2.11, where specific reference is made to section 5.3.3.2.11.5.1 IGF tonal mask calculation. Other portions of the standard are incorporated by reference herein.

5.3.3.2.3 LPC shaping in MDCT domain 5.3.3.2.3.1 General Principle

LPC shaping is performed in the MDCT domain by applying gain factors computed from weighted quantized LP filter coefficients to the MDCT spectrum. The input sampling rate $sr_{inp}$, on which the MDCT transform is based, can be higher than the CELP sampling rate $sr_{celp}$, for which LP coefficients are computed. Therefore LPC shaping gains can only be computed for the part of the MDCT spectrum corresponding to the CELP frequency range. For the remaining part of the spectrum (if any) the shaping gain of the highest frequency band is used.

5.3.3.2.3.2 Computation of LPC shaping gains

To compute the 64 LPC shaping gains the weighted LP filter coefficients a are first transformed into the frequency domain using an oddly stacked DFT of length 128:

$$X_{LPC}(b)=\sum_{i=0}^{16}\tilde{a}(i)e^{-j\frac{\pi}{128}(2b+1)i} \tag{1}$$

The LPC shaping gains $g_{LPC}$ are then computed as the reciprocal absolute values of $x_{LPC}$:

$$g_{LPC}(b)=\frac{1}{|X_{LPC}(b)|},\ b=0\ \ldots\ 63 \tag{2}$$

5.3.3.2.3.3 Applying LPC shaping gains to MDCT spectrum The MDCT coefficients $x_M$ corresponding to the CELP frequency range are grouped into 64 sub-bands. The coefficients of each sub-band are multiplied by the reciprocal of the corresponding LPC shaping gain to obtain the shaped spectrum $\tilde{X}_M$. If the number of MDCT bins corresponding to the CELP frequency range $L_{TCX}^{(celp)}$ is not a multiple of 64, the width of sub-bands varies by one bin as defined by the following pseudo-code:

$w=\lfloor L_{TCX}^{(celp)}/64\rfloor, r=L_{TCX}^{(celp)}-64w$ if $r=0$ then $s=1, w_1=w_2=w$ else if $r\le 32$ then $s=\lfloor 64/r\rfloor, w_1=w, w_2=w+1$ else $s=\lfloor 641(64-r)\rfloor, w_1=w+1, w_2=w$

```
i=0
for j=0, . . . ,63
{
if j mod s=0 then
w=w1
else
w=w2
for 1=0, . . . , min(w,L_TCX^(celp)−i)−1
{
X̃_M(i)=X_M (i)/g_LPC(j)
```

i=i+1
}
}

The remaining MDCT coefficients above the CELP frequency range (if any) are multiplied by the reciprocal of the last LPC shaping gain:

$$\tilde{X}_M(i) = \frac{X_M(i)}{g_{LPC}(63)},\ i = L_{TCX}^{(celp)} \ldots L_{TCX}^{(bw)} - 1 \quad (3)$$

5.3.3.2.4 Adaptive low frequency emphasis 5.3.3.2.4.1 General Principle

The purpose of the adaptive low-frequency emphasis and de-emphasis (ALFE) processes is to improve the subjective performance of the frequency-domain TCX codec at low frequencies. To this end, the low-frequency MDCT spectral lines are amplified prior to quantization in the encoder, thereby increasing their quantization SNR, and this boosting is undone prior to the inverse MDCT process in the internal and external decoders to prevent amplification artifacts.

There are two different ALFE algorithms which are selected consistently in encoder and decoder based on the choice of arithmetic coding algorithm and bit-rate. ALFE algorithm 1 is used at 9.6 kbps (envelope based arithmetic coder) and at 48 kbps and above (context based arithmetic coder). ALFE algorithm 2 is used from 13.2 up to incl. 32 kbps. In the encoder, the ALFE operates on the spectral lines in vector x[ ] directly before (algorithm 1) or after (algorithm 2) every MDCT quantizetion, which runs multiple times inside a rate-loop in case of the context based arithmetic coder (see subclause 5.3.3.2.8.1).

5.3.3.2.4.2 Adaptive emphasis algorithm 1

ALFE algorithm 1 operates based on the LPC frequency-band gains, IpcGains[ ]. First, the minimum and maximum of the first nine gains—the low-frequency (LF) gains—are found using comparison operations executed within a loop over the gain indices 0 to 8.

Then, if the ratio between the minimum and maximum exceeds a threshold of 1/32, a gradual boosting of the lowest lines in x is performed such that the first line (DC) is amplified by $(32\ \text{min/max})^{0.25}$ and the $33^{rd}$ line is not amplified:

```
tmp=32*min
if ((max<tmp) && (max>0))
{
fac=tmp=pow(tmp/max, 1/128)
for (i=31; i>=0; i--)
{/* gradual boosting of lowest 32 lines */
x[i] *=fac
fac *=tmp
}
}
```

5.3.3.2.4.3 Adaptive emphasis algorithm 2

ALFE algorithm 2, unlike algorithm 1, does not operate based on transmitted LPC gains but is signaled by means of modifications to the quantized low-frequency (LF) MDCT lines. The procedure is divided into five consecutive steps:

Step 1: first find first magnitude maximum at index i_max in lower spectral quarter (k=0 . . . $L_{TCX}^{(bw)}/4$) utilizing invGain=2/$g_{TCX}$ and modifying the maximum: xq[i_max]+=(xq[i_max]<0) ?−2: 2

Step 2: then compress value range of all x[i] up to i_max by requantizing all lines at k=0 i_max−1 as in the subclause describing the quantization, but utilizing invGain instead of $g_{TCX}$ as the global gain factor.

Step 3: find first magnitude maximum below i_max (k=0 . . . $L_{TCX}^{(bw)}/4$) which is half as high if i_max>−1 using invGain=4/$g_{TCX}$ and modifying the maximum: xq[i_max]+=(xq[i_max]<0) ?−2: 2

Step 4: re-compress and quantize all x[i] up to the half-height i_max found in the previous step, as in step 2

Step 5: finish and compress two lines at the latest i_max found, i.e. at k=i_max+1, i_max+2, again utilizing invGain=2/g T cx if the initial i_max found in step 1 is greater than ~1, or using invGain=4/g T cx otherwise. All i_max are initialized to −1. For details please see AdaptLowFreqEmph( )in tcx_utils_enc.c.

5.3.3.2.5 Spectrum noise measure in power spectrum

For guidance of quantization in the TXC encoding process, a noise measure between 0 (tonal) and 1 (noise-like) is determined for each MDCT spectral line above a specified frequency based on the current transform's power spectrum. The power spectrum $X_P(k)$ is computed from the MDCT coefficients $x_M$ (k) and the MDST $X_S(k)$ coefficients on the same time-domain signal segment and with the same windowing operation:

$$X_P(k)=X_M^2(k)+X_S^2(k)\text{for}k=0.\ .L_{TCX}^{(bw)}-1 \quad (4)$$

Each noise measure in noiseFlags(k) is then calculated as follows. First, if the transform length changed (e.g. after a TCX transition transform following an ACELP frame) or if the previous frame did not use TCX20 coding (e.g. in case a shorter transform length was used in the last frame), all noiseFlags(k) up to $L_{TCX}^{(bw)}-1$ are reset to zero. The noise measure start line $k_{start}$ is initialized according to the following table 1.

TABLE 1

Initialization table of $k_{start}$ in noise measure

| Bitrate (kbps) | 9.6 | 13.2 | 16.4 | 24.4 | 32 | 48 | 96 | 128 |
|---|---|---|---|---|---|---|---|---|
| bw = NB, WB | 66 | 128 | 200 | 320 | 320 | 320 | 320 | 320 |
| bw = SWB, FB | 44 | 96 | 160 | 320 | 320 | 256 | 640 | 640 |

For ACELP to TCX transitions, $k_{start}$ is scaled by 1.25. Then, if the noise measure start line $k_{start}$ is less than $L_{TCX}^{(bw)}-6$, the noiseFlags(k) at and above $k_{start}$ are derived recursively from running sums of power spectral lines:

$$s(k) = \sum_{i=k-7}^{k+7} X_P(i),\ c(k) = \sum_{i=k-1}^{k+1} X_P(i) \quad (5)$$

$$noiseFlags(k) = \begin{cases} 1 & \text{if } s(k) \geq (1.75 - 0.5 \cdot noiseFlags(k)) \cdot c(k) \\ 0 & \text{otherwise} \end{cases} \quad \text{for } k_{start} \ldots L_{TCX}^{(bw)} - 8 \quad (6)$$

Furthermore, every time noiseFlags(k) is given the value zero in the above loop, the variable laastTone is set to k. The upper 7 lines are treated separately since s(k) cannot be updated any more (c(k), however, is computed as above):

$$noiseFlags(k) = \begin{cases} 1 \text{ if } s\left(L_{TCX}^{(bw)} - 8\right) \geq (1.75 - 0.5 \cdot noiseFlags(k)) \cdot c(k) & \text{for } L_{TCX}^{(bw)} - 7 \ldots L_{TCX}^{(bw)} - 2 \\ 0 \text{ otherwise} \end{cases} \tag{7}$$

The uppermost line at $k=L_{TCX}^{(bw)}-1$ is defined as being noise-like, hence $noiseFlags(k)(L_{TCX}^{(bw)}-1)=1$. Finally, if the above variable lastTone (which was initialized to zero) is greater than zero, then noiseFlags(lastTone+1)=0. Note that this procedure is only carried out in TCX20, not in other TCX modes (noiseFlags(k)=0 for $k=0.\,.L_{TCX}^{(bw)}-1$).

5.3.3.2.6 Low pass factor detector

A low pass factor $c_{lpf}$ is determined based on the power spectrum for all bitrates below 32.0 kbps. Therefore, the power spectrum $X_P(k)$ is compared iteratively against a threshold $t_{lpf}$ for all $k=L_{TCX}^{(bw)}1 \ldots L_{TCX}^{(bw)}/2$, where $t_{lpf}=32.0$ for regular MDCT windows and $t_{lpf}=64.0$ for ACELP to MDCT transition windows. The iteration stops as soon as $X_P(k)>t_{lpf}$.

The low pass factor $c_{lpf}$ determines as $C_{lpf}=0.3 \cdot C_{lpf,prev}+0.7 \cdot (k+1)/L_{TCX}^{(celp)}$, where $c_{lpf,prev}$ is the last determined low pass factor. At encoder startup, $c_{lpf,prev}$ is set to 1.0. The low pass factor $c_{lpf}$ is used to determine the noise filling stop bin (see subclause 5.3.3.2.10.2).

5.3.3.2.7 Uniform quantizer with adaptive dead-zone

For uniform quantization of the MDCT spectrum $\tilde{X}_M$ after or before ALFE (depending on the applied emphasis algorithm, see subclause 5.3.3.2.4.1), the coefficients are first divided by the global gain $g_{TCX}$ (see subclause 5.3.3.2.8.1.1), which controls the step-size of quantization. The results are then rounded toward zero with a rounding offset which is adapted for each coefficient based on the coefficient's magnitude (relative to $g_{TCX}$) and tonality (as defined by noiseFlags(k) in subclause 5.3.3.2.5). For high-frequency spectral lines with low tonality and magnitude, a rounding offset of zero is used, whereas for all other spectral lines, an offset of 0.375 is employed. More specifically, the following algorithm is executed.

Starting from the highest coded MDCT coefficient at index $k=L_{TCX}^{(bw)}-1$, we set $\tilde{X}_M(k)=0$ and decrement k by 1 as long as condition noiseFlag(k)>0 and $|\tilde{X}_M(k)|/g_{TCX}<1$ evaluates to true. Then downward from the first line at index $k' \geq 0$ where this condition is not met (which is guaranteed since noiseFlag(0)=0), rounding toward zero with a rounding offset of 0.375 and limiting of the resulting integer values to the range−32768 to 32767 is performed:

$$\hat{X}_M(k) = \begin{cases} \min\left(\left\lfloor \frac{\tilde{X}_M(k)}{g_{TCX}} + 0.375 \right\rfloor, 32767\right), & \tilde{X}_M(k) > 0 \\ \max\left(\left\lceil \frac{\tilde{X}_M(k)}{g_{TCX}} - 0.375 \right\rceil, -32768\right), & \tilde{X}_M(k) \leq 0 \end{cases} \tag{8}$$

with $k=0.\,.k'$. Finally, all quantized coefficients of $\hat{X}_M(k)$ at and above $k=L_{TCK}^{(bw)}$ are set to zero.

5.3.3.2.8 Arithmetic coder

The quantized spectral coefficients are noiselessly coded by an entropy coding and more particularly by an arithmetic coding.

The arithmetic coding uses 14 bits precision probabilities for computing its code.

The alphabet probability distribution can be derived in different ways. At low rates, it is derived from the LPC envelope, while at high rates it is derived from the past context. In both cases, a harmonic model can be added for refining the probability model.

The following pseudo-code describes the arithmetic encoding routine, which is used for coding any symbol associated with a probability model. The probability model is represented by a cumulative frequency table cum_freq[ ]. The derivation of the probability model is described in the following subclauses.

```
/* global varibles */low
low
high
bits_to_follow
ar_encode(symbol, cum_freq[ ])
{
  if (ari_first_symbol( ) {
  low=0;
  high=65535;
  bits_to_follow=0;
  }
  range=high−low+1;
  if (symbol>0) {
  high=low+((range*cum_freq[symbol−1])>>14)−1;
  }
  low+=((range*cum_freq[symbol-1])>>14)−1;
  for (;;) {
  if (high<32768) {
  write_bit(0),
  while (bits_to_follow) {
  write_bit(1);
  bits_to_follow--;
  }
  }
  else if (low>=32768) {
  write_bit(1)
  while (bits_to_follow) {
  write_bit(0),
  bits_to_follow--;
  }
  low -=32768;
  high -=32768;
  }
  else if ((low>=16384) && (high<49152)) {
  bits_to_follow+=1;
  low -=16384;
  high -=16384;
  }
  else break;
  low+=low;
  high+=high+1;
  }
  if (ari_last_symbol( ) /* flush bits */if
  if (low<16384) {
  write_bit(0),
  while (bits_to_follow>0) {
  write_bit(1);
  bits_to_follow--;
  }
  } else {
  write_bit(1);
  while (bits_to_follow>0) {
```

```
    write_bit(0);
    bits_to_follow--;
    }
  }
  }
}
```

The helper functions ari_first_symbol( ) and ari_last_symbol( ) detect the first symbol and the last symbol of the generated codeword respectively.

5.3.3.2.8.1 Context based arithmetic codec 5.3.3.2.8.1.1 Global gain estimator

The estimation of the global gain $g_{TCX}$ for the TCX frame is performed in two iterative steps. The first estimate considers a SNR gain of 6 dB per sample per bit from SQ. The second estimate refines the estimate by taking into account the entropy coding.

The energy of each block of 4 coefficients is first computed:

$$E[k] = \sum_{i=0}^{4} \hat{X}^2[4 \cdot k + i] \tag{9}$$

A bisection search is performed with a final resolution of 0.125 dB:

Initialization: Set fac=offset=12.8 and target=0.15(target_bits−L/16)

Iteration: Do the following block of operations 10 times

1—fac=fac/2

2—offset=offset−fac $$2 - ener = \sum_{i=0}^{L/4} a[i],$$

$$\text{where } a[i] = \begin{cases} E[k] - \text{offset} & \text{if } E[k] - \text{offset} > 0.3 \\ 0 & \text{otherwise} \end{cases}$$

3—if(ener>target) then offset=offset+fac

The first estimate of gain is then given by:

$$g_{TCX} = 10^{0.45 + offset/2} \tag{10}$$

5.3.3.2.8.1.2 Rate-loop for constant bit rate and global gain

In order to set the best gain $g_{TCX}$ within the constraints of used_bits≤target_bits, convergence process of $g_{TCX}$ and used_bits is carried out by using following valuables and constants:

$w_{Lb}$, and $w_{Ub}$ denote weights corresponding to the lower bound the upper bound, $g_{Lb}$ and $g_{ub}$ denote gain corresponding to the lower bound the upper bound, and Lb_found and Ub_found denote flags indicating $g_{Lb}$ and $g_{Ub}$ is found, respectively.

μ and η are variables with μ=max(1,2.3−0.0025*target_bits) and η=1/μ.

λ and ν are constants, set as 10 and 0.96.

After the initial estimate of bit consumption by arithmetic coding, stop is set 0 when target_bits is larger than used_bits, while stop is set as used_bits when used_bits is larger than target_bits.

If stop is larger than 0, that means used_bits is larger than target_bits, $g_{TCX}$ needs to be modified to be larger than the previous one and Lb_found is set as TRUE, $g_{Lb}$ is set as the previous $g_{TCX}$. $W_{Lb}$ is set as $$W_{Lb} = \text{stop} - \text{target\_bits} + \lambda, \tag{11}$$

When Ub_found was set, that means used_bits was smaller than target_bits, $g_{TCX}$ is updated as an interpolated value between upper bound and lower bound;

$$g_{TCX} = (g_{Lb} \cdot W_{Ub} + g_{Ub} \cdot W_{Lb}) / (W_{Ub} + W_{Lb}) \tag{12}$$

Otherwise, that means Ub_found is FALSE, gain is amplified as $$g_{TCX} = g_{TCX} \cdot (1 + \mu \cdot ((\text{stop}/\nu)/\text{target\_bits} - 1)), \tag{13}$$

with larger amplification ratio when the ratio of used_bits (=stop) and target_bits is larger to accelerate to attain $g_{ub}$.

If stop equals to 0, that means used bits is smaller than target_ bits, $g_{TCX}$ should be smaller than the previous one and Ub_found is set as 1, Ub is set as the previous $g_{TCX}$ and $w_{Ub}$ is set as $$W_{ub} = \text{target\_bits} - \text{used\_bits} + \lambda, \tag{14}$$

If Lb_found has been already set, gain is calculated as $$g_{TCX} = (g_{Lb} \cdot W_{Ub} + g_{Ub} \cdot W_{Lb}) / (W_{Ub} + W_{Lb}) \tag{15}$$

otherwise, in order to accelerate to lower band gain $g_{Lb}$, gain is reduced as, $$g_{TCX} = g_{TCX} \cdot (1 - \eta \cdot (1 - (\text{used\_bits} \cdot \nu)/\text{target\_bits})), \tag{16}$$

with larger reduction rates of gain when the ratio of used bits and target_ bits is small.

After above correction of gain, quantization is performed and estimation of used_bits by arithmetic coding is obtained. As a result, stop is set 0 when target_bits is larger than used_bits, and is set as used_bits when it is larger than target_ bits. If the loop count is less than 4, either lower bound setting process or upper bound setting process is carried out at the next loop depending on the value stop. If the loop count is 4, the final gain $g_{TCX}$ and the quantized MDCT sequence $x_{QMDCT}$ (k) are obtained.

5.3.3.2.8.1.3 Probability model derivation and coding

The quantized spectral coefficients X are noiselessly encoded starting from the lowest-frequency coefficient and progressing to the highest-frequency coefficient. They are encoded by groups of two coefficients a and b gathering in a so-called 2tuple {a,b}.

Each 2-tuple {a,b} is split into three parts namely, MSB, LSB and the sign. The sign is coded independently from the magnitude using uniform probability distribution. The magnitude itself is further divided in two parts, the two most significant bits (MSBs) and the remaining least significant bitplanes (LSBs, if applicable). The 2-tuples for which the magnitude of the two spectral coefficients is lower or equal to 3 are coded directly by the MSB coding. Otherwise, an escape symbol is transmitted first for signalling any additional bit plane.

Figure 18:
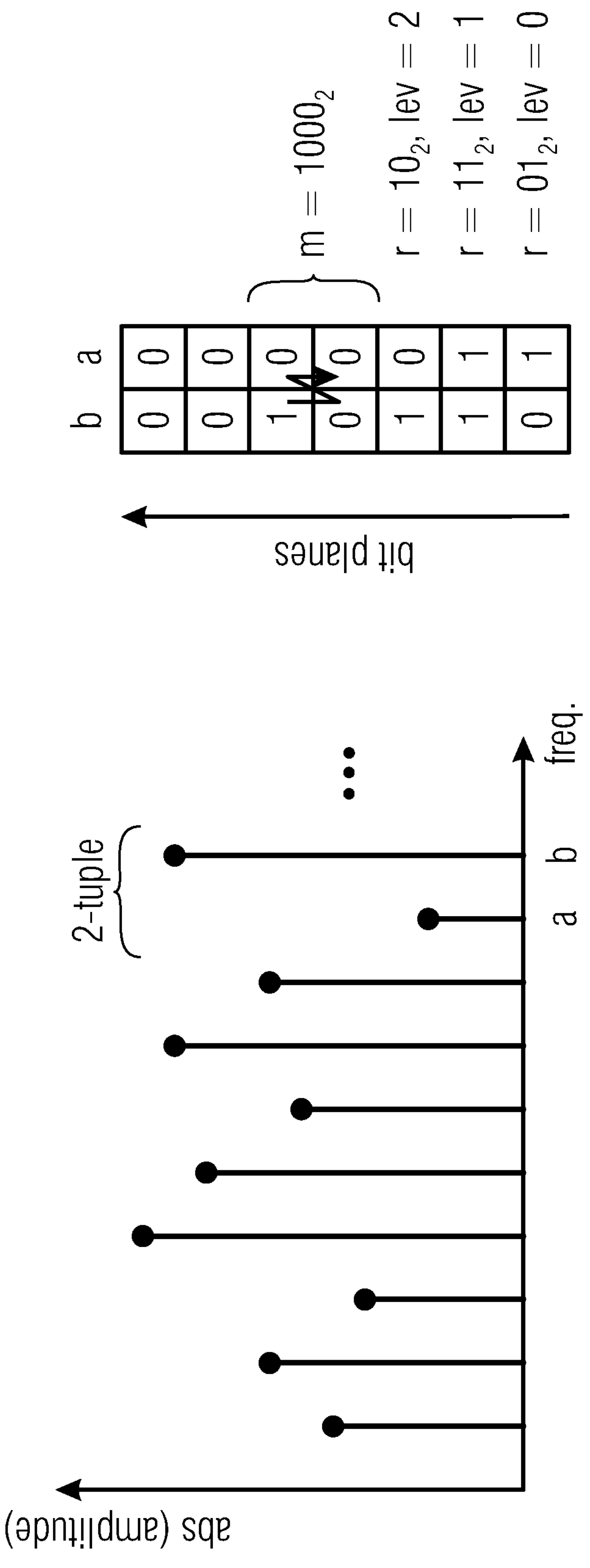
FIG. 18. illustrates an example of a coded pair (2-tuple) of spectral values a and b and their representation as m and r.

The relation between 2-tuple, the individual spectral values a and b of a 2-tuple, the most significant bit planes m and the remaining least significant bit planes, r, are illustrated in the example in FIG. 18. In this example three escape symbols are sent prior to the actual value m, indicating three transmitted least significant bit planes The probability model is derived from the past context. The past context is translated on a 12 bits-wise index and maps with the lookup table an_context_lookup[ ]to one of the 64 available probability models stored in ari_cf[ ]

The past context is derived from two 2-tuples already coded within the same frame. The context can be derived from the direct neighbourhood or located further in the past frequencies. Separate contexts are maintained for the peak regions (coefficients belonging to the harmonic peaks) and other (non-peak) regions according to the harmonic model. If no harmonic model is used, only the other (non-peak) region context is used.

The zeroed spectral values lying in the tail of spectrum are not transmitted. It is achieved by transmitting the index of last non-zeroed 2-tuple. If harmonic model is used, the tail of the spectrum is defined as the tail of spectrum consisting of the peak region coefficients, followed by the other (non-peak) region coefficients, as this definition tends to increase the number of trailing zeros and thus improves coding efficiency. The number of samples to encode is computed as follows:

$$lastnz = 2\left(\max_{0\le k<L/2}\{(X[ip[2k]] + X[ip[2k+1]]) > 0\}\right) + 2 \tag{17}$$

The following data are written into the bitstream with the following order:

1—lastnz/2-1 is coded on $$\left\lceil \log_2\left(\frac{L}{2}\right)\right\rceil$$

bits.

2—The entropy-coded MSBs along with escape symbols.

3—The signs with 1 bit-wise code-words

4—The residual quantization bits described in section when the bit budget is not fully used.

5—The LSBs are written backwardly from the end of the bitstream buffer.

The following pseudo-code describes how the context is derived and how the bit-stream data for the MSBs, signs and LSBs are computed. The input arguments are the quantized spectral coefficients X[ ], the size of the considered spectrum L, the bit budget target bits, the harmonic model parameters (pi, hi), and the index of the last non zeroed symbol lastnz.

```
ari_context_encode(X[ ], L,target_bits,pi[ ],hi[ ],lastnz)
{
c[0]=c[1]=p1=p2=0,
  for (k=0; k<lastnz; k+=2) {
  ari_copy_states( );
  (a1_i,p1,idx1)=get_next_coeff(pi,hi,lastnz);
  (b1_i,p2,idx2)=get_next_coeff(pi,hi,lastnz);
  t=get_context(idx1,idx2,c,p1,p2);
  esc_nb=lev1=0;
  a=a1=abs(X[a1_i]);
  b=b1=abs(X[b1_i]);
  /* sign encoding*/
  if(a1>0) save_bit(X[a1_i]>0?0:1);
  if(b1>0) save_bit(X[b1_i]>0?0:1);
  /* MSB encoding */
  while(a1>3||b1>3) {
  pki=ari_context_lookup[t+1024*esc_nb];
  /* write escape codeword */
  ari_encode(17,ari_cf_rn[pki]),
  a1»=1; b1>>=1; lev1++,
  esc_nb=min(lev1,3),
  }
  pki=ari_context_lookup[t+1024*esc_nb];
  ari_encode(a1+4*b1, ari_cf_rn[pki]),
  /* LSB encoding */
  for(lev=0,Iev<lev1,lev++){
  write_bit_end((a>>lev)&1),
  write_bit_end((b>>lev)&1),
  }
  /*check budget*/
  if(nbbits>target_bits){
  ari_restore_states( )
  break;
  }
  c=update_context(a,b,a1,b1,c,p1,p2),
  }
  write_sign_bits( );
}
```

The helper functions ari_save_states( ) and ari_restore_states( ) are used for saving and restoring the arithmetic coder states respectively. It allows cancelling the encoding of the last symbols if it violates the bit budget. Moreover and in case of bit budget overflow, it is able to fill the remaining bits with zeros till reaching the end of the bit budget or till processing lastnz samples in the spectrum.

The other helper functions are described in the following subclauses.

5.3.3.2.8.1.4 Get next coefficient

```
(a,p,idx)=get_next_coeff(pi, hi, lastnz)
If ((ii[0] lastnz−min(#pi, lastnz)) or
(ii[1]<min(#pi, lastnz) and pi[ii[1]]<hi[ii[0]])) then
{
p=1
idx=ii[1]
a=pi[ii[1]]
}
else
{
p=0
idx=ii[0]+#pi
a=hi[ii[0]]
}
ii[p]=ii[p]+1
```

The ii[0] and ii[1] counters are initialized to 0 at the beginning of ari_context_encode( )(and ari_context_decode( ) in the decoder).

5.3.3.2.8.1.5 Context update

The context is updated as described by the following pseudo-code. It consists of the concatenation of two 4 bit-wise context elements.

```
if (p1≢p2)
{
if (mod(idx1,2)--1)
{
t=t+2⌊a/2⌋·1+⌊a/4⌋)
If (t>13)
t=12+min(1+⌊a/8⌋3)
c[pi]=2^4·(c[p1]Λ15)+t
}
if (mod(idx2,2)−1)
{
t=1+2⌊b/2⌋(1+⌊b/4⌋)
if (t>13)
t=12+min('+⌊b/8⌋3)
c[p2]=2^4 (c[p2] Λ15)+t
}
}
else
{
c[p1v p2]=16·(c[p1v p2]Λ15)
```

```
if (esc_nb<2)
c[p1v p2]=c[p1v p2]+1+(a1+b1)·(esc_nb+1)
else
c[p1 v p2]=c[p1 v p2]+12+esc_nb
}
```

5.3.3.2.8.1.6 Get context

The final context is amended in two ways:

```
t=c[p1 v p2]
if min(idx1,idx2)>L/2 then
t=t+256
if target_bits>400 then
t=t+512
```

The context t is an index from 0 to 1023.

5.3.3.2.8.1.7 Bit consumption estimation

The bit consumption estimation of the context-based arithmetic coder is needed for the rate-loop optimization of the quantization. The estimation is done by computing the bit requirement without calling the arithmetic coder. The generated bits can be accurately estimated by:

```
cum_freq=arith_cf_m[pki]+m
proba*=cum_freq[0]- cum_freq[1]
nlz=norm_l(proba) /*get the number of leading zero */
nbits=nlz
proba>>=14
```

where proba is an integer initialized to 16384 and m is a MSB symbol.

5.3.3.2.8.1.8 Harmonic model

For both context and envelope based arithmetic coding, a harmonic model is used for more efficient coding of frames with harmonic content. The model is disabled if any of the following conditions apply:

The bit-rate is not one of 9.6, 13.2, 16.4, 24.4, 32, 48 kbps.

The previous frame was coded by ACELP.

Envelope based arithmetic coding is used and the coder type is neither Voiced nor Generic.

The single-bit harmonic model flag in the bit-stream in set to zero. When the model is enabled, the frequency domain interval of harmonics is a key parameter and is commonly analysed and encoded for both flavours of arithmetic coders.

5.3.3.2.8.1.8.1 Encoding of Interval of harmonics

When pitch lag and gain are used for the post processing, the lag parameter is utilized for representing the interval of harmonics in the frequency domain. Otherwise, normal representation of interval is applied.

5.3.3.2.8.1.8.1.1 Encoding interval depending on time domain pitch lag If integer part of pitch lag in time domain $d_{int}$ is less than the frame size of MDCT $L_{TCX}$ frequency domain interval unit (between harmonic peaks corresponding to the pitch lag) $T_{UNIT}$ with 7 bit fractional accuracy is given by $$T_{UNIT} = \frac{(2 \cdot L_{TCX} \cdot \text{res\_max}) \cdot 2^7}{(d_{int} \cdot \text{res\_max} + d_{fr})} \tag{18}$$

where $d_{fr}$ denotes the fractional part of pitch lag in time domain, res_max denotes the max number of allowable fractional values whose values are either 4 or 6 depending on the conditions.

Since $T_{UNIT}$ has limited range, the actual interval between harmonic peaks in the frequency domain is coded relatively to $T_{uNiT}$ using the bits specified in table 2. Among candidate of multiplication factors, Ratio( ) given in the table 3 or table 4, the multiplication number is selected that gives the most suitable harmonic interval of MDCT domain transform coefficients.

$$\text{Index}_T = (T_{UNIT} + 2^6)/2^7 - 2 \tag{19}$$

$$T_{MDCT} = \lfloor 4 \cdot T_{UNIT} \cdot \text{Ratio}(\text{Index}_{Bandvvidth}, \text{index}_T, \text{Index}_{MUL}) \rfloor / 4 \tag{20}$$

TABLE 2

| Number of bits for specifying the multiplier depending on $\text{Index}_T$ | | | | | | | | | | | | | | | | |
|---|---|---|---|---|---|---|---|---|---|---|---|---|---|---|---|---|
| $\text{Index}_T$ | 0 | 1 | 2 | 3 | 4 | 5 | 6 | 7 | 8 | 9 | 10 | 11 | 12 | 13 | 14 | 15 |
| NB: | 5 | 4 | 4 | 4 | 4 | 4 | 4 | 3 | 3 | 3 | 3 | 2 | 2 | 2 | 2 | 2 |
| WB: | 5 | 5 | 5 | 5 | 5 | 5 | 4 | 4 | 4 | 4 | 4 | 4 | 4 | 2 | 2 | 2 |

TABLE 3

| Candidates of multiplier in the order of $\text{Index}_{MUL}$ depending on $\text{Index}_T$ (NB) | | | | | | | | | | | | | | | | |
|---|---|---|---|---|---|---|---|---|---|---|---|---|---|---|---|---|
| $\text{Index}_T$ | | | | | | | | | | | | | | | | |
| 0 | 3 | 4 | 5 | 6 | 7 | 8 | 9 | 10 | 11 | 12 | 13 | 14 | 15 | 16 | 17 | 18 |
| | 19 | 20 | 21 | 22 | 23 | 24 | 25 | 26 | 27 | 28 | 30 | 32 | 34 | 36 | 38 | 40 |
| 1 | 0.5 | 1 | 2 | 3 | 4 | 5 | 6 | 7 | 8 | 9 | 10 | 12 | 16 | 20 | 24 | 30 |
| 2 | 2 | 3 | 4 | 5 | 6 | 7 | 8 | 9 | 10 | 12 | 14 | 16 | 18 | 20 | 24 | 30 |
| 3 | 2 | 3 | 4 | 5 | 6 | 7 | 8 | 9 | 10 | 12 | 14 | 16 | 18 | 20 | 24 | 30 |
| 4 | 2 | 3 | 4 | 5 | 6 | 7 | 8 | 9 | 10 | 12 | 14 | 16 | 18 | 20 | 24 | 30 |
| 5 | 1 | 2 | 2.5 | 3 | 4 | 5 | 6 | 7 | 8 | 9 | 10 | 12 | 14 | 16 | 18 | 20 |
| 6 | 1 | 1.5 | 2 | 2.5 | 3 | 3.5 | 4 | 4.5 | 5 | 6 | 7 | 8 | 9 | 10 | 12 | 16 |
| 7 | 1 | 2 | 3 | 4 | 5 | 6 | 8 | 10 | — | — | — | — | — | — | — | — |
| 8 | 1 | 2 | 3 | 4 | 5 | 6 | 8 | 10 | — | — | — | — | — | — | — | — |
| 9 | 1 | 1.5 | 2 | 3 | 4 | 5 | 6 | 8 | — | — | — | — | — | — | — | — |
| 10 | 1 | 2 | 2.5 | 3 | 4 | 5 | 6 | 8 | — | — | — | — | — | — | — | — |
| 11 | 1 | 2 | 3 | 4 | — | — | — | — | — | — | — | — | — | — | — | — |
| 12 | 1 | 2 | 4 | 6 | — | — | — | — | — | — | — | — | — | — | — | — |
| 13 | 1 | 2 | 3 | 4 | — | — | — | — | — | — | — | — | — | — | — | — |

TABLE 3-continued

| Candidates of multiplier in the order of $Index_{MUL}$ depending on $Index_T$ (NB) | | | | | | | | | | | | | | | | |
|---|---|---|---|---|---|---|---|---|---|---|---|---|---|---|---|---|
| 14 | 1 | 1.5 | 2 | 4 | — | — | — | — | — | — | — | — | — | — | — | — |
| 15 | 1 | 1.5 | 2 | 3 | — | — | — | — | — | — | — | — | — | — | — | — |
| 16 | 0.5 | 1 | 2 | 3 | — | — | — | — | — | — | — | — | — | — | — | — |

TABLE 4

Candidates of multiplier in the order of depending on $Index_T$ (WB)

| $Index_T$ | | | | | | | | | | | | | | | | |
|---|---|---|---|---|---|---|---|---|---|---|---|---|---|---|---|---|
| 0 | 3 | 4 | 5 | 6 | 7 | 8 | 9 | 10 | 11 | 12 | 13 | 14 | 15 | 16 | 17 | 18 |
| | 19 | 20 | 21 | 22 | 23 | 24 | 25 | 26 | 27 | 28 | 30 | 32 | 34 | 36 | 38 | 40 |
| 1 | 1 | 2 | 3 | 4 | 5 | 6 | 7 | 8 | 9 | 10 | 12 | 14 | 16 | 18 | 20 | 22 |
| | 24 | 26 | 28 | 30 | 32 | 34 | 36 | 38 | 40 | 44 | 48 | 54 | 60 | 68 | 78 | 80 |
| 2 | 1.5 | 2 | 2.5 | 3 | 4 | 5 | 6 | 7 | 8 | 9 | 10 | 12 | 14 | 16 | 18 | 20 |
| | 22 | 24 | 26 | 28 | 30 | 32 | 34 | 36 | 38 | 40 | 42 | 44 | 48 | 52 | 54 | 68 |
| 3 | 1 | 1.5 | 2 | 2.5 | 3 | 4 | 5 | 6 | 7 | 8 | 9 | 10 | 11 | 12 | 13 | 14 |
| | 15 | 16 | 18 | 20 | 22 | 24 | 26 | 28 | 30 | 32 | 34 | 36 | 40 | 44 | 48 | 54 |
| 4 | 1 | 1.5 | 2 | 2.5 | 3 | 3.5 | 4 | 4.5 | 5 | 5.5 | 6 | 6.5 | 7 | 7.5 | 8 | 9 |
| | 10 | 11 | 12 | 13 | 14 | 15 | 16 | 18 | 20 | 22 | 24 | 26 | 28 | 34 | 40 | 41 |
| 5 | 1 | 1.5 | 2 | 2.5 | 3 | 3.5 | 4 | 4.5 | 5 | 6 | 7 | 8 | 9 | 10 | 11 | 12 |
| | 13 | 14 | 15 | 16 | 17 | 18 | 19 | 20 | 21 | 22.5 | 24 | 25 | 27 | 28 | 30 | 35 |
| 6 | 0.5 | 1 | 1.5 | 2 | 2.5 | 3 | 3.5 | 4 | 4.5 | 5 | 5.5 | 6 | 7 | 8 | 9 | 10 |
| 7 | 1 | 2 | 2.5 | 3 | 4 | 5 | 6 | 7 | 8 | 9 | 10 | 12 | 15 | 16 | 18 | 27 |
| 8 | 1 | 1.5 | 2 | 2.5 | 3 | 3.5 | 4 | 5 | 6 | 8 | 10 | 15 | 18 | 22 | 24 | 26 |
| 9 | 1 | 1.5 | 2 | 2.5 | 3 | 3.5 | 4 | 5 | 6 | 8 | 10 | 12 | 13 | 14 | 18 | 21 |
| 10 | 0.5 | 1 | 1.5 | 2 | 2.5 | 3 | 4 | 5 | 6 | 8 | 9 | 11 | 12 | 13.5 | 16 | 20 |
| 11 | 0.5 | 1 | 1.5 | 2 | 2.5 | 3 | 4 | 5 | 6 | 7 | 8 | 10 | 11 | 12 | 14 | 20 |
| 12 | 0.5 | 1 | 1.5 | 2 | 2.5 | 3 | 4 | 4.5 | 6 | 7.5 | 9 | 10 | 12 | 14 | 15 | 18 |
| 13 | 0.5 | 1 | 1.25 | 1.5 | 1.75 | 2 | 2.5 | 3 | 3.5 | 4 | 4.5 | 5 | 6 | 8 | 9 | 14 |
| 14 | 0.5 | 1 | 2 | 4 | — | — | — | — | — | — | — | — | — | — | — | — |
| 15 | 1 | 1.5 | 2 | 4 | — | — | — | — | — | — | — | — | — | — | — | — |
| 16 | 1 | 2 | 3 | 4 | — | — | — | — | — | — | — | — | — | — | — | — |

5.3.3.2.8.1.8.1.2 Encoding interval without depending on time domain pitch lag

When pitch lag and gain in the time domain is not used or the pitch gain is less than or equals to 0.46, normal encoding of the interval with un-equal resolution is used.

Unit interval of spectral peaks $T_{UNIT}$ is coded as $$T_{UNIT}=\text{index}+\text{base}\cdot 2^{Res}-\text{bias}, \quad (21)$$

and actual interval $T_{MDCT}$ is represented with fractional resolution of Res as $$T_{MDCT}=T_{UNIT}/2^{Res} \quad (22)$$

Each paramter is shown in table 5, where "small size" means when frame size is smaller than 256 of the target bit rates is less than or equal to 150.

TABLE 5

| Un-equal resolution for coding of (0 <= index < 256) | Res | base | bias |
|---|---|---|---|
| index < 16 | 3 | 6 | 0 |
| 16 ≤ index < 80 | 4 | 8 | 16 |
| 80 ≤ index < 208 | 3 | 12 | 80 |
| "small size" or 208 ≤ index < 224 | 1 | 28 | 208 |
| 224 ≤ index < 256 | 0 | 188 | 224 |

5.3.3.2.8.1.8.2 Void 5.3.3.2.8.1.8.3 Search for interval of harmonics

In search of the best interval of harmonics, encoder tries to find the index which can maximize the weighted sum $E_{PERIOD}$ of the peak part of absolute MDCT coefficients. $E_{ABSM}$ (k) denotes sum of 3 samples of absolute value of MDCT domain transform coefficients as $$E_{ABSM}(k)=\sum_{j=0}^{2}\text{abs}(X_M(k+j-1)) \quad (23)$$

$$E_{PERIOD}(T_{MDCT}) = \left(\frac{1}{\text{num\_peak}}\right)\sum_{n=1}^{\text{num\_peak}} E_{ABSM}(\lfloor n\cdot T_{MDCT}\rfloor)((3n-2)/255)^{0.3} \quad (24)$$

where num_peak is the maximum number that $\lfloor n\cdot T_{MDCT}\rfloor$ reaches the limit of samples in the frequency domain.

In case interval does not rely on the pitch lag in time domain, hierarchical search is used to save computational cost. If the index of the interval is less than 80, periodicity is checked by a coarse step of 4. After getting the best interval, finer periodicity is searched around the best interval from −2 to +2. If index is equal to or larger than 80, periodicity is searched for each index.

5.3.3.2.8.1.8.4 Decision of harmonic model

At the initial estimation, number of used bits without harmonic model, used_bits, and one with harmonic model, $used\_bits_{hm}$ is obtained and the indicator of consumed bits $Idicator_B$ are defined as $$idicator_B=B_{no\_hm}-B_{hm} \quad (25)$$

$$B_{no\_hm}=\max(stop,used\_bits), \quad (26)$$

$$B_{hm}=\max(stop_{hm},used\_bits_{hm})+Index\_bits_{hm}, \quad (27)$$

where $Index\_bits_{hm}$ denotes the additional bits for modelling harmonic structure, and stop and $stop_{hm}$ indicate the consumed bits when they are larger than the target bits. Thus, the larger $idicator_B$, the more advantageous to use harmonic model. Relative periodicity $idicator_{hm}$ is defined as the normalized sum of absolute values for peak regions of the shaped MDCT coefficients as $$indicator_{hm}=L_M\cdot E_{PERIOD}(T_{MDCT\_max})\Big/\sum_{n=1}^{L_M}E_{ABSM}(n), \quad (28)$$

where $T_{MDCT\_max}$ is the harmonic interval that attain the max value of $E_{PERIOD}$. When the score of periodicity of this frame is larger than the threshold as $$if((indicator_B>2)\|((abs(indicator_B)\leq 2)\&\&(indicator_{hm}>2.6)), \quad (29)$$

this frame is considered to be coded by the harmonic model. The shaped MDCT coefficients divided by gain $g_{TCX}$ are quantized to produce a sequence of integer values of MDCT coefficients, $\hat{X}_{TCX\_hm}$, and compressed by arithmetic coding with harmonic model. This process needs iterative convergence process (rate loop) to get $g_{TCX}$ and $\hat{X}_{TCX\_hm}$ with consumed bits $B_{hm}$. At the end of convergence, in order to validate harmonic model, the consumed bits $B_{no\_hm}$ by arithmetic coding with normal (non-harmonic) model for $\hat{X}_{TCX\_hm}$ is additionally calculated and compared with $B_{hm}$. If $B_{hm}$ is larger than $B_{no\_hm}$, arithmetic coding of $\hat{X}_{TCX\_hm}$ is revert to use normal model. $B_{hm}-B_{no\_hm}$ can be used for residual quantization for further enhancements. Otherwise, harmonic model is used in arithmetic coding.

In contrast, if the indicator of periodicity of this frame is smaller than or the same as the threshold, quantization and arithmetic coding are carried out assuming the normal model to produce a sequence of integer values of the shaped MDCT coefficients, $\hat{X}_{TCX\_no\_hm}$ with consumed bits $B_{no\_hm}$. After convergence of rate loop, consumed bits $B_{hm}$ by arithmetic coding with harmonic model for $\hat{X}_{TCX\_no\_hm}$ is calculated. If $B_{no\_hm}$ is larger than $B_{hm}$, arithmetic coding of $\hat{X}_{TCX\_no\_hm}$ is switched to use harmonic model. Otherwise, normal model is used in arithmetic coding.

5.3.3.2.8.1.9 Use of harmonic information in Context based arithmetic coding

For context based arithmetic coding, all regions are classified into two categories. One is peak part and consists of 3 consecutive samples centered at $U^{th}$ (U is a positive integer up to the limit) peak of harmonic peak of $\tau_u$, $$\tau_U=\lfloor U\cdot T_{MDCT}\rfloor, \quad (30)$$

The other samples belong to normal or valley part. Harmonic peak part can be specified by the interval of harmonics and integer multiples of the interval. Arithmetic coding uses different contexts for peak and valley regions.

For ease of description and implementation, the harmonic model uses the following index sequences:

$$Pi=(i\in[0..L_M-1]:\exists U:\tau_U-1\leq i\leq\tau_U+1), \quad (31)$$

$$hi=(i\in[0..L_M-1]:i\notin pi), \quad (32)$$

$$ip=(pi,hi),\text{the concatenation of } pi \text{ and } hi. \quad (33)$$

In case of disabled harmonic model, these sequences are pi=( ), and hi=ip=(0, . . . $L_M-1$).

5.3.3.2.8.2 Envelope based arithmetic coder

In the MDCT domain, spectral lines are weighted with the perceptual model w(z) such that each line can be quantized with the same accuracy. The variance of individual spectral lines follow the shape of the linear predictor $A^{-1}$ (z) weighted by the perceptual model, whereby the weighted shape is $s(z)=w(z)A^{-1}(z)$. w(z) is calculated by transforming $\hat{q}'_\gamma$ to frequency domain LPC gains as detailed in subclauses 5.3.3.2.4.1 and 5.3.3.2.4.2.$A^{-1}$ (z) is derived from $\hat{q}'_1$ after conversion to direct-form coefficients, and applying tilt compensation $1-\gamma z^{-1}$, and finally transforming to frequency domain LPC gains. All other frequency-shaping tools, as well as the contribution from the harmonic model, shall be also included in this envelope shape s(z). Observe that this gives only the relative variances of spectral lines, while the overall envelope has arbitrary scaling, whereby we begin by scaling the envelope.

5.3.3.2.8.2.1 Envelope scaling

We will assume that spectral lines $x_k$ are zero-mean and distributed according to the Laplace-distribution, whereby the probability distribution function is $$f(x_k)=\frac{1}{2b_k}\exp\left(-\frac{|x_k|}{b_k}\right) \quad (34)$$

The entropy and thus the bit-consumption of such a spectral line is $bits_k=1+\log 2^{2eb}k$. However, this formula assumes that the sign is encoded also for those spectral lines which are quantized to zero. To compensate for this discrepancy, we use instead the approximation $$bits_k=\log_2\left(2eb_k+0.15+\frac{0.035}{b_k}\right), \quad (35)$$

which is accurate for $b_k\geq 0.08$. We will assume that the bit-consumption of lines With $b_k\leq 0.08$ is $bits_k=\log_2(1.0224)$ which matches the bit-consumption at $b_k=0.08$. For large $b_k>255$ we use the true entropy bits $k=\log_2(2eb_k)$ for simplicity.

The variance of spectral lines is then $\sigma_k^2=2b_k^2$. If $s_k^2$ is the k th element of the power of the envelope shape$|s(z)|^2$ then $s_k^2$ describes the relative energy of spectral lines such that $\gamma^2\sigma_k^2=b_k^2$ where $\gamma$ is scaling coefficient. In other words, $s_k^2$ describes only the shape of the spectrum without any meaningful magnitude and $\gamma$ is used to scale that shape to obtain the actual variance $\sigma_k^2$.

Our objective is that when we encode all lines of the spectrum with an arithmetic coder, then the bit-consumption matches a pre-defined level B, that is, $$B=\sum_{k=0}^{N-1}bits_k.$$

We can then use a bi-section algorithm to determine the appropriate scaling factor $\gamma$ such that the target bit-rate B is reached.

Once the envelope shape b k has been scaled such that the expected bit-consumption of signals matching that shape yield the target bit-rate, we can proceed to quantizing the spectral lines.

5.3.3.2.8.2.2 Quantization rate loop

Assume that $x_k$ is quantized to an integer $\hat{x}_k$ such that the quantization interval is $[x_k\ 0.5, x_k+0.5]$ then the probability of a spectral line occurring in that interval is for $|\hat{x}_k|\geq 1$ $$p(\hat{x}_k) = \left(\exp\left(-\frac{|\hat{x}_k| - 0.5}{b_k}\right) - \exp\left(-\frac{|\hat{x}_k| + 0.5}{b_k}\right)\right) = \left(1 - \exp\left(-\frac{1}{b_k}\right)\right)\exp\left(-\frac{|\hat{x}_k| - 0.5}{b_k}\right). \tag{36}$$

and for $|\hat{x}_k|=0$ $$p(\hat{x}_k) = \left(1 - \exp\left(-\frac{0.5}{b_k}\right)\right). \tag{37}$$

It follows that the bit-consumption for these two cases is in the ideal case $$\begin{cases} 1 - \frac{0.5}{b_k}\log_2 e - \log_2\left(1 - \exp\left(-\frac{1}{b_k}\right)\right) + \frac{|\hat{x}_k|}{b_k}\log_2 e, & \hat{x}_k \neq 0 \\ \log_2\left(1 - \exp\left(-\frac{0.5}{b_k}\right)\right), & \hat{x}_k = 0. \end{cases} \tag{38}$$

By pre-computing the terms $$\log_2\left(1 - \exp\left(-\frac{1}{b_k}\right)\right)$$

and $$\log_2\left(1 - \exp\left(-\frac{0.5}{b_k}\right)\right),$$

we can efficiently calculate the bit-consumption of the whole spectrum.

The rate-loop can then be applied with a bi-section search, where we adjust the scaling of the spectral lines by a factor p, and calculate the bit-consumption of the spectrum $px_k$, until we are sufficiently close to the desired bit-rate. Note that the above ideal-case values for the bit-consumption do not necessarily perfectly coincide with the final bit-consumption, since the arithmetic codec works with a finite-precision approximation. This rate-loop thus relies on an approximation of the bit-consumption, but with the benefit of a computationally efficient implementation.

When the optimal scaling a has been determined, the spectrum can be encoded with a standard arithmetic coder. A spectral line which is quantized to a value $\hat{x}_k\neq 0$ is encoded to the interval $$\left[\exp\left(-\frac{|\hat{x}_k| - 0.5}{b_k}\right), \exp\left(-\frac{|\hat{x}_k| + 0.5}{b_k}\right)\right] \tag{39}$$

and $\hat{X}_k=0$ is encoded onto the interval $$\left[1, \exp\left(-\frac{|\hat{x}_k| + 0.5}{b_k}\right)\right]. \tag{40}$$

The sign of $x_k\neq 0$ will be encoded with one further bit.

Observe that the arithmetic coder operates with a fixed-point implementation such that the above intervals are bit-exact across all platforms. Therefore all inputs to the arithmetic coder, including the linear predictive model and the weighting filter, are implemented in fixed-point throughout the system 5.3.3.2.8.2.3 Probability model derivation and coding When the optimal scaling $\sigma$ has been determined, the spectrum can be encoded with a standard arithmetic coder. A spectral line which is quantized to a value $\hat{x}_k\neq 0$ is encoded to the interval $$\left[\exp\left(-\frac{|\hat{x}_k| - 0.5}{b_k}\right), \exp\left(-\frac{|\hat{x}_k| + 0.5}{b_k}\right)\right] \tag{41}$$

and $\hat{x}_k=0$ is encoded onto the interval $$\left[1, \exp\left(-\frac{|\hat{x}_k| + 0.5}{b_k}\right)\right]. \tag{42}$$

The sign of $x_k\neq 0$ will be encoded with one further bit.

5.3.3.2.8.2.4 Harmonic model in envelope based arithmetic coding

Figure 19:
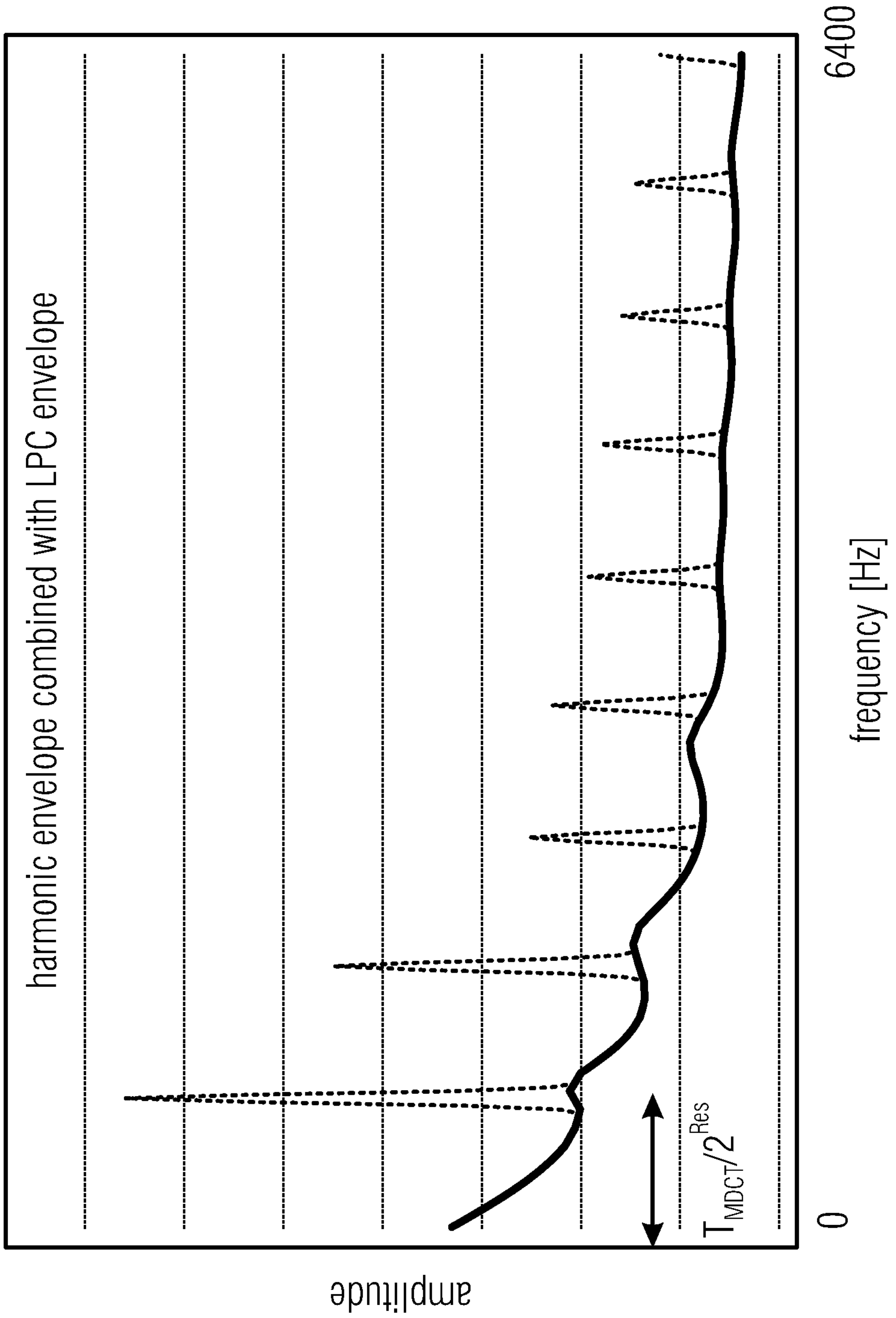
FIG. 19. illustrates an example of harmonic envelope combined with LPC envelope used in envelope based arithmetic coding.

In case of envelope base arithmetic coding, harmonic model can be used to enhance the arithmetic coding. The similar search procedure as in the context based arithmetic coding is used for estimating the interval between harmonics in the MDCT domain. However, the harmonic model is used in combination of the LPC envelope as shown in FIG. 19. The shape of the envelope is rendered according to the information of the harmonic analysis.

Harmonic shape at k in the frequency data sample is defined as $$Q(k) = h \cdot \exp\left(-\frac{(k-\tau)^2}{2\sigma^2}\right), \tag{43}$$

when $\tau-4\leq k\leq\tau+4$, otherwise $Q(k)=1.0$, where $\tau$ denotes center position of $U^{th}$ harmonics.

$$\tau = \lfloor U \cdot T_{MDCT} \rfloor \tag{44}$$

h and $\sigma$ are height and width of each harmonics depending on the unit interval as shown, $$h=2.8(1.125-\exp(-0.07\cdot T_{MDCT}/2^{Res})) \tag{45}$$

$$\sigma=0.5(2.6-\exp(-0.05\cdot T_{MDCT}/2^{Res})) \tag{46}$$

Height and width get larger when interval gets larger.

The spectral envelope S(k) is modified by the harmonic shape Q(k) at k as $$S(k)=S(k)\cdot(1+g_{ham}\cdot Q(k)), \tag{47}$$

where gain for the harmonic components $g_{harm}$ is set as 0.75 for Generic mode, and $g_{ham}$ is selected from {0.6, 1.4, 4.5, 10.0} that minimizes $E_{nonn}$ for Voiced mode using 2 bits, $$E_{ABSres} = \sum_{k=0}^{L_M-1} (|X_M(k)|/S(k)), \tag{48}$$

-continued $$E_{norm} = \sum_{k=0}^{L_M-1} \left(|X_M(k)|/S(k)/E_{ABSres}\right)^4. \tag{49}$$

5.3.3.2.9 Global gain coding 5.3.3.2.9.1 Optimizing global gain

The optimum global gain $g_{opt}$ is computed from the quantized and unquantized MDCT coefficients. For bit rates up to 32 kbps, the adaptive low frequency de-emphasis (see subclause 6.2.2.3.2) is applied to the quantized MDCT coefficients before this step. In case the computation results in an optimum gain less than or equal to zero, the global gain $g_{TCX}$ determined before (by estimate and rate loop) is used.

$$g'_{opt} = \frac{\sum_{k=0}^{L_{TCX}^{(bw)}-1} X_M(k)\hat{X}_M(k)}{\sum_{k=0}^{L_{TCX}^{(bw)}-1} \left(\hat{X}_M(k)\right)^2} \tag{50}$$

$$g_{opt} = \begin{cases} g'_{opt} & , \text{ if } g'_{opt} \geq 0 \\ g_{TCX} & , \text{ if } g'_{opt} < 0 \end{cases} \tag{51}$$

5.3.3.2.9.2 Quantization of global gain

For transmission to the decoder the optimum global gain $g_{opt}$ is quantized to a 7 bit index $I_{TCX,gam}$:

$$I_{TCX,gain} = \left\lfloor 28\log_{10}\left(\sqrt{L_{TCX}^{(bw)}/160}\, g_{opt}\right) + 0.5 \right\rfloor \tag{52}$$

The dequantized global gain $g_{TCX}$ is obtained as defined in subclause 6.2.2.3.3).

5.3.3.2.9.3 Residual coding

The residual quantization is a refinement quantization layer refining the first SQ stage. It exploits eventual unused bits target_bits-nbbits, where nbbits is the number of bits consumed by the entropy coder. The residual quantization adopts a greedy strategy and no entropy coding in order to stop the coding whenever the bit-stream reaches the desired size.

The residual quantization can refine the first quantization by two means. The first mean is the refinement of the global gain quantization. The global gain refinement is only done for rates at and above 13.2 kbps. At most three additional bits is allocated to it. The quantized gain $\hat{g}_{TCX}$ is refined sequentially starting from n=0 and incrementing n by one after each following iteration:

of ($g_{opt}$<$\hat{g}_{TCX}$) then
write_bit(0)
$\hat{g}_{TCX}\ \hat{g}_{TCX}\cdot 10^{-2^{-m-2}/28}$
else then
write_bit(1)
$\hat{g}_{TCX}\ \hat{g}_{TCX}\cdot 10^{-2^{-m-2}/28}$ The second mean of refinement consists of re-quantizing the quantized spectrum line per line. First, the non-zeroed quantized lines are processed with a 1 bit residual quantizer:

if (X [k]<$\hat{X}$[k]) then
write_bit(0)
else then
write_bit(1)

Finally, if bits remain, the zeroed lines are considered and quantized with on 3 levels. The rounding offset of the SQ with deadzone was taken into account in the residual quantizer design:

fac_z=(1−0.375)·0.33
if(|X[k]|<fac_z·$\hat{X}$[k]) then
write_bit(0)
else then
write_bit(1)
write_bit(1+sgn(X[k]))/2)

5.3.3.2.10 Noise Filling

On the decoder side noise filling is applied to fill gaps in the MDCT spectrum where coefficients have been quantized to zero. Noise filling inserts pseudo-random noise into the gaps, starting at bin $k_{NFstart}$ up to bin $k_{NFstop}-1$. To control the amount of noise inserted in the decoder, a noise factor is computed on encoder side and transmitted to the decoder.

5.3.3.2.10.1 Noise Filling Tilt

To compensate for LPC tilt, a tilt compensation factor is computed. For bitrates below 13.2 kbps the tilt compensation is computed from the direct form quantized LP coefficients â, while for higher bitrates a constant value is used:

$$t'_{NF} = \begin{cases} 0.5625 & , \text{ if bitrate} \geq 13200 \\ \min\left\{1,\ \frac{\sum_{i=0}^{15}\hat{a}(i+1)\hat{a}(i)}{\sum_{i=0}^{15}(\hat{a}(i))^2} + 0.09375\right\} & , \text{ if bitrate} < 13200 \end{cases} \tag{53}$$

$$t_{NF} = \max(0.375,\ t'_{NF})^{\frac{1}{L_{TCX}^{(celp)}}} \tag{54}$$

5.3.3.2.10.2 Noise Filling Start and Stop Bins

The noise filling start and stop bins are computed as follows:

$$k_{NFstart} = \begin{cases} L_{TCX}^{(celp)}/6 & , \text{ if bitrate} \geq 13200 \\ L_{TCX}^{(celp)}/8 & , \text{ if bitrate} < 13200 \end{cases} \tag{55}$$

$$k_{NFstop} = \begin{cases} t(0) & \text{if } IGF \text{ is used} \\ L_{TCX}^{(bw)} & \text{else} \end{cases}$$

$$k_{NFstop,LP} = \begin{cases} \min\left(t(0),\ \text{round}\left(c_{lpf}\cdot L_{TCX}^{(celp)}\right) \right. & , \text{if } IGFis \text{ used} \\ \min\left(L_{TCX}^{(bw)},\ \text{round}\left(c_{lpf}\cdot L_{TCX}^{(celp)}\right)\right) & , \text{else} \end{cases} \tag{56}$$

5.3.3.2.10.3 Noise Transition Width

At each side of a noise filling segment a transition fadeout is applied to the inserted noise. The width of the transitions (number of bins) is defined as:

$$w_{NF} = \begin{cases} 8 & , \text{if (bitrate} < 48000) \\ 4 + \lfloor 12.8\cdot g_{LTP}\rfloor & , \text{if (bitrate} \geq 48000) \wedge TCX20 \wedge (HM = 0 \vee \text{previous} = ACELP) \\ 4 + \lfloor 12.8\cdot \max(g_{LTP},\ 0.3125\rfloor & , \text{if (bitrate} \geq 48000) \wedge TCX20 \wedge (HM \neq 0 \wedge \text{previous} \neq ACELP) \\ 3 & , \text{if (bitrate} \geq 48000) \wedge TCX10 \end{cases} \tag{57}$$

where HM denotes that the harmonic model is used for the arithmetic codec and previous denotes the previous codec mode.

5.3.3.2.10.4 Computation of Noise Segments The noise filling segments are determined, which are the segments of successive bins of the MDCT spectrum between $k_{NFstart}$ and $k_{NFstop,LP}$ for which all coefficients are quantized to zero. The segments are determined as defined by the following pseudo-code:

```
k=k_NFstart
while (k>k_NFstart/2) and (X̂_M(k)=0)do k=k−1
k k+1
k'_NFstart=k
j=0
while (k<k_NFstop,LP){
while (k<k_NFstop,LP)and (X̂_M(k)≠0)do k=k+1
k_NF0(j)=k
while (k<k_NFstop,LP) and (X̂_M((k)=0) do k=k+1
k_NF1(j)=k
if(k_NF0(j)<k_NFstop,LP) then j=j+1
}
n_NF=j
```

where $k_{NF0}(j)$ and $k_{NF1}(j)$ are the start and stop bins of noise filling segment j, and n NF is the number of segments.

5.3.3.2.10.5 Computation of Noise Factor

The noise factor is computed from the unquantized MDCT coefficients of the bins for which noise filling is applied.

If the noise transition width $w_{NF}$ is 3 or less bins, an attenuation factor is computed based on the energy of even and odd MDCT bins:

$$E_{NFeven} = \sum_{i=0}^{\left\lceil \frac{k_{NFstop,LP}}{2} \right\rceil - \left\lfloor \frac{k'_{NFstart}}{2} \right\rfloor - 1} \left( X_M \left( 2 \left\lfloor \frac{k'_{NFstart}}{2} \right\rfloor + 2i \right) \right)^2 \quad (58)$$

$$E_{NFodd} = \sum_{i=0}^{\left\lceil \frac{k_{NFstop,LP}}{2} \right\rceil - \left\lfloor \frac{k'_{NFstart}}{2} \right\rfloor - 1} \left( X_M \left( 2 \left\lfloor \frac{k'_{NFstart}}{2} \right\rfloor + 2_i + 1 \right) \right)^2 \quad (59)$$

$$f_{NFatt} = \begin{cases} \sqrt{\dfrac{2\min(E_{even}, E_{odd})}{E_{even} + E_{odd}}} & , \text{ if } w_{NF} \le 3 \\ 1 & , \text{ if } w_{NF} > 3 \end{cases} \quad (60)$$

For each segment an error value is computed from the unquantized MDCT coefficients, applying global gain, tilt compensation and transitions:

$$E'_{NF}(j) = \frac{1}{g_{TCX}} \quad (61)$$

-continued $$\sum_{i=k_{NF0}}^{k_{NF1}-1} \left( |X_M(i)| \frac{\min(i - k_{NF0}(j) + 1, w_{NF}}{w_{NF}} \frac{\min(K_{NF1}(j) - i, w_{NF}}{w_{NF}} \left( \frac{1}{t_{NF}} \right)^i \right)$$

A weight for each segment is computed based on the width of the segment:

$$e_{NF}(j) = \begin{cases} k_{NF1}(j) - k_{NF0}(j) - w_{NF} + 1 & , (w_{NF} \le 3) \wedge (k_{NF1}(j) - k_{NF0}(j) > 2w_{NF} - 4) \\ \dfrac{0.28152}{w_{NF}}(K_{NF1}(j) - k_{NF0}(j))^2 & , (w_{NF} \le 3) \wedge (k_{NF1}(j) - k_{NF0}(j) \le 2w_{NF} - 4) \\ k_{NF1}(j) - k_{NF0}(j) - 7 & , (w_{NF} > 3) \wedge (k_{NF1}(j) - k_{NF0}(j) > 12) \\ 0.03515625(k_{NF1}(j) - k_{NF0}(j))^2 & , (w_{NF} > 3) \wedge (k_{NF1}(j) - k_{NF0}(j) \le 12) \end{cases} \quad (62)$$

The noise factor is then computed as follows:

$$f_{NF} = \begin{cases} f_{att} \dfrac{\sum_{i=0}^{n_{NF}-1} E'_{NF}(i)}{\sum_{i=0}^{n_{NF}-1} e_{NF}(i)} & , \text{ if } \sum_{i=0}^{n_{NF}-1} e_{NF}(i) > 0 \\ 0 & , \text{ else} \end{cases} \quad (63)$$

5.3.3.2.10.6 Quantization of Noise Factor

For transmission the noise factor is quantized to obtain a 3 bit index:

$$I_{NF} = \min(\lfloor 10.75 f_{NF} + 0.5 \rfloor, 7) \quad (64)$$

5.3.3.2.11 Intelligent Gap Filling

The Intelligent Gap Filling (IGF) tool is an enhanced noise filling technique to fill gaps (regions of zero values) in spectra. These gaps may occur due to coarse quantization in the encoding process where large portions of a given spectrum might be set to zero to meet bit constraints. However, with the IGF tool these missing signal portions are reconstructed on the receiver side (RX) with parametric information calculated on the transmission side (TX). IGF is used only if TCX mode is active.

See table 6 below for all IGF operating points:

TABLE 6

IGF application modes

| Bitrate | Mode |
|---|---|
| 9.6 kbps | WB |
| 9.6 kbps | SWB |
| 13.2 kbps | SWB |
| 16.4 kbps | SWB |
| 24.4 kbps | SWB |
| 32.2 kbps | SWB |
| 48.0 kbps | SWB |
| 16.4 kbps | FB |
| 24.4 kbps | FB |
| 32.0 kbps | FB |
| 48.0 kbps | FB |
| 96.0 kbps | FB |
| 128.0 kbps | FB |

On transmission side, IGF calculates levels on scale factor bands, using a complex or real valued TCX spectrum. Additionally spectral whitening indices are calculated using a spectral flatness measurement and a crest-factor. An arithmetic coder is used for noiseless coding and efficient transmission to receiver (RX) side.

5.3.3.2.11.1 IGF helper functions 5.3.3.2.11.1.1 Mapping values with the transition factor If there is a transition from CELP to TCX coding (isceiprorcx=true) or a TCX 10 frame is signalled (Lacxto=true), the TCX frame length may change. In case of frame length change, all values which are related to the frame length are mapped with the function tF:

$$tF : N \times P \rightarrow N, \tag{65}$$

$$tF(n, f) := \begin{cases} \left\lfloor nf + \frac{1}{2} \right\rfloor, & \text{if } \left\lfloor nf + \frac{1}{2} \right\rfloor \text{ is even} \\ \left\lfloor nf + \frac{1}{2} \right\rfloor + 1, & \text{if } \left\lfloor nf + \frac{1}{2} \right\rfloor \text{ is odd} \end{cases}$$

where n is a natural number, for example a scale factor band offset, and f is a transition factor, see table 11.

5.3.3.2.11.1.2 TCX power spectrum

The power spectrum $P \in P^n$ of the current TCX frame is calculated with:

$$P(sb) := R(sb)^2 + I(sb)^2, sb = 0, 1, 2, \ldots, n-1 \tag{66}$$

where n is the actual TCX window length, $R \in P^n$ is the vector containing the real valued part (cos-transformed) of the current TCX spectrum, and $I \in p^n$ is the vector containing the imaginary (sin-transformed) part of the current TCX spectrum.

5.3.3.2.11.1.3 The spectral flatness measurement function SFM

Let $P \in P^n$ be the TCX power spectrum as calculated according to subclause 5.3.3.2.11.1.2 and b the start line and e the stop line of the SFM measurement range.

The SFM function, applied with IGF, is defined with:

$$SFM : P^n \times N \times N \rightarrow P, \tag{67}$$

$$SFM(P, b, e) := 2^{\left(\frac{1}{2}+p\right)} \left( \frac{1}{e-b} \left( 1 + \sum_{sb=b}^{e-1} P(sb) \right) \right)^{-1},$$

where n is the actual TCX window length and p is defined with:

$$p := \frac{1}{e-b} \sum_{sb=b}^{e-1} \lfloor \max(0, \log_2(P(sb))) \rfloor. \tag{68}$$

5.3.3.2.11.1.4 The crest factor function CREST

Let $P \in P^n$ be the TCX power spectrum as calculated according to subclause 5.3.3.2.11.1.2 and b the start line and e the stop line of the crest factor measurement range.

The CREST function, applied with IGF, is defined with:

$$CREST : P^n \times N \times N \rightarrow P, \tag{69}$$

$$CREST(P, b, e) = \max\left( 1, E_{max} \left( \frac{1}{e-b} \sum_{sb=b}^{e-1} \lfloor \max(0, \log_2(P(sb))) \rfloor^2 \right)^{-\frac{1}{2}} \right),$$

where n is the actual TCX window length and $E_{max}$ is defined with:

$$E_{max} := \left\lfloor \max_{sb \in [b,e] \subset N} (0, \log_2(P(sb))) \right\rfloor. \tag{70}$$

5.3.3.2.11.1.5 The mapping function hT

The hT mapping function is defined with:

$$hT : P \times N \rightarrow (0, 1, 2), \tag{71}$$

$$hT(s, k) = \begin{cases} 0 & \text{for} \quad s \leq ThM_k \\ 1 & \text{for} \quad ThM_k < s \leq ThS_k \\ 2 & \text{for} \quad s > ThS_k \end{cases},$$

where s is a calculated spectral flatness value and k is the noise band in scope.

For threshold values $Thm_k$, $Ths_k$ refer to table 7 below.

TABLE 7

Thresholds for whitening for nT, ThM and ThS

| Bitrate | Mode | nT | ThM | ThS |
|---|---|---|---|---|
| 9.6 kbps | WB | 2 | 0.36, 0.36 | 1.41, 1.41 |
| 9.6 kbps | SWB | 3 | 0.84, 0.89, 0.89 | 1.30, 1.25, 1.25 |
| 13.2 kbps | SWB | 2 | 0.84, 0.89 | 1.30, 1.25 |
| 16.4 kbps | SWB | 3 | 0.83, 0.89, 0.89 | 1.31, 1.19, 1.19 |
| 24.4 kbps | SWB | 3 | 0.81, 0.85, 0.85 | 1.35, 1.23, 1.23 |
| 32.2 kbps | SWB | 3 | 0.91, 0.85, 0.85 | 1.34, 1.35, 1.35 |
| 48.0 kbps | SWB | 1 | 1.15 | 1.19 |
| 16.4 kbps | FB | 3 | 0.63, 0.27, 0.36 | 1.53, 1.32, 0.67 |
| 24.4 kbps | FB | 4 | 0.78, 0.31, 0.34, 0.34 | 1.49, 1.38, 0.65, 0.65 |
| 32.0 kbps | FB | 4 | 0.78, 0.31, 0.34, 0.34 | 1.49, 1.38, 0.65, 0.65 |
| 48.0 kbps | FB | 1 | 0.80 | 1.0 |
| 96.0 kbps | FB | 1 | 0 | 2.82 |
| 128.0 kbps | FB | 1 | 0 | 2.82 |

5.3.3.2.11.1.6 Void 5.3.3.2.11.1.7 IGF scale factor tables

IGF scale factor tables are available for all modes where IGF is applied.

TABLE 8

Scale factor band offset table

| Bitrate | Mode | Number of bands (nB) | Scale factor band offsets (t[0], t[1], . . . , t[nB]) |
|---|---|---|---|
| 9.6 kbps | WB | 3 | 164, 186, 242, 320 |
| 9.6 kbps | SWB | 3 | 200, 322, 444, 566 |
| 13.2 kbps | SWB | 6 | 256, 288, 328, 376, 432, 496, 566 |
| 16.4 kbps | SWB | 7 | 256, 288, 328, 376, 432, 496, 576, 640 |
| 24.4 kbps | SWB | 8 | 256, 284, 318, 358, 402, 450, 508, 576, 640 |
| 32.2 kbps | SWB | 8 | 256, 284, 318, 358, 402, 450, 508, 576, 640 |
| 48.0 kbps | SWB | 3 | 512, 534, 576, 640 |
| 16.4 kbps | FB | 9 | 256, 288, 328, 376, 432, 496, 576, 640, 720, 800 |
| 24.4 kbps | FB | 10 | 256, 284, 318, 358, 402, 450, 508, 576, 640, 720, 800 |
| 32.0 kbps | FB | 10 | 256, 284, 318, 358, 402, 450, 508, 576, 640, 720, 800 |
| 48.0 kbps | FB | 4 | 512, 584, 656, 728, 800 |
| 96.0 kbps | FB | 2 | 640, 720, 800 |
| 128.0 kbps | FB | 2 | 640, 720, 800 |

The table 8 above refers to the TCX 20 window length and a transition factor 1.00.

For all window lengths apply the following remapping $$t(k):=tF(t(k)f),k=0,1,2,\ldots,nB \tag{72}$$

where tF is the transition factor mapping function described in subclause 5.3.3.2.11.1.1.

5.3.3.2.11.1.8 The mapping function In

TABLE 9

IGF minimal source subband, minSb

| Bitrate | mode | minSb |
|---|---|---|
| 9.6 kbps | WB | 30 |
| 9.6 kbps | SWB | 32 |
| 13.2 kbps | SWB | 32 |
| 16.4 kbps | SWB | 32 |
| 24.4 kbps | SWB | 32 |
| 32.2 kbps | SWB | 32 |
| 48.0 kbps | SWB | 64 |
| 16.4 kbps | FB | 32 |
| 24.4 kbps | FB | 32 |
| 32.0 kbps | FB | 32 |
| 48.0 kbps | FB | 64 |
| 96.0 kbps | FB | 64 |
| 128.0 kbps | FB | 64 |

For every mode a mapping function is defined in order to access source lines from a given target line in IGF range.

TABLE 10

Mapping functions for every mode

| Bitrate | Mode | nT | mapping Function |
|---|---|---|---|
| 9.6 kbps | WB | 2 | m2a |
| 9.6 kbps | SWB | 3 | m3a |
| 13.2 1 kbps | SWB | 2 | m2b |
| 16.4 kbps | SWB | 3 | m3b |
| 24.4 kbps | SWB | 3 | m3c |
| 32.2 kbps | SWB | 3 | m3c |
| 48.0 kbps | SWB | 1 | m1 |
| 16.4 kbps | FB | 3 | m3d |
| 24.4 kbps | FB | 4 | m4 |
| 32.0 kbps | FB | 4 | m4 |
| 48.0 kbps | FB | 1 | m1 |
| 96.0 kbps | FB | 1 | m1 |
| 128.0 kbps | FB | 1 | m1 |

The mapping function m1 is defined with:

$$m1(x)=\text{minSb}+2t(0)-t(nB)+(x-t(0)),\text{for}\,t(0)\le x\le t(nB) \tag{73}$$

The mapping function m2a is defined with:

$$m2a(x):=\begin{cases}\min Sb+(x-t(0)) & \text{for} \quad t(0)\le x<t(2)\\ \min Sb+(x-t(2)) & \text{for} \quad t(2)\le x<t(nB)\end{cases} \tag{74}$$

The mapping function m2b is defined with:

$$m2b(x):=\begin{cases}\min Sb+(x-t(0)) & \text{for} \quad t(0)\le x<t(4)\\ \min Sb+tF(32,f)+(x-t(4)) & \text{for} \quad t(2)\le x<t(nB)\end{cases} \tag{75}$$

The mapping function m3a is defined with:

$$m3a(x):=\begin{cases}\min Sb+(x-t(0)) & \text{for} \quad t(0)\le x<t(1)\\ \min Sb+tF(32,f)+(x-t(1)) & \text{for} \quad t(1)\le x<t(2)\\ \min Sb+tF(46,f)+(x-t(2)) & \text{for} \quad t(2)\le x<t(nB)\end{cases} \tag{76}$$

The mapping function m3b is defined with:

$$m3b(x):=\begin{cases}\min Sb+(x-t(0)) & \text{for} \quad t(0)\le x<t(4)\\ \min Sb+tF(48,f)+(x-t(4)) & \text{for} \quad t(4)\le x<t(6)\\ \min Sb+tF(64,f)+(x-t(6)) & \text{for} \quad t(6)\le x<t(nB)\end{cases} \tag{77}$$

The mapping function m3c is defined with:

$$m3c(x):=\begin{cases}\min Sb+(x-t(0)) & \text{for} \quad t(0)\le x<t(4)\\ \min Sb+tF(32,f)+(x-t(4)) & \text{for} \quad t(4)\le x<t(7)\\ \min Sb+tF(64,f)+(x-t(7)) & \text{for} \quad t(7)\le x<t(nB)\end{cases} \tag{78}$$

The mapping function m3d is defined with:

$$m3d(x):=\begin{cases}\min Sb+(x-t(0)) & \text{for} \quad t(0)\le x<t(4)\\ \min Sb+t(x-t(4)) & \text{for} \quad t(4)\le x<t(7)\\ \min Sb+(x-t(7)) & \text{for} \quad t(7)\le x<t(nB)\end{cases} \tag{79}$$

The mapping function m4 is defined with:

$$m4(x):=\begin{cases}\min Sb+(x-t(0)) & \text{for} \quad t(0)\le x<t(4)\\ \min Sb+tF(32,f)+(x-t(4)) & \text{for} \quad t(4)\le x<t(6)\\ \min Sb+(x-t(6)) & \text{for} \quad t(0)\le x<t(9)\\ \min Sb+(t(9)-t(8))+(x-t(9)) & \text{for} \quad t(9)\le x<t(nB)\end{cases} \tag{80}$$

The value f is the appropriate transition factor, see table 11 and tF is described in subclause 5.3.3.2.11.1.1.

Please note, that all values t(0),t(t), . . . ,t(nB) shall be already mapped with the function tF, as described in subclause 5.3.3.2.11.1.1. Values for nB are defined in table 8.

The here described mapping functions will be referenced in the text as "mapping function m" assuming, that the proper function for the current mode is selected.

5.3.3.2.11.2 IGF input elements (TX)

The IGF encoder module expects the following vectors and flags as an input:

R: vector with real part of the current TCX spectrum $x_M$

I: vector with imaginary part of the current TCX spectrum $x_S$

P: vector with values of the TCX power spectrum $x_P$

IsTransent: flag, signalling if the current frame contains a transient, see subclause 5.3.2.4.1.1 isTCX10: flag, signalling a TCX 10 frame isTCX20: flag, signalling a TCX 20 frame IsCelpToTCX: flag, signalling CELP to TCX transition; generate flag by test whether last frame was CELP IsIndepFla g: flag, signalling that the current frame is independent from the previous frame Listed in table 11, the following combinations signalled through flags isTCX10, isTCX20 and IsCelpToTCX are allowed with IGF:

TABLE 11

TCX transitions, transition factor f, window length n

| Bitrate/ Mode | isTCX10 | is TCX20 | isCelpToTCX | Transition factor f | Window length n |
|---|---|---|---|---|---|
| 9.6 kbps/ | false | true | false | 1.00 | 320 |
| WB | false | true | true | 1.25 | 400 |
| 9.6 kbps/ | false | true | false | 1.00 | 640 |
| SWB | false | true | true | 1.25 | 800 |
| 13.2 kbps/ | false | true | false | 1.00 | 640 |
| SWB | false | true | true | 1.25 | 800 |
| 16.4 kbps/ | false | true | false | 1.00 | 640 |
| SWB | false | true | true | 1.25 | 800 |
| 24.4 kbps/ | false | true | false | 1.00 | 640 |
| SWB | false | true | true | 1.25 | 800 |
| 32.0 kbps/ | false | true | false | 1.00 | 640 |
| SWB | false | true | true | 1.25 | 800 |
| 48.0 kbps/ | false | true | false | 1.00 | 640 |
| SWB | false | true | true | 1.00 | 640 |
| | true | false | false | 0.50 | 320 |
| 16.4 kbps/ | false | true | false | 1.00 | 960 |
| FB | false | true | true | 1.25 | 1200 |
| 24.4 kbps/ | false | true | false | 1.00 | 960 |
| FB | false | true | true | 1.25 | 1200 |
| 32.0 kbps/ | false | true | false | 1.00 | 960 |
| FB | false | true | true | 1.25 | 1200 |
| 48.0 kbps/ | false | true | false | 1.00 | 960 |
| FB | false | true | true | 1.00 | 960 |
| | true | false | false | 0.50 | 480 |
| 96.0 kbps/ | false | true | false | 1.00 | 960 |
| FB | false | true | true | 1.00 | 960 |
| | true | false | false | 0.50 | 480 |
| 128.0 | false | true | false | 1.00 | 960 |
| kbps/FB | false | true | true | 1.00 | 960 |
| | true | false | false | 0.50 | 480 |

5.3.3.2.11.3 IGF functions on transmission (TX) side

All function declaration assumes that input elements are provided by a frame by frame basis. The only exceptions are two consecutive TCX 10 frames, where the second frame is encoded dependent on the first frame.

5.3.3.2.11.4 IGF scale factor calculation

This subclause describes how the IGF scale factor vector g(k), k=0,1, . . . ,nB−1 is calculated on transmission (TX) side.

5.3.3.2.11.4.1 Complex valued calculation

In case the TCX power spectrum P is available the IGF scale factor values g are calculated using P:

$$\underset{cplx,target}{E(k)} := \sqrt{\frac{1}{t(k+1)-t(k)}\sum_{tb=t_k}^{t(k+1)-1} P(tb)},\ k = 0, 1, \ldots, nB-1, \quad (81)$$

and let m: N→Nbe the mapping function which maps the IGF target range into the IGF source range described in subclause 5.3.3.2.11.1.8, calculate:

$$\underset{cplx,source}{E(k)} := \sqrt{\frac{1}{t(k+1)-t(k)}\sum_{tb=t_k}^{t(k+1)-1} P(m(tb))},\ k = 0, 1, \ldots, nB-1, \quad (82)$$

$$\underset{real,source}{E(k)} := \sqrt{\frac{1}{t(k+1)}\sum_{tb=t_k}^{t(k+1)-1} R(m(tb))^2},\ k = 0, 1, \ldots, nB-1, \quad *83)$$

where t(0),t(1), . . . ,t(nB) shall be already mapped with the function tF, see subclause 5.3.3.2.11.1.1, and nB are the number of IGF scale factor bands, see table 8.

Calculate g(k) with:

$$g(k) := \left\lfloor \frac{1}{2} + 4\log_2\left(\max\left(\frac{9}{10}, 16\left(\frac{\underset{cplx,target}{E(k)}}{\underset{cplx,source}{E(k)}}\right)\underset{real,source}{E(k)}\right)\right)\right\rfloor, \quad (84)$$

$$k = 0, 1, \ldots, nB-1$$

and limit g(k) to the range [0,91]⊂z with $$g(0=\mathrm{naax}(0,g(k)), \quad (85)$$

The values g(k), k=0,1, . . . ,nB−1, will be transmitted to the receiver (RX) side after further lossless compression with an arithmetic coder described in subclause 5.3.3.2.11.8.

5.3.3.2.11.4.2 Real valued calculation

If the TCX power spectrum is not available calculate:

$$\underset{real}{E(K)} := \sqrt{\frac{1}{t(k+1)-t(k)}\sum_{tb=t(k)}^{t(k+1)-1} R(tb)^2},\ k = 0, 1, \ldots, nB-1 \quad (86)$$

where t(o),t(t), . . . ,t(nB) shall be already mapped with the function tF, see subclause 5.3.3.2.11.1.1, and nB are the number of bands, see table 8.

Calculate g(k) with:

$$g(k) := \left\lfloor \frac{1}{2} + 4\log_2\left(\max\left(\frac{9}{10}, 16\underset{real}{E(k)}\right)\right)\right\rfloor,\ k = 0, 1, \ldots, nB-1 \quad (87)$$

and limit g(k) to the range [0,91]⊂z with $$g(k)=\max(0,g(k)),\ g(k)=\min(91,g(k)). \quad (88)$$

The values g(k), k=0,1, . . . ,nB−1, will be transmitted to the receiver (RX) side after further lossless compression with an arithmetic coder described in subclause 5.3.3.2.11.8.

5.3.3.2.11.5 IGF tonal mask

In order to determine which spectral components should be transmitted with the core coder, a tonal mask is calculated. Therefore all significant spectral content is identified whereas content that is well suited for parametric coding through IGF is quantized to zero.

5.3.3.2.11.5.1 IGF tonal mask calculation

In case the TCX power spectrum P is not available, all spectral content above t(o) is deleted:

$$R(tb):=0, t(0)\le tb\le t(nB) \quad (89)$$

where R is the real valued TCX spectrum after applying TNS and n is the current TCX window length.

In case the TCX power spectrum P is available, calculate:

$$E_{HP} = \frac{1}{2t(0)}\sum_{i=0}^{t(0)-1} iP(i) \quad (90)$$

where t(0) is the first spectral line in IGF range.

Given $E_{Hp}$, apply the following algorithm:

Initialize last and next:

last:=R(t(0)−1)

$$\text{next} := \begin{cases} 0 & \text{if } P(t(0)-1) < E_{HP} \\ R(t(0)) & \text{else} \end{cases}$$

```
for (i=t(0); i<t(nB)−1 i++) {
if (p(t)<Exp)
last:=R(i)
R(i):=next
next:=0
} else if(p(i)E_Hp){
R(i−1):=last
last:=R(i)
next:=R(i+1)
}
}
if P(t(nB−1))<_EP, set R(t(nB)−1):=0
```

5.3.3.2.11.6 IGF spectral flatness calculation

TABLE 12

Number of tiles nT and tile width wT

| Bitrate | Mode | nT | wT |
|---|---|---|---|
| 9.6 kbps | WB | 2 | t(2) − t(0), t(nB) − t(2) |
| 9.6 kbps | SWB | 3 | t(1) − t(0), t(2) − t(1), t(nB) − t(2) |
| 13.2 kbps | SWB | 2 | t(4) − t(0), t(nB) − t(4) |
| 16.4 kbps | SWB | 3 | t(4) − t(0), t(6) − t(4), t(nB) − t(6) |
| 24.4 kbps | SWB | 3 | t(4) − t(0), t(7) − t(4), t(nB) − t(7) |
| 32.2 kbps | SWB | 3 | t(4) − (0), t(7) − t(4), t(nB) − t(7) |
| 48.0 kbps | SWB | 1 | t(nB) − t(0) |
| 16.4 kbps | FB | 3 | t(4) − (0), t(7) − t(4), t(nB) − t(7) |
| 24.4 kbps | FB | 4 | t(4) − t(0), t(6) − t(4), t(9) − t(6), t(nB) − t(9) |
| 32.0 kbps | FB | 4 | t(4) − t(0), t(6) − t(4), t(9) − t(6), t(nB) − t(9) |
| 48.0 kbps | FB | 1 | t(nB) − t(0) |
| 96.0 kbps | FB | 1 | t(nB) − t(0) |
| 128.0 kbps | FB | 1 | t(nB) − t(0) |

For the IGF spectral flatness calculation two static arrays, prevFlR and prevIIR, both of size nT are needed to hold filter-states over frames. Additionally a static flag wasTransient is needed to save the information of the input flag isTransient from the previous frame.

5.3.3.2.11.6.1 Resetting filter states

The vectors prevFIR and prevIIR are both static arrays of size nT in the IGF module and both arrays are initialised with zeroes:

$$\left.\begin{array}{l} prevFIR(k) := 0 \\ prevIIR(k) := 0 \end{array}\right\} \text{for } k = 0, 1, \ldots, nT-1 \tag{91}$$

This initialisation shall be done
with codec start up
with any bitrate switch
with any codec type switch
with a transition from CELP to TCX, e.g. IsCelpToTCX=true
if the current frame has transient properties, e.g. isTransient=true 5.3.3.2.11.6.2 Resetting current whitening levels The vector currwLevel shall be initialised with zero for all tiles, $$\text{currWLevel}(k)=0, k=0,1, \ldots, nT-1 \tag{92}$$

with codec start up
with any bitrate switch
with any codec type switch
with a transition from CELP to TCX, e.g IsCelpToTCX=true 5.3.3.2.11.6.3 Calculation of spectral flatness indices The following steps 1) to 4) shall be executed consecutive:

1) Update previous level buffers and initialize current levels:

$$\text{prevIrLevel}(k):=\text{currIFLevel}(k), k=0,1,,nT-1 \text{ currInevel}(k):=0, k=0,1, \ldots ,,nT-1 \tag{93}$$

In case prevIsTransient or isTransient is true, apply $$\text{currWLevel}(k)=1, k=0,1, \ldots, nT-1 \tag{94}$$

else, if the power spectrum P is available, calculate $$tmp(k) := \frac{SFM(P, e(k), e(k+1))}{\text{CREST}(P, e(k), e(k+1))}, \; k = 0, 1, \ldots, nT-1 \tag{95}$$

with $$e(k) := \begin{cases} t(0) & k = 0 \\ e(k-1) + wT(k) & k = 1, \ldots, nT-1 \end{cases} \tag{96}$$

where sFM is a spectral flatness measurement function, described in subclause 5.3.3.2.11.1.3 and CREST is a crest-factor function described in subclause 5.3.3.2.11.1.4.

Calculate:

$$s(k) := \min\left(2.7,\; tmp(k) + prevFIR(k) + \frac{1}{2} prevIIR(k)\right) \tag{97}$$

After calculation of the vector s(k), the filter states are updated with:

$$\text{prevFIR}(k)=tmp(k), k=0,1, \ldots, nT-1 \text{ prevIIR}(k)=s(k), k=0,1, \ldots, nT-1 \text{ prevIsTransient=isTransient} \tag{98}$$

2) A mapping function hT:N×P→N is applied to the calculated values to obtain a whitening level index vector currWLevel The mapping function hT:N×P→N is described in subclause 5.3.3.2.11.1.5.

$$\text{currWLevel}(k)=hT(s(k),(k), k=0,1, \ldots, nT-1 \tag{99}$$

3) With selected modes, see table 13, apply the following final mapping:

$$\text{currWLevet}(nT-1 1:=\text{currWLevel}(nT-2) \tag{100}$$

TABLE 13 modes for step 4) mapping

| Bitrate | mode | mapping |
|---|---|---|
| 9.6 kbps | WB | apply |
| 9.6 kbps | SWB | apply |
| 13.2 kbps | SWB | NOP |
| 16.4 kbps | SWB | apply |
| 24.4 kbps | SWB | apply |
| 32.2 kbps | SWB | apply |
| 48.0 kbps | SWB | NOP |
| 16.4 kbps | FB | apply |
| 24.4 kbps | FB | apply |
| 32.0 kbps | FB | apply |
| 48.0 kbps | FB | NOP |
| 96.0 kbps | FB | NOP |
| 128.0 kbps | FB | NOP |

After executing step 4) the whitening level index vector currWLevel is ready for transmission.

5.3.3.2.11.6.4 Coding of IGF whitening levels

IGF whitening levels, defined in the vector currWLevel, are transmitted using 1 or 2 bits per tile. The exact number of total bits that may be used depends on the actual values contained in currWLevel and the value of the islndep flag. The detailed processing is described in the pseudo code below:

```
isSame=1;
nTiles=nT
k=0;
if (islndep)
isSame=0;} else {
for (k=0; k<nTiles k++) {
  if (currWLevel(k) !=prevWLevel(k)) {
    isSame=0;
    break;
  }
}
}
if (sSame) {
write_bit(1);
} else {
if (! IsIndep) {
  write_bit(0);
}
encode_whitening_level(currWLevel(0));
for (k=1; k<nTiles k++) {
  isSame=1;
  if (currWLevel(k) !=currWLevel(k−1)) {
    isSame=0;
    break;
  }
}
if (! isSame) {
  write_bit(1);
  for (k=1; k<nTiles k++) {
    encode_whitening_level(currWLevel(k));
  }
} else {
  write_bit(0);
}
}
```

wherein the vector prevWLevel contains the whitening levels from the previous frame and the function encode_whitening_level takes care of the actual mapping of the whitening level currWLevel(k) to a binary code. The function is implemented according to the pseudo code below:

```
if (currWLevel(k)−1) {
write_bit(0); } else {
write_bit(1);
if (currWLevel(k)==0) {
  write_bit(0);
} else {
  write_bit(1);
}
}
```

5.3.3.2.11.7 IGF temporal flatness indicator

The temporal envelope of the reconstructed signal by the IGF is flattened on the receiver (RX) side according to the transmitted information on the temporal envelope flatness, which is an IGF flatness indicator.

The temporal flatness is measured as the linear prediction gain in the frequency domain. Firstly, the linear prediction of the real part of the current TCX spectrum is performed and then the prediction gain $\eta_{igf}$, is calculated:

$$\eta_{igf} = \frac{1}{\prod_{i=1}^{8}\left(1 - k_i^2\right)} \tag{101}$$

where $k_i$=i-th PARCOR coefficient obtained by the linear prediction.

From the prediction gain $\eta_{igf}$ and the prediction gain $\eta_{tbs}$ described in subclause 5.3.3.2.2.3, the IGF temporal flatness indicator flag IslgfTemFiat is defined as $$isIgfTemFlat = \begin{cases} 1 & \eta_{igf} < 1.15 \text{ and } \eta_{tns} < 1.15 \\ 0 & \text{otherwise} \end{cases} \tag{102}$$

5.3.3.2.11.8 IGF noiseless coding

The IGF scale factor vector g is noiseless encoded with an arithmetic coder in order to write an efficient representation of the vector to the bit stream.

The module uses the common raw arithmetic encoder functions from the infrastructure, which are provided by the core encoder. The functions used are ari_encode_14bits_sign(bit), which encodes the value bit, ari_encode_14bits_ext(value,cumulatveFrequencyTable), which encodes value from an alphabet of 27 symbols (SYMBOLS_IN_TABLE) using the cumulative frequency table cumulatveFrequencyTable, ari_start_encoding_14bits( ), which initializes the arithmetic encoder, and ari_finish_encoding_14bits( ), which finalizes the arithmetic encoder.

5.3.3.2.11.8.1 IGF independency flag

The internal state of the arithmetic encoder is reset in case the islndepFlag flag has the value true. This flag may be set to false only in modes where TCX10 windows (see table 11) are used for the second frame of two consecutive TCX 10 frames.

5.3.3.2.11.8.2 IGF all-Zero flag

The IGF all-Zero flag signals that all of the IGF scale factors are zero:

$$allZero = \begin{cases} 1 & \text{if } g(k) = 0, \text{ for all } 0 \le k < nB \\ 0 & \text{else} \end{cases} \tag{103}$$

The aliZero flag is written to the bit stream first. In case the flag is true, the encoder state is reset and no further data is written to the bit stream, otherwise the arithmetic coded scale factor vector g follows in the bit stream.

5.3.3.2.11.8.3 IGF arithmetic encoding helper functions 5.3.3.2.11.8.3.1 The reset function The arithmetic encoder states consist of t ∈ {0,1} and the prev vector, which represents the value of the vector g preserved from the previous frame. When encoding the vector g, the value 0 for t means that there is no previous frame available, therefore prev is undefined and not used. The value 1 for t means that there is a previous frame available therefore prev has valid data and it is used, this being the case only in modes where TCX10 windows (see table 11) are used for the second frame of two consecutive TCX 10 frames. For resetting the arithmetic encoder state, it is enough to set t=0.

If a frame has isIndepFlag set, the encoder state is reset before encoding the scale factor vector g. Note that the combination t=0 and IsIndeptFlag=false is valid, and may happen for the second frame of two consecutive TCX 10 frames, when the first frame had allzero=1. In this particular case, the frame uses no context information from the previous frame (the prev vector), because t=0, and it is actually encoded as an independent frame.

5.3.3.2.11.8.3.2 The arith_encode_bits function

The arth_encode_bits function encodes an unsigned integer x, of length nBits bits, by writing one bit at a time.

```
arith_encode_bits(x, nBits)
{
for (i=nBits−1; i>=0; --i) {
bit=(x>>i) & 1;
ari_encode_14bits_sign(bit),
}
}
```

5.3.3.2.11.8.3.2 The save and restore encoder state functions

Saving the encoder state is achieved using the function nsIGFSCFEncoderSaveContextState, which copies t and prev vector into tsave and prevSave vector, respectively. Restoring the encoder state is done using the complementary function nsIGFSCFEncoderRestoreContextState, which copies back/save and prevSave vector into t and prev vector, respectively.

5.3.3.2.11.8.4 IGF arithmetic encoding

Please note that the arithmetic encoder should be capable of counting bits only, e.g., performing arithmetic encoding without writing bits to the bit stream. If the arithmetic encoder is called with a counting request, by using the parameter doRealEncoding set to false, the internal state of the arithmetic encoder shall be saved before the call to the top level function nsIGFSCFEncoderEnco de and restored and after the call, by the caller. In this particular case, the bits internally generated by the arithmetic encoder are not written to the bit stream.

The with encode residual function encodes the integer valued prediction residual x, using the cumulative frequency table cumulanyeFrequencyTable, and the table offset tableOffSat. The table offset tableOffSat is used to adjust the value x before encoding, in order to minimize the total probability that a very small or a very large value will be encoded using escape coding, which slightly is less efficient. The values which are between MIN_ENC_SEPARATE=−12 and MAX_ENC_SEPARATE=12, inclusive, are encoded directly using the cumulative frequency table cumidative-Frequencyrabie, and an alphabet size of SYMBOLS_IN_TABLE=27.

For the above alphabet of SYMBOLS_IN_TABLE symbols, the values 0 and SYMBOLS_IN_TABLE−1 are reserved as escape codes to indicate that a value is too small or too large to fit in the default interval. In these cases, the value extra indicates the position of the value in one of the tails of the distribution. The value extra is encoded using 4 bits if it is in the range {0, . . . ,14}, or using 4 bits with value 15 followed by extra 6 bits if it is in the range {15, . . . ,15+62}, or using 4 bits with value 15 followed by extra 6 bits with value 63 followed by extra 7 bits if it is larger or equal than 15+63. The last of the three cases is mainly useful to avoid the rare situation where a purposely constructed artificial signal may produce an unexpectedly large residual value condition in the encoder.

```
arith_encode_residual(x, cumulativeFrequencyTable, tableOffset)
  {
  x+=tableOffset;
  if ((x>=MIN_ENC_SEPARATE) &&
    (x<=MAX_ENC_SEPARATE)) {
    ari_encode_14bits_ext((x−MIN_ENC_SEPARATE)+
      1, cumulativeFrequencyTable);
    return;
  } else if (x<MIN_ENC_SEPARATE) {
    extra=(MIN_ENC_SEPARATE−1)−x;
    ari_encode_14bits_ext(0, cumulativeFrequencyTable);
  } else {/* x>MAX_ENC_SEPARATE */extra
    extra=x−(MAX_ENC_SEPARATE+1);
  ari_encode_14bits_ext(SYMBOLS_IN_TABLE−1,
    cumulativeFrequencyTable);
  }
  if (extra<15) {
    arith_encode_bits(extra, 4);
  }else {/* extra>=15 */
    arith_encode_bits(15, 4);
    extra -=15;
    if (extra<63) {
      arith_encode_bits(extra, 6);
    } else {/* extra>=63 */
      arith_encode_bits(63, 6);
      extra -=63;
      arith_encode_bits(extra, 7);
    }
  }
  }
```

The function encode_sfe_vector encodes the scale factor vector g, which consists of nB integer values. The value t and the prev vector, which constitute the encoder state, are used as additional parameters for the function. Note that the top level function UsIGFSCFEncoderEncode calls the common arithmetic encoder initialization function ari_start_encoding_14bits before calling the function encode_sfe_vector, and also call the arithmetic encoder finalization function ari_done_encoding_14bits afterwards.

The function quant_ctx is used to quantize a context value ctx, by limiting it to {−3, . . . , 3}, and it is defined as:

```
quant_ctx(ctx)
{
if (abs(ctx)<=3) {
  return ctx;
} else if (ctx>3) {
  return 3;
} else {/* ctx<−3 */
  return−3;
}
}
```

The definitions of the symbolic names indicated in the comments from the pseudo code, used for computing the context values, are listed in the following table 14:

TABLE 14

| Definition of symbolic names | |
|---|---|
| the previous frame (when available) | the current frame |
| a = prev[f] | x = g[f] (the value to be coded) |
| c = prev[f − 1] | b = g[f − 1] (when available) |
| | e = g[f − 2] (when available) |

```
encode_sfe_vector(t, prev, g, nB)
for (f=0; f<nB, f++) {
  if (t==0) {
    if (f==0) {
      ari_encode_14bits_ext(g[f]>>2, cf_se00),
      arith_encode_bits(g[f] & 3, 2); /* LSBs as 2 bit
        raw */
    }
    else if (f==1) {
      pred=g[f—1]; r pred=b*/
```

```
      arith_encode_residual(g[f]−pred,          cf_se01,
        cf_off_se01),
    } else {/* f>=2 */
      pred=g[f−1]; /* pred=b*/
      ctx=quant_ctx(g[f−1]−g[f−2]); /* Q(b−e) */
      arith_encode_residual(g[f]pred,          cf_se02
        [CTX_OFFSET+ctx)],
      cf_off_se02[IGF_CTX_OFFSET+ctx]);
    }
  }
  else {t=1 */
    if(f==0) {
      pred=prev[f]; /* pred=a */
      arith_encode_residual(x[f]-     pred,     cf_se10,
        cf_off_se10),
    } else {(t==1) && (f>=1) */
      pred=prev[f]+g[f−1]- prev[f−1]; /* pred=a+b - c*/
      ctx_f=quant_ctx(prev[f]- prev[f−1]); /* Q(a - c) */
      ctx_t=quant_ctx(g[f−1]- prev[f−1]); /* Q(b - c) */
      arith_encode_residual(g[f]- pred,
      cf_se11[CTX_OFFSET+ctx_t][CTX_OFFSET+
        ctx_f)],
      cf_off_se11[CTX_OFFSET+ctx_t][CTX_OFF-
        SET+ctx_f]);
    }
  }
}
}
```

There are five cases in the above function, depending on the value of t and also on the position f of a value in the vector g:

- when t=0 and f=0, the first scalefactor of an independent frame is coded, by splitting it into the most significant bits which are coded using the cumulative frequency table cf_se00, and the least two significant bits coded directly.
- when t=0 and f=1, the second scale factor of an independent frame is coded (as a prediction residual) using the cumulative frequency table cf_se01
- when t=0 and f≥2, the third and following scale factors of an independent frame are coded (as prediction residuals) using the cumulative frequency table cf_se02 [CTX_OFFSET+ctx], determined by the quantized context value ctx.
- when t=1 and f=0, the first scalefactor of a dependent frame is coded (as a prediction residual) using the cumulative frequency table cf_sel0
- when t=1 and f≥1, the second and following scale factors of a dependent frame are coded (as prediction residuals) using the cumulative frequency table cf_se11 [CTX_OFFSET+ctx_t][CTX_OFFSET+ctx_f], determined by the quantized context values ctx_t and ctx_f Please note that the predefined cumulative frequency tables cf_se01, cf_se02, and the table offsets cf_off_se01, cf_off_se02 depend on the current operating point and implicitly on the bitrate, and are selected from the set of available options during initialization of the encoder for each given operating point. The cumulative frequency table cf_se00 is common for all operating points, and cumulative frequency tables cf_sel0 and cf_se11, and the corresponding table offsets cf_off_sel0 and cf_off_se11 are also common, but they are used only for operating points corresponding to bitrates larger or equal than 48 kbps, in case of dependent TCX 10 frames (when t=1).

5.3.3.2.11.9 IGF bit stream writer

The arithmetic coded IGF scale factors, the IGF whitening levels and the IGF temporal flatness indicator are consecutively transmitted to the decoder side via bit stream. The coding of the IGF scale factors is described in subclause 5.3.3.2.11.8.4. The IGF whitening levels are encoded as presented in subclause 5.3.3.2.11.6.4. Finally the IGF temporal flatness indicator flag, represented as one bit, is written to the bit stream.

In case of a TCX20 frame, i.e. (isTCX20=true), and no counting request is signalled to the bit stream writer, the output of the bit stream writer is fed directly to the bit stream. In case of a TCX10 frame (isTCX10=true), where two sub-frames are coded dependently within one 20 ms frame, the output of the bit stream writer for each sub-frame is written to a temporary buffer, resulting in a bit stream containing the output of the bit stream writer for the individual sub-frames. The content of this temporary buffer is finally written to the bit stream.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. Audio encoder for encoding an audio signal comprising a lower frequency band and an upper frequency band, comprising:

a detector for detecting a significant signal component in the lower frequency band and a peak spectral region in the upper frequency band of the audio signal;

a shaper for shaping the lower frequency band using shaping information for the lower frequency band and for shaping the upper frequency band using at least a portion of the shaping information for the lower frequency band, wherein the shaper is configured to additionally attenuate spectral values in the detected peak spectral region in the upper frequency band, when the significant signal component in the lower frequency band has been detected; and a quantizer and coder stage for quantizing a shaped lower frequency band and a shaped upper frequency band and for entropy coding quantized spectral values from the shaped lower frequency band and the shaped upper frequency band.

2. Audio encoder of claim 1, further comprising:

a linear prediction analyzer for deriving linear prediction coefficients for a time frame of the audio signal by analyzing a block of audio samples in the time frame, the audio samples being band-limited to the lower frequency band, wherein the shaper is configured to shape the lower frequency band using the linear prediction coefficients as the shaping information, and wherein the shaper is configured to use, as at least the portion of the shaping information, at least a portion of the linear prediction coefficients derived from the block of audio samples band-limited to the lower frequency band for shaping the upper frequency band in the time frame of the audio signal.

3. Audio encoder of claim 1, wherein the shaper is configured to calculate a plurality of shaping factors for a plurality of subbands of the lower frequency band using linear prediction coefficients derived from the lower frequency band of the audio signal, and wherein the shaper is configured to weight, in the lower frequency band, spectral coefficients in a sub-band of the plurality of subbands of the lower frequency band using a shaping factor calculated for the subband of the plurality of subbands of the lower frequency band, and to weight spectral coefficients in the upper frequency band using the shaping factor calculated for the subband of the plurality of subbands of the lower frequency band.

4. Audio encoder of claim 3, wherein the shaper is configured to weight the spectral coefficients of the upper frequency band using a shaping factor calculated for a highest subband of the lower frequency band, the highest sub-band comprising a highest center frequency among all center frequencies of subbands of the lower frequency band.

5. Audio encoder of claim 1, wherein the detector is configured to determine the detected peak spectral region in the upperfrequency band, when at least one of a group of conditions is true, the group of conditions comprising at least the following:

a peak distance condition, and a peak amplitude condition.

6. Audio encoder of claim 5, wherein the detector is configured to determine, for the peak distance condition, a first maximum spectral amplitude in the lower frequency band;

a first spectral distance of the first maximum spectral amplitude from a border frequency between a center frequency of the lower frequency band and a center frequency of the upper frequency band;

a second maximum spectral amplitude in the upper frequency band;

a second spectral distance of the second maximum spectral amplitude from the border frequency to the second maximum spectral amplitude, wherein the peak distance condition is true, when the first maximum spectral amplitude weighted by the first spectral distance and weighted by a predetermined number being greater than 1 is greater than the second maximum spectral amplitude weighted by the second spectral distance.

7. Audio encoder of claim 5, wherein the detector is configured to determine a first maximum spectral amplitude in a portion of the lower frequency band, the portion of the lower frequency band extending from a predetermined start frequency of the lower frequency band until a maximum frequency of the lower frequency band, the predetermined start frequency being greater than a minimum frequency of the lower frequency band, and to determine a second maximum spectral amplitude in the upper frequency band, wherein the peak amplitude condition is true, when the second maximum spectral amplitude is greater than the first maximum spectral amplitude weighted by a predetermined number being greater than or equal to 1.

8. Audio encoder of claim 7, wherein the detector is configured to determine the first maximum spectral amplitude or the second maximum spectral amplitude after a shaping operation applied by the shaper without the additional attenuation, or wherein the predetermined start frequency is at least 10% of the lower frequency band above the minimum frequency of the lower frequency band, or wherein the predetermined start frequency is at a frequency being in a range between 0.45 times a maximum frequency of the lower frequency band and 0.55 times the maximum frequency of the lower frequency band, or wherein the predetermined number depends on a bitrate to be provided by the quantizer and coder stage, so that the predetermined number is higher for a higher bitrate, or wherein the predetermined number is between 1.0 and 5.0.

9. Audio encoder of claim 1, wherein the detector is configured to determine the detected peak spectral region in the upper frequency band when only two conditions out of a group of three conditions are true, or wherein the detector is configured to determine the detected peak spectral region in the upper frequency band when three conditions out of the group of three conditions are true, wherein the group of three conditions comprises a low frequency band amplitude condition, a peak distance condition, and a peak amplitude condition.

10. Audio encoder of claim 1, wherein the shaper is configured to attenuate at least one spectral value in the detected peak spectral region in the upper frequency band based on a maximum spectral amplitude in the upper frequency band or based on a maximum spectral amplitude in the lower frequency band.

11. Audio encoder of claim 10, wherein the shaper is configured to determine the maximum spectral amplitude in the lower frequency band for a portion of the lower frequency band, the portion of the lower frequency band extending from a predetermined start frequency of the lower frequency band until a maximum frequency of the lower frequency band, the predetermined start frequency being greater than a minimum frequency of the lower frequency band, wherein the predetermined start frequency is at least 10% of the lower frequency band above the minimum frequency of the lower frequency band, or wherein the predetermined start frequency is at a frequency in a range between 0.45 times a maximum frequency of the lowerfrequency band and 0.55 times the maximum frequency of the lower frequency band.

12. Audio encoder of claim 10, wherein the shaper is configured to attenuate the at least one spectral value in the detected peak spectral region in the upper frequency band using an attenuation factor, the attenuation factor being derived from the maximum spectral amplitude in the lower frequency band multiplied by a predetermined number being greater than or equal to 1 and divided by the maximum spectral amplitude in the upper frequency band.

13. Audio encoder of claim 1, wherein the shaper is configured to shape the spectral values in the detected peak spectral region in the upper frequency band based on:

a first weighting operation for the spectral values in the detected peak spectral region in the upper frequency band using at least the portion of the shaping information for the lower frequency band and a second subsequent weighting operation for the spectral values in the detected peak spectral region in the upper frequency band using an attenuation information; or a first weighting operation for the spectral values in the detected peak spectral region in the upper frequency band using the attenuation information and a second subsequent weighting operation for the spectral values in the detected peak spectral region in the upper frequency band using at least the portion of the shaping information for the lower frequency band, or a single weighting operation for the spectral values in the detected peak spectral region in the upper frequency band using a combined weighting information derived from the attenuation information and at least the portion of the shaping information for the lower frequency band.

14. Audio encoder of claim 13, wherein the shaping information for the lower frequency band is a set of shaping factors, each shaping factor of the set of shaping factors being associated with a subband of the lower frequency band, or wherein the at least the portion of the shaping information for the lower frequency band used in the shaping the upper frequency band is a shaping factor associated with a subband of the lower frequency band comprising a highest center frequency of all subbands in the lower frequency band, or wherein the attenuation information is an attenuation factor applied to at least one spectral value in the detected peak spectral region in the upper frequency band or applied to all spectral values in the detected peak spectral region in the upper frequency band, or wherein the detector is configured to detect the detected peak spectral region in the upper frequency band for a time frame of the audio signal, and wherein the attenuation information is an attenuation factor applied to all spectral values in the upper frequency band in the time frame of the audio signal, or wherein the detector is configured to perform a detection operation for a time frame of the audio signal, and wherein the shaper is configured to perform the shaping of the lower frequency band and the shaping of the upper frequency band without any additional attenuation of the upper frequency band when the detection operation has not resulted in a detected any peak spectral region in the upper frequency band of a time frame of the audio signal.

15. Audio encoder of claim 1, wherein the quantizer and coder stage comprises a rate loop processor for estimating a quantizer characteristic so that a predetermined bitrate of an entropy encoded audio signal is acquired.

16. Audio encoder of claim 15, wherein the quantizer characteristic is a global gain, wherein the quantizer and coder stage comprises:

a weighter for weighting shaped spectral values in the lower frequency band by the global gain and for weighting shaped spectral values in the upper frequency band by the global gain, a quantizer for quantizing values weighted by the global gain to obtain the quantized spectral values from the shaped lower frequency band and the shaped upper frequency band; and an entropy coder for entropy coding quantized values, wherein the entropy coder comprises an arithmetic coder or a Huffman coder.

17. Audio encoder of claim 1, further comprising:

a common processor;

a frequency domain encoder; and a linear prediction encoder, wherein the frequency domain encoder comprises the detector, the shaper and the quantizer and coder stage, and wherein the common processor is configured to calculate data to be used by the frequency domain encoder and the linear prediction encoder.

18. Audio encoder of claim 17, wherein the common processor is configured to resample the audio signal to acquire a resampled audio signal band limited to the lower frequency band for a time frame of the audio signal, and one of either:

wherein the common processor comprises a linear prediction analyzer for deriving linear prediction coefficients for the time frame of the audio signal by analyzing a block of audio samples in the time frame, the audio samples being band-limited to the lower frequency band, or wherein the common processor is configured to control that the time frame of the audio signal is to be represented by either an output of the linear prediction encoder or an output of the frequency domain encoder.

19. Method for encoding an audio signal comprising a lower frequency band and an upper frequency band, comprising:

detecting a peak spectral region in the upper frequency band of the audio signal and a significant signal component in the lower frequency band; and shaping the lower frequency band of the audio signal using shaping information for the lower frequency band and shaping the upper frequency band of the audio signal using at least a portion of the shaping information for the lower frequency band, wherein the shaping of the upper frequency band comprises an additional attenuation of a spectral value in the detected peak spectral region in the upper frequency band, when the significant signal component in the lower frequency band has been detected.

20. A non-transitory digital storage medium having a computer program stored thereon to perform a method for encoding an audio signal comprising a lower frequency band and an upper frequency band, said method comprising:

detecting a peak spectral region in the upper frequency band of the audio signal and a significant signal component in the lower frequency band; and shaping the lower frequency band of the audio signal using shaping information for the lower frequency band and shaping the upper frequency band of the audio signal using at least a portion of the shaping information for the lower frequency band, wherein the shaping of the upper frequency band comprises an additional attenuation of a spectral value in the detected peak spectral region in the upper frequency band, when the significant signal component in the lower frequency band has been detected, when said computer program is run by a computer or a processor.

* * * * *